(12) United States Patent
Cooper et al.

(10) Patent No.: US 8,558,154 B2
(45) Date of Patent: Oct. 15, 2013

(54) SYSTEM AND METHOD FOR CONTINUOUS, ASYNCHRONOUS AUTOFOCUS OF OPTICAL INSTRUMENTS USING MULTIPLE CALIBRATION CURVES

(75) Inventors: Jeremy Cooper, Issaquah, WA (US);
Paul Goodwin, Shoreline, WA (US);
Stephen G. Goodson, Seattle, WA (US)

(73) Assignee: Applied Precision, Inc., Issaquah, WA (US)

( * ) Notice: Subject to any disclaimer, the term of this patent is extended or adjusted under 35 U.S.C. 154(b) by 130 days.

(21) Appl. No.: 13/221,710

(22) Filed: Aug. 30, 2011

(65) Prior Publication Data
US 2011/0309231 A1    Dec. 22, 2011

Related U.S. Application Data

(63) Continuation-in-part of application No. 12/765,756, filed on Apr. 22, 2010, now Pat. No. 8,362,409.

(60) Provisional application No. 61/256,242, filed on Oct. 29, 2009, provisional application No. 61/267,353, filed on Dec. 7, 2009.

(51) Int. Cl.
*G02B 27/64*    (2006.01)

(52) U.S. Cl.
USPC .................................................. 250/201.4

(58) Field of Classification Search
USPC ........... 318/626; 396/137; 359/825, 383, 237; 250/201.4
See application file for complete search history.

(56) References Cited

U.S. PATENT DOCUMENTS 4,745,271 A * 5/1988 Benedetti et al. .......... 250/201.2
6,307,526 B1 * 10/2001 Mann ............................ 345/8

* cited by examiner

*Primary Examiner* — Thanh Luu
*Assistant Examiner* — Renee Naphas

(57) ABSTRACT

The current application is directed to autofocus subsystems within optical instruments that continuously monitor the focus of the optical instruments and adjust distances within the optical instrument along the optical axis in order to maintain a precise and stable optical-instrument focus at a particular point or surface on, within, or near a sample. Certain autofocus implementations operate asynchronously with respect to operation of other components and subsystems of the optical instrument in which they are embedded. The described autofocus subsystems employ multiple calibration curves to precisely adjust the z-position of an optical instrument.

20 Claims, 46 Drawing Sheets

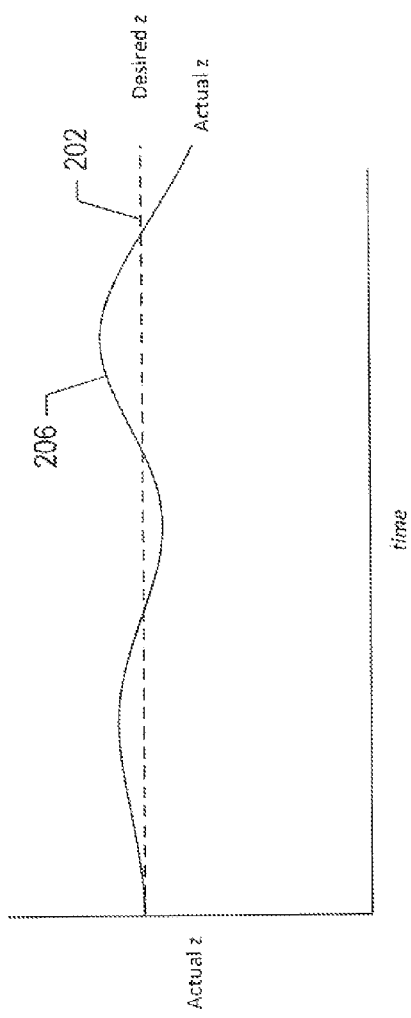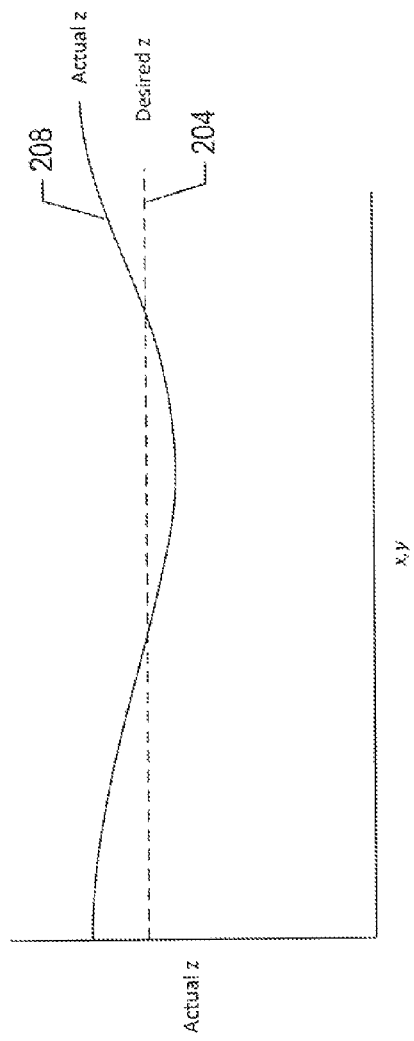

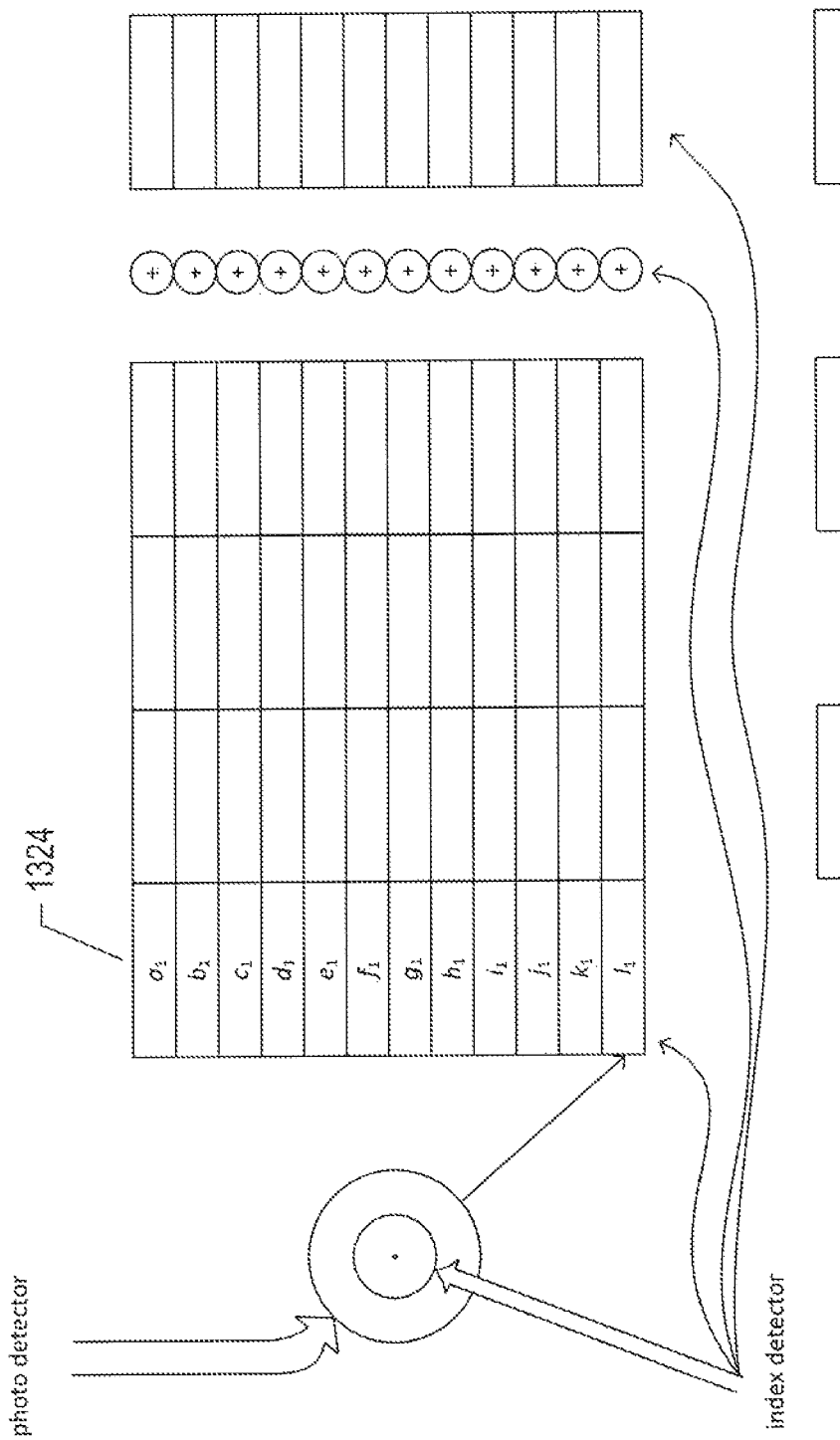

SYSTEM AND METHOD FOR CONTINUOUS, ASYNCHRONOUS AUTOFOCUS OF OPTICAL INSTRUMENTS USING MULTIPLE CALIBRATION CURVES

CROSS-REFERENCE TO RELATED APPLICATIONS

This application is a continuation-in-part of application Ser. No. 12/765,756, filed Apr. 22, 2010 now U.S. Pat. No. 8,362,409, which claims the benefit of Provisional Application No. 61/256,242, filed Oct. 29, 2009 and Provisional Application No. 61/267,353, filed Dec. 7, 2009.

TECHNICAL FIELD

The present invention is related to optical instruments and, in particular, to a continuous, asynchronously operating autofocus subsystem within an optical instrument that maintains a constant distance along the optical axis between an objective lens and a point or surface on, within, or near an imaged object.

BACKGROUND

While optical microscopy and other optics-based methods have been exploited in many domains of human activity, from scientific research to warfare, for many hundreds of years, the advent of microprocessors, modern computing, and molecular biology have given rise to an ever-accelerating development of new optical instrumentation and optical-imaging technologies. For example, fluorescent tagging of proteins within living cells, combined with computational facilities incorporated in modern fluorescence-microscopy instrumentation allows fine detail of biological components of living cells to be imaged at resolutions significantly lower than the so-called "diffraction limit" for optical microscopy.

Many new optical instruments, applications of optical instruments, and optical-imaging technologies depend on precise focusing of high-powered optical systems with shallow depths of focus over prolonged periods of time and/or during scanning of imaged objects within the x-y plane orthogonal to the optical z axis. Examples include various optical-microscopy techniques that achieve below-diffraction-limit resolution by imaging weakly emitting fluorophores in biological samples over relatively long periods of time and optical-microscopy techniques for scanning living cells and other biological samples to image planes within these samples by translating the samples in the x-y plane with respect to the optical path of the microscope while maintaining a constant z position. The focus of optical instruments may vary, over time, as a result of thermal and electromechanical instabilities, for example, and even very precise electromechanical microscope stages may fluctuate, in distance with respect to imaging optics, as the stage is translated in the x-y plane while scanning samples or while collecting data from samples over periods of time. Designers, manufacturers, and users of precision optical instrumentation continue to seek systems and methods that stabilize the focus of high-precision optical instruments over time and while the various subcomponents of the high-precision optical instruments, including electromechanical stages, are operating.

SUMMARY

Embodiments of the present invention are directed to autofocus subsystems within optical instruments that continuously monitor the focus of the optical instruments and adjust distances within the optical instrument along the optical axis in order to maintain a precise and stable optical-instrument focus at a particular point or surface on, within, or near a sample. Certain embodiments of the present invention operate asynchronously with respect to operation of other components and subsystems of the optical instrument in which they are embedded and employ multiple calibration curves.

BRIEF DESCRIPTION OF THE DRAWINGS

FIGS. 2A-B show the undesirable variation in the position of the focal point of the objective lens with respect to the optical axis, or z position, within a sample, over time, in the case of FIG. 2A, or during x and/or y translation of the sample, in the case of FIG. 2B.

FIGS. 13A-I illustrate one approach to computing the current distance between the objective lens and cover-slip interface of a microscope by the autofocus-processing subcomponent of an autofocus module.

DETAILED DESCRIPTION

Figure 1A:
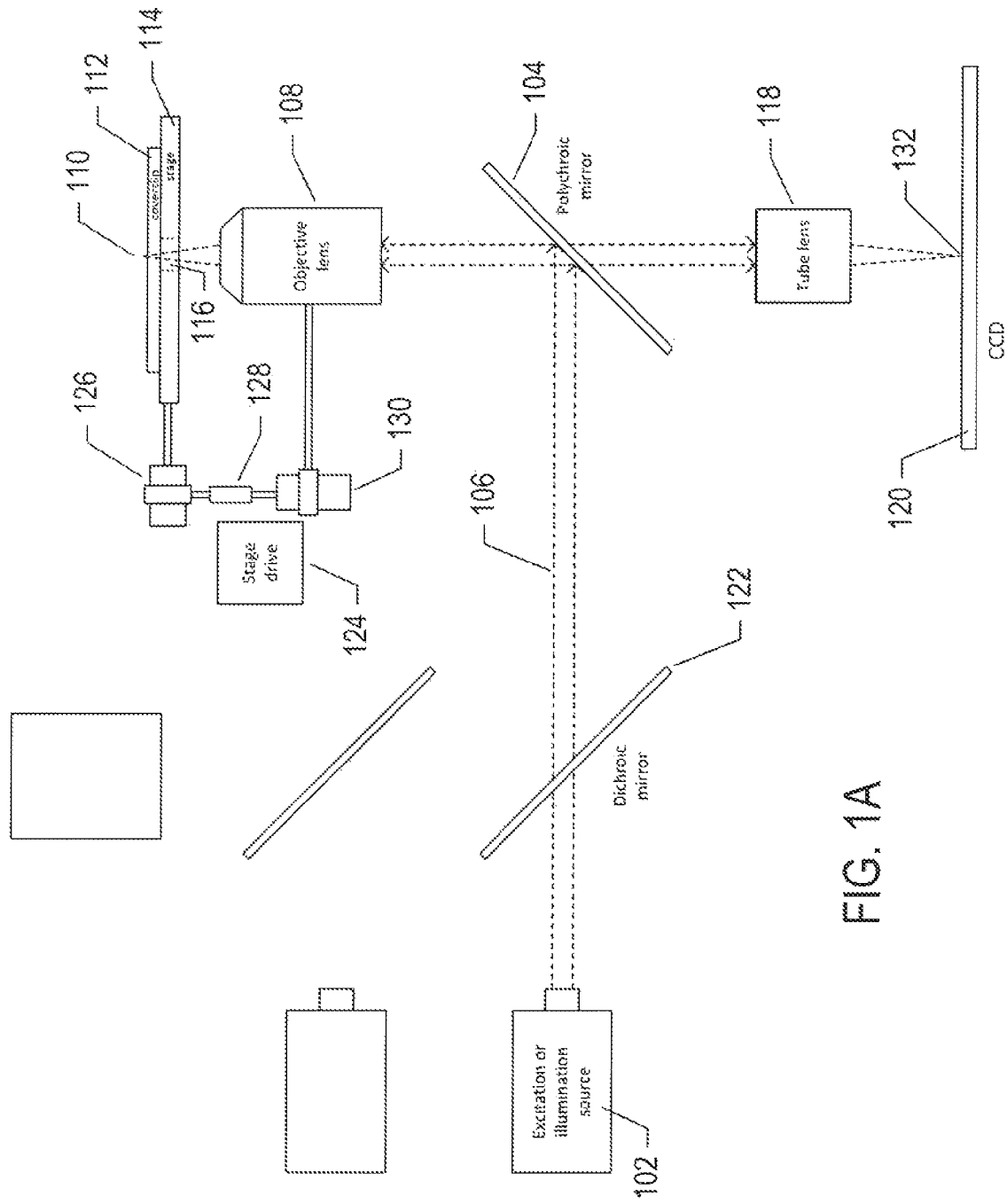
FIGS. 1A-C illustrate the optical path within a fluorescence microscope.
Figure 1B:
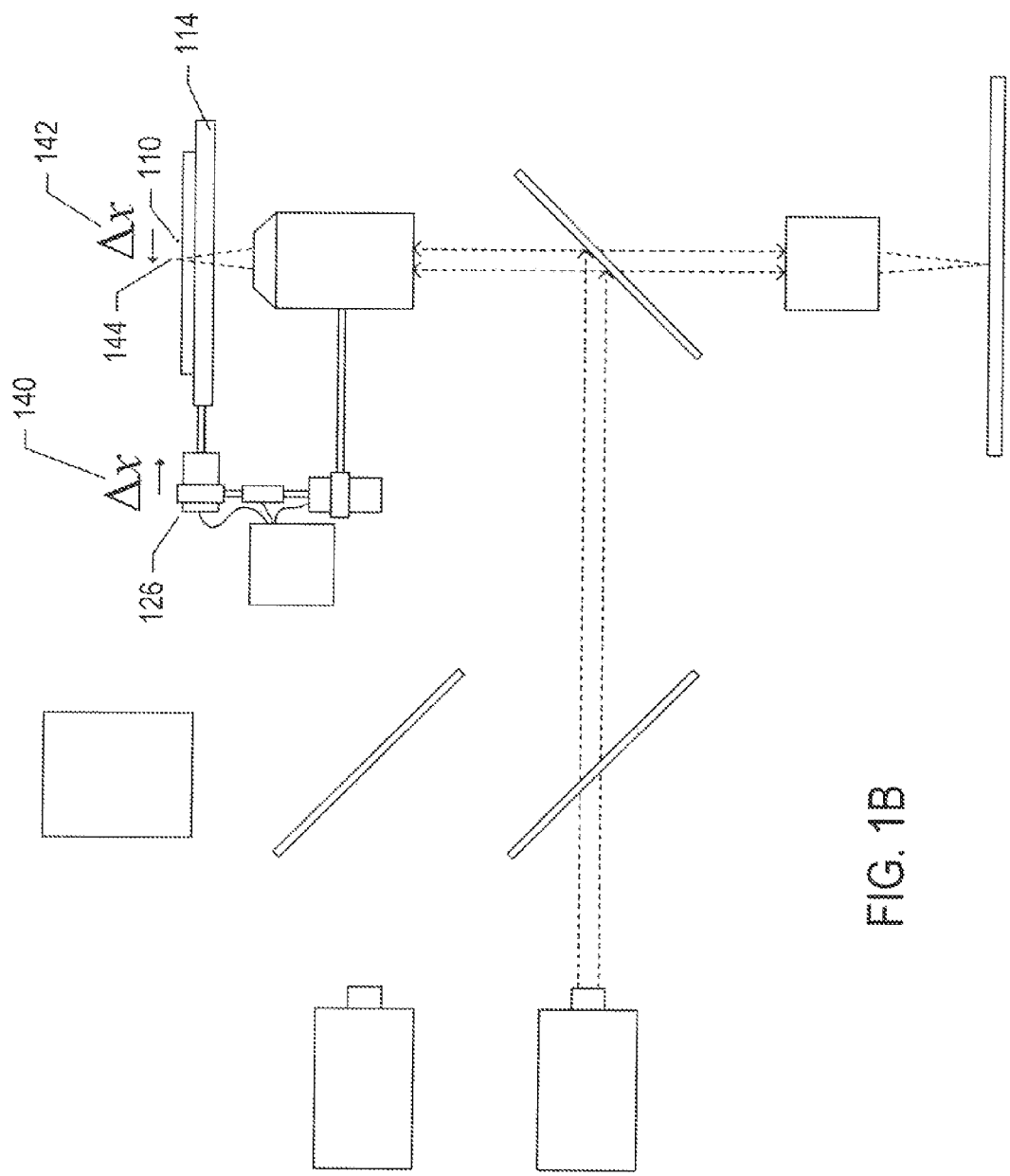
Figure 1C:
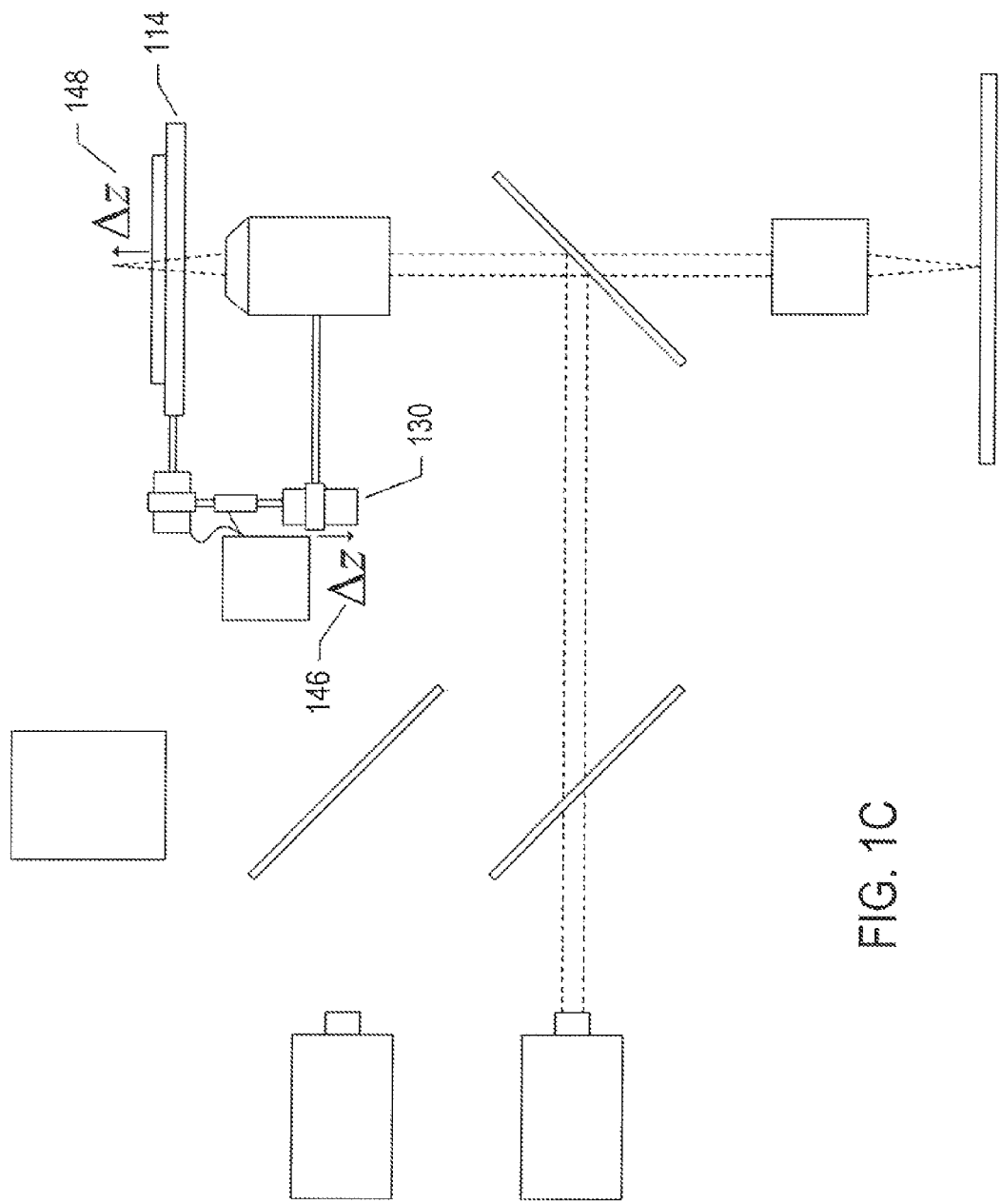

FIGS. 1A-C illustrate the optical path within a fluorescence microscope. The optical path, and the fluorescence microscope that contains the optical path, serve as a context for describing embodiments of the present invention. However, as also noted below, the described methods and systems may be incorporated within a wide variety of different types of optical instruments, in many cases by adjusting various parameters and configurations of the described methods and systems for use in particular applications.

The optical path of the fluorescence microscope includes an excitation-light source 102, generally a visible-light or UV-light laser, a polychroic mirror 104 that reflects the excitation light 106 into the objective lens or lenses 108, which focus the excitation light onto a point 110 within a sample resting on the far side of a cover slip 112 that lays on a mechanical-stage platform 114 with an aperture 116 through which the excitation light passes. The excitation light stimulates fluorescent emission from fluorophores within the sample. The emitted light from the fluorophores, generally with a longer wavelength than that of the excitation light, passes back through the objective lens or lenses 108 and through the polychroic mirror 104 to one or more tube lenses 118 that focus the light emitted by the fluorophores onto a photodetector 120, often a charge-coupled-device ("CCD") detector. Spatial intensities measured by the photodetector are electronically processed by computing subsystems to generate images of the imaged object which are stored in electronic memories and mass-storage devices and rendered for display on electronic display devices.

The polychroic mirror 104 reflects light of shorter wavelength, including the excitation light, and may also reflect light of very long wavelength, such as infrared light, but is transparent to visible light within a range of wavelengths that includes the wavelengths of light emitted by fluorophores within fluorophore-labeled samples. Similarly, a dichroic mirror 122 on the initial path of the excitation light 106 is transparent to the relatively short-wavelength excitation light, but reflects longer-wavelength infrared light, as discussed in greater detail below. The electromechanical stage that includes the stage platform 114, a stage-drive component 124 and x 126, y 128, and z 130 translation mechanisms is used to move the sample, in x, y, and z directions, with respect to the objective lens and instrument optical path. Note that the optical, or z, axis is parallel with the light path that extends vertically, in FIG. 1A, from the sample point 110 through the objective lens, polychroic mirror, and tube lens to a corresponding image point 132 on the detector 120.

In FIG. 1B, the x translation mechanism 126 has been activated to move the stage platform 114 rightward by a small distance $+\Delta x$ 140, which results in an equal magnitude, but opposite shift $-\Delta x$ 142 of the focal point within the sample in the x direction. The previous focal point 110 and new focal point 144 are, in other words, separated by a distance of magnitude $|\Delta x|$ 142 following translation of the stage platform by a distance $+\Delta x$ in the x direction. FIG. 1C shows, in a fashion similar to FIG. 1B, activation of the z translation apparatus 130 to move the mechanical stage 114 by small distance $-\Delta z$ 146 in the z, or optical-axis, direction, resulting in a translation of the focal point within the sample by a distance $+\Delta z$ of equal magnitude 148, but opposite direction. In this discussion, it is assumed that the distance between the detector 120 and tube lens 118, shown in FIG. 1A, is fixed, at least over a period of time during image acquisition from a sample, therefore fixing the focal point of the objective lens.

In many fluorescence-microscopy applications, including live-cell imaging, acquisition of high-resolution images depends on imaging a particular sample in a fixed position with respect to the objective lens for a period of time sufficient to collect adequate information from weakly emitting fluorophores for reconstructing images of the fluorophore labels within the sample. In other applications, a sample is scanned, by moving the electromechanical stage in the x-y plane relative to the objective lens, while maintaining a constant focus, or constant distance between the objective lens and the sample in the z, or optical-axis, direction. In both cases, the distance between the objective lens and a point or surface within the sample needs to be maintained at a precise-fixed value over a period of time and/or while the mechanical stage is translated in the x and y directions.

FIGS. 2A-B show the undesirable variation in the position of the focal point of the objective lens with respect to the optical axis, or z position, within a sample, over time, in the case of FIG. 2A, or during x and/or y translation of the sample, in the case of FIG. 2B. In both figures, a desired distance between the objective lens and sample is indicated by a dashed line 202 and 204. The actual distance between the objective lens and the sample is shown, in both figures, as a solid curve 206 and 208. Despite best efforts to maintain a fixed distance between the objective lens and a point or surface within the sample, the actual distance between the objective lens and sample, in the z, or optical-axis, direction varies over time and during x and/or y translation. These variations have many different causes. Thermal instability in the microscope environment can result in expansion or contraction of the optical instrument in directions with z-axis components, for example. Optical instruments are often surrounded by temperature-control chambers, but components of the optical instrument may generate and dissipate heat, including light sources, motors, and other such components, which cannot be immediately compensated for. Fluctuations in air pressure and other environmental parameters may also result in variations in the distance between the objective lens and sample. When the x-y plane of the electromechanical stage is oriented even slightly non-orthogonally to the optical axis, during scanning by translation in the x-y plane, the sample also moves in the z direction relative to the objective lens.

Figure 3:
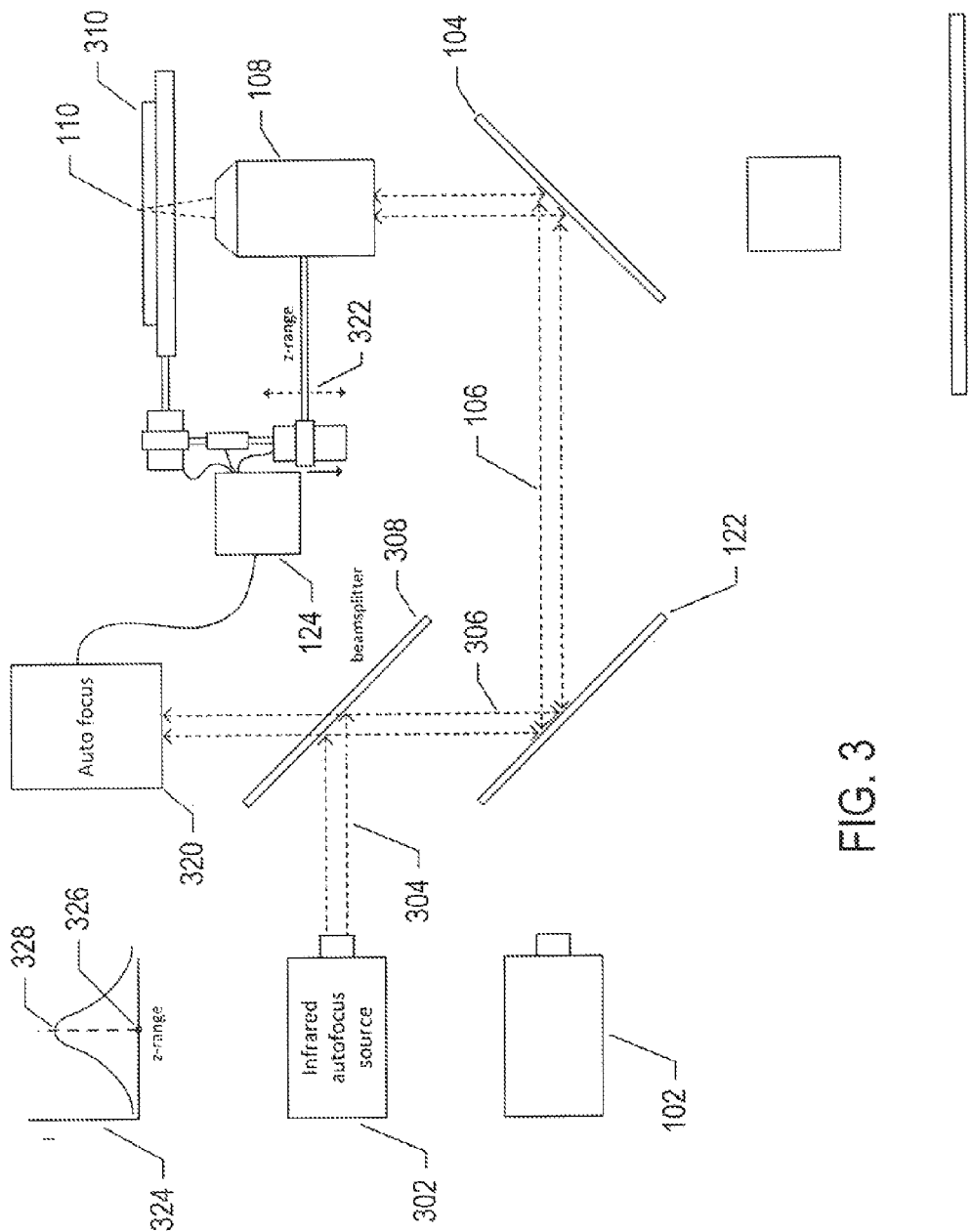
FIG. 3 illustrates a traditional autofocus subsystem of a microscope.

FIG. 3 illustrates a traditional autofocus subsystem of a microscope. Autofocus subsystems have been developed to stabilize focal-point location with respect to the optical axis within a sample over time and while the sample is moved in the x-y plane. FIG. 3 uses the same illustration conventions as used in FIGS. 1A-C. The autofocus subsystem shown in FIG. 3 uses a different autofocus-light source 302 than the excitation light source 102. In many systems, the autofocus-light source emits infrared light 304, a portion of which is reflected downward 306 by a beamsplitter 308 to the dichroic mirror 122, which reflects the infrared light in a horizontal direction 106 in FIG. 3, along the same optical path as that taken by light emitted by the excitation source 102, from which the infrared light is reflected, by the polychroic mirror 104, through the objective lenses 108 to the sample 110. The infrared light is scattered at the interface between the far side of the cover slip 310 and the sample media, and a portion of the backscattered infrared light returns through the objective lens 108 and optical-path elements 104, 122, and 308. A portion of the backscattered infrared light passes through the beamsplitter 308 to an autofocus module 320. Additionally, the positions of the autofocus light source 302 and autofocus detector module 320 can be reversed about the beam splitter 308 with equivalent results, and the relative positions of the illumination source and autofocus light source may be changed, along with changes in the characteristics of other optical-path components, in various alternative configurations. It should be noted that the phrase "cover slip" is intended to include both traditional cover slips often employed in microscopy as well as surfaces of any of a large variety of different types of sample-chamber and sample-holding devices. Any of various interfaces that have fixed positions relative to the sample can be used as a source for backscattered autofocus light in order to detect and correct z-position dislocations of sample planes with respect to one or more objective lenses.

The autofocus module 320 periodically controls the stage drive 124 to translate the stage along the optical axis over a range of z-axis positions 322 and records the intensity of light at each z-axis position, at least conceptually generating an intensity versus z-position plot 324. The z position within the z range corresponding to coincidence of the focal point of the objective lens with the far side of the cover slip is indicated by the z position 326 underlying the peak 328 of the intensity curve, since the highest intensity of backscattered light occurs when the distant side of the cover slip coincides with the focal point of the objective lens. There are a variety of different types of autofocus modules that carry out periodic z-axis scans in order to determine a current z-axis position of the stage platform at which the interface of the cover slip and sample media coincides with the focal point of the optical instrument. The autofocus module can then drive the electromechanical stage to a desired z-axis position relative to the determined z-axis position of the focal point, in order to reposition the focal point at a desired z-axis position within the sample.

Figure 4:
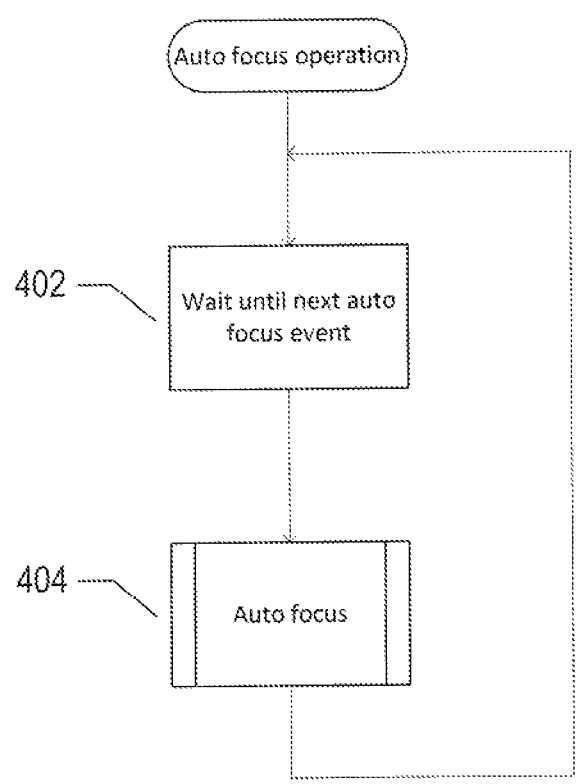
FIGS. 4 and 5 provide control-flow diagrams that illustrate operation of traditional autofocus modules.
Figure 5:
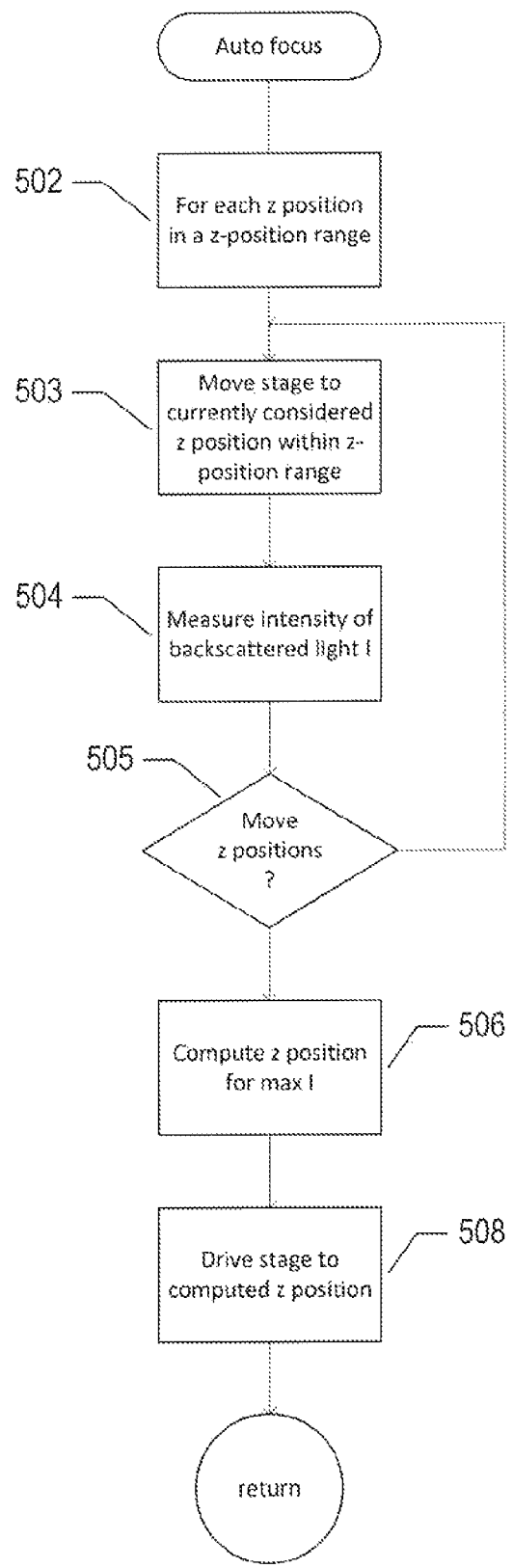

FIGS. 4 and 5 provide control-flow diagrams that illustrate operation of traditional autofocus modules. FIG. 4 provides a high-level control-flow diagram of a traditional autofocus operation. The autofocus operation is a continuous loop comprising steps 402 and 404. In step 402, the autofocus operation waits until a next autofocus event occurs, such as expiration of an autofocus timer or manual input from an optical-instrument operator that invokes a next autofocus operation. Then, in step 404, the routine "autofocus" is called to carry out a scan over a range of z positions, as discussed above with reference to FIG. 3, in order to determine a current z position at which the focal point of the objective lens coincides with the far interface of the cover slip with sample media. Although the autofocus operation is shown in FIG. 4 as a continuous loop, it should be noted that the actual autofocus operation, represented by the call to the routine "autofocus," occurs at discrete intervals in time, and that the autofocus operation is disruptive, generally interrupting other operations involving imaging or translation of the electromechanical stage.

FIG. 5 provides a control-flow diagram for the routine "autofocus," called in step 404 of FIG. 4. In a for-loop of steps 502-505, the autofocus module controls the stage drive to scan through a range of z positions. For each z position within the range, the autofocus module drives the mechanical stage to the z position, in step 503, and measures the intensity of backscattered autofocus light, in step 504. Once the backscattered-autofocus-light intensities are measured for each position within the range of z positions, in the far-loop of steps 502-505, the routine "autofocus" computes the z position corresponding to the maximum intensity of backscattered light, in step 506, and then, in step 508, drives the mechanical stage to a z position computed with respect to the z position computed in step 506. For example, it may be desired that the focal point be maintained at a constant z position of 10 microns within the sample, and so the autofocus computes a z position equal to 10 microns plus the current z position at which the optical instrument is focused on the far side of the cover slip, in step 508, and drives the electromechanical stage to that position.

Traditional or conventional autofocus subsystems, such as those discussed above with reference to FIGS. 3-5, are associated with many problems and deficiencies. One significant problem is that operation of the autofocus subsystem, as noted above, interrupts whatever other operations are being performed by the optical instrument. For example, when the optical instrument is conducting an x-y-plane scan of a sample, at fixed z position, each autofocus operation interrupts the scan in order to monitor the stability of the z position during the scan. The z-axis scan employed for autofocusing may add significant time to the time needed to acquire an image. A second deficiency associated with traditional autofocus subsystems is that, since the autofocus operation is carried out at discrete intervals in time, the z axis position of the instrument may drift, between autofocus intervals. Decreasing the interval between autofocus operations, in order to minimize z-axis drift, results in further increase in data-collection times. Yet another problem associated with autofocus operations is that, since the autofocus operation itself is carried out, over time, by moving the electromechanical stage through a range of z positions, instrument and environmental instabilities may change during the autofocus operation, significantly decreasing the accuracy at which the instrument focal point position can be determined and z-axis drift corrected.

Figure 6:
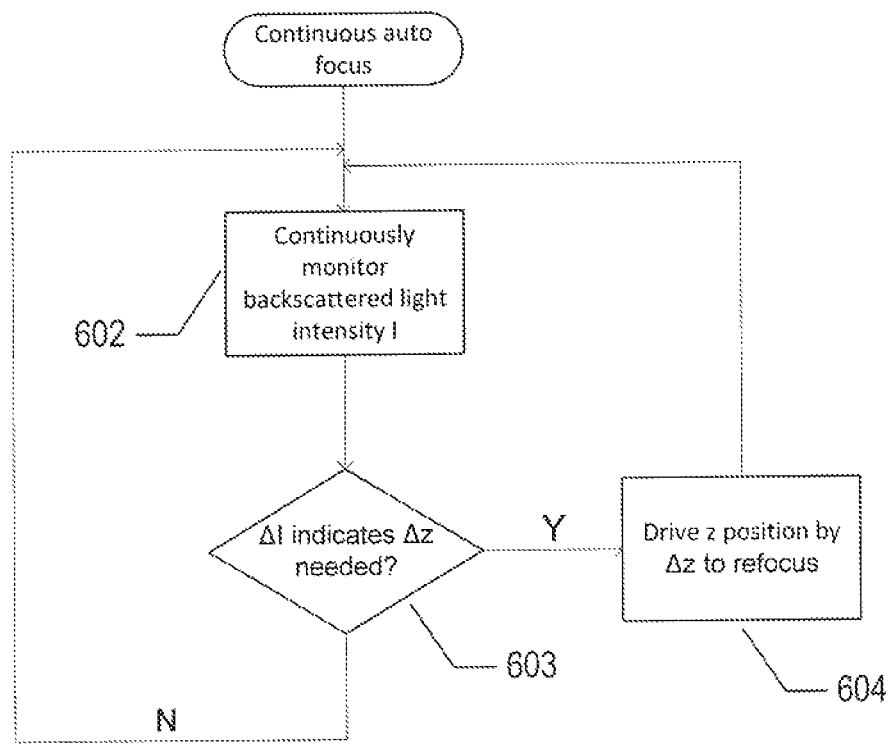
FIG. 6 provides a control-flow diagram that illustrates continuous autofocus.

Certain embodiments of the present invention are directed to a continuously operating, rapid autofocus module that operates asynchronously with respect to operation of other optical-instrument components and subsystems, including translations of the electromechanical stage and image-acquisition operations. FIG. 6 provides a control-flow diagram that illustrates continuous autofocus. The continuous, asynchronous autofocus operation is represented by a continuously executing loop of steps 602-604. In step 602, the z-axis position of the interface between the cover slip and sample media is continuously monitored, in one embodiment, by computing the z-axis position at which backscattered light from this interface produces highest intensity on an autofocus-module photodetector. When the z-axis position of the interface relative to the objective lenses changes, or when another z-axis position relative to the objective lenses changes, the electromechanical stage is drive through a small correction distance $\Delta z$, in step 604, to maintain a constant distance between the objective lens and a particular point or surface within a sample. Because the autofocus module continuously operates, without interrupting operation of other components of an optical instrument, data-collection times are not impacted, and the focus of the optical instrument can be maintained more stably and with greater precision over time than by traditional autofocus modules. Because the autofocus module continuously and rapidly recomputes the z-axis position of the far interface of the cover slip with sample media, the z-axis position of the objective lens relative to the interface of the cover slip can be continuously determined with greater accuracy than by traditional autofocus modules, since the amount of time needed for each autofocus operation is much smaller than in traditional autofocus modules, and therefore the maximum amount of drift that can occur during the autofocus operation is less, in the described implementations, than in traditional autofocus modules.

Figure 7A:
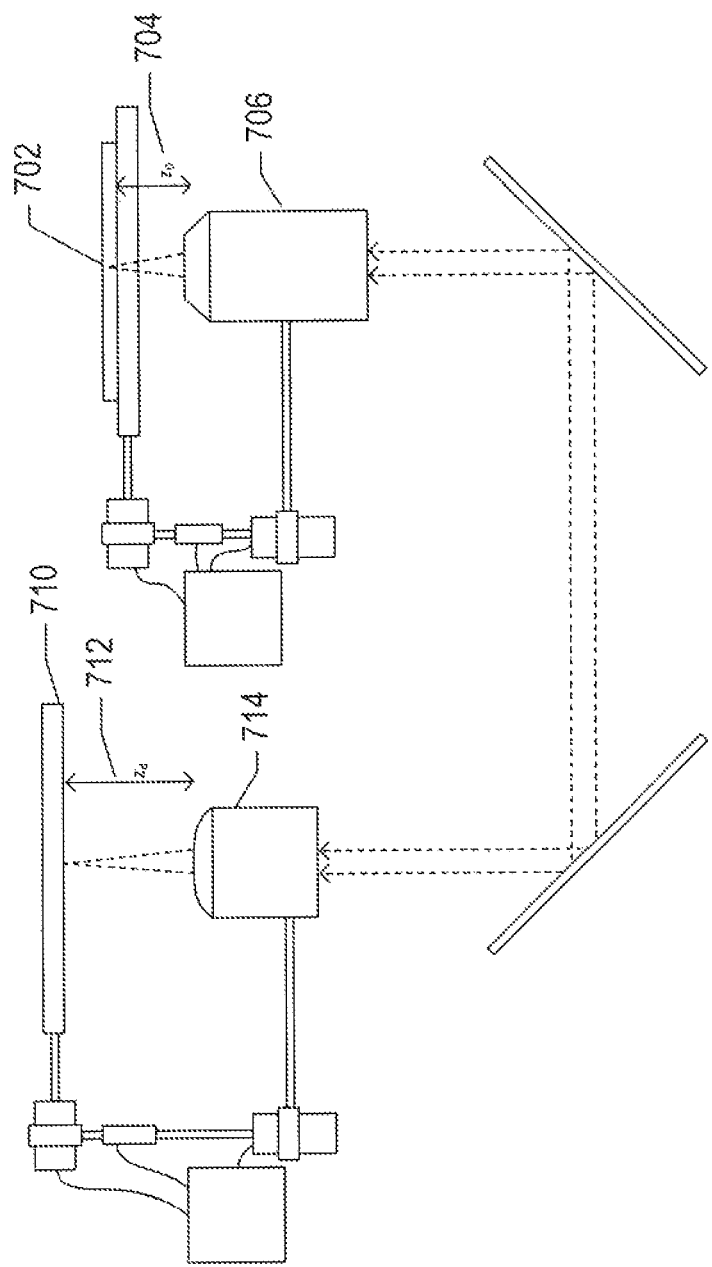
FIG. 7A-C illustrate a z-axis scan independent from the electromechanical stage of the fluorescence microscope discussed above with reference to FIGS. 1A-C and FIG. 3.
Figure 7B:
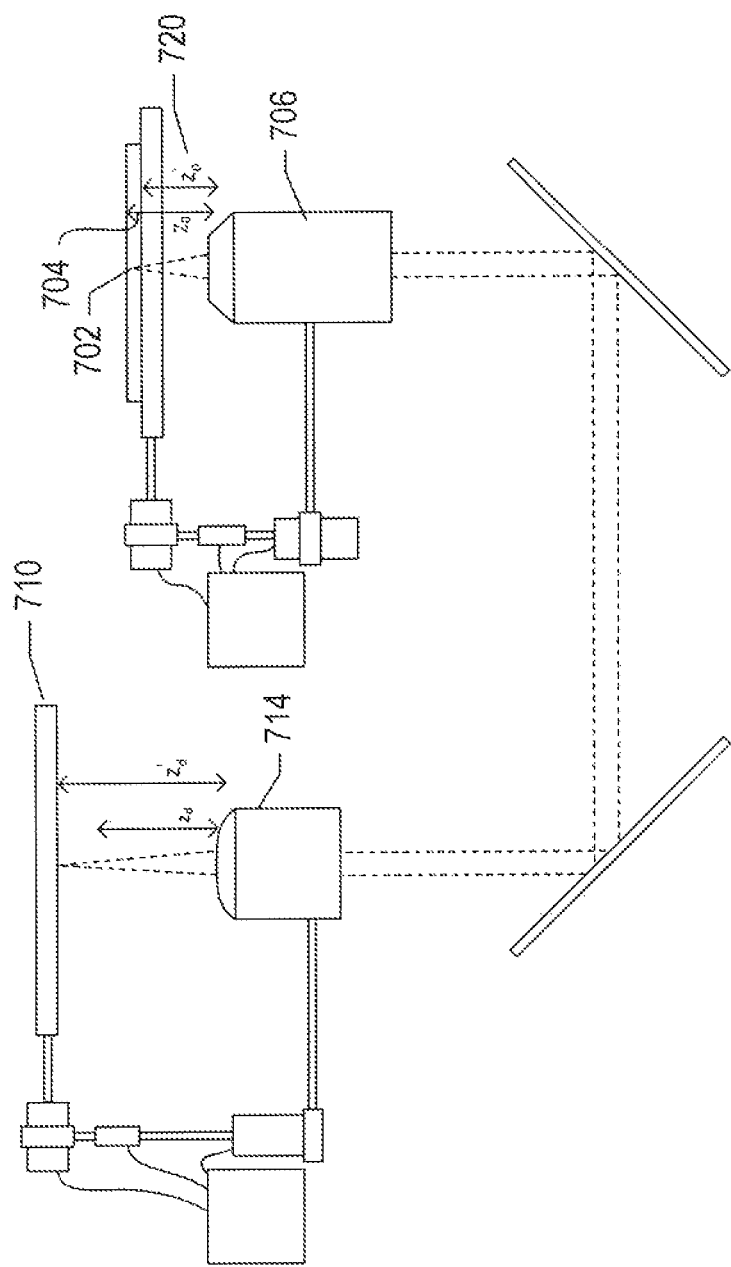
Figure 7C:
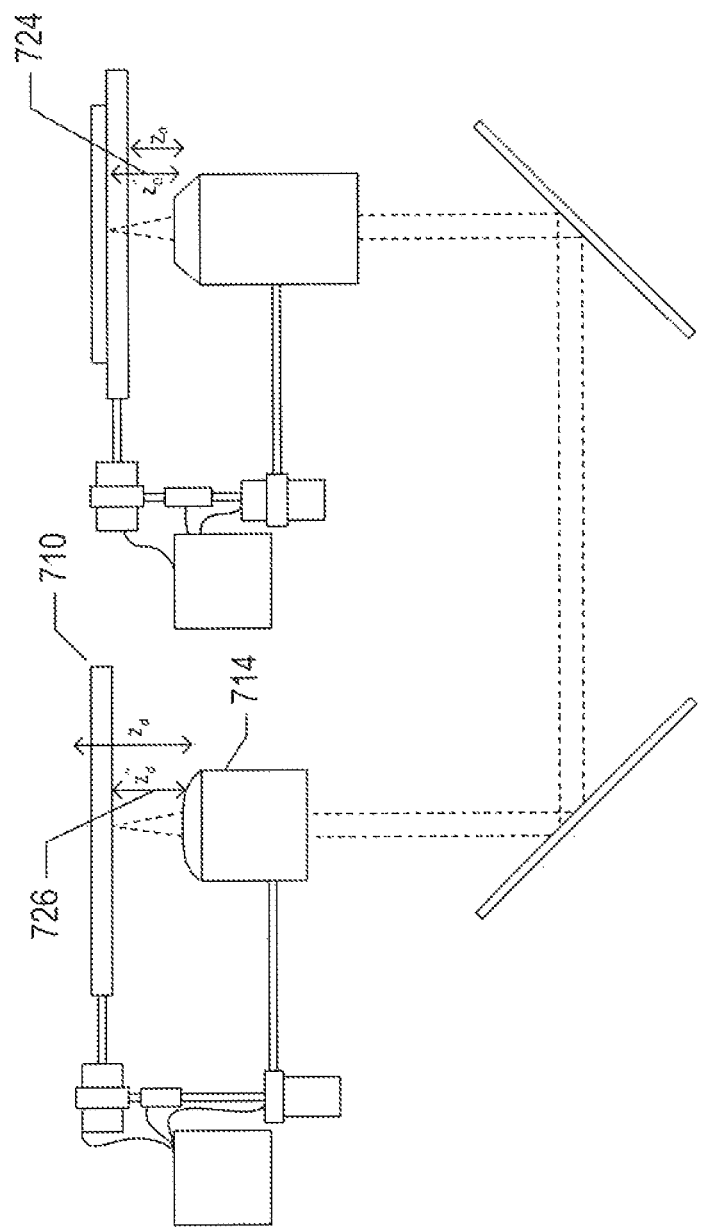

FIG. 7A-C illustrate a z-axis scan independent from the electromechanical stage of the fluorescence microscope discussed above with reference to FIGS. 1A-C and FIG. 3. FIGS. 7A-C illustrate a hypothetical system, similar to that shown in FIGS. 1A-C and 3, in which a detector within an autofocus module can be moved relative to a tube lens at the same time that a sample is moved relative to the objective lens in the z direction. In FIG. 7A, a point on the inner interface of the cover slip is held at a particular z-axis position $z_0$ 704 from the objective lens or lenses 706. Backscattered light from the inner surface of the cover slip is focused onto a detector 710 held at a fixed z-axis position $z_d$ 712 relative to a focusing lens 714. In FIG. 7B, the mechanical stage has been moved closer to the objective lens, and the distance between the inner interface of the cover slip 702 to the objective lens 706 is now $z_0'$ 720, rather than the initial distance $z_0$ 704 shown in FIG. 7A. The detector 710 in the autofocus module has been moved a corresponding distance away from the focusing lens 714, so that the backscattered light from the inner cover-slip interface 702 remains focused 706 on the detector. Similarly, as shown in FIG. 7C, when the stage is moved further from the objective than in FIG. 7A, with a distance between the inner cover-slip interface and objective of $z_0''$ 724, the detector 710 needs to be moved closer toward the focusing lens 714, with the result that the detector and focusing lens are separated by a shorter distance $z_d''$ 726, in order than the backscattered light from the inner cover-slip interface remains focused on the detector 706.

A z-axis scan can be carried out not only by moving the stage platform in the z direction relative to the objective lens, but can also be carried out by moving an autofocus-module detector relative to an autofocus-module focusing lens along the optical axis of the autofocus subsystem. When the detector is moved through a range of z positions relative to the focusing lens within the autofocus module, one z position within the range will correspond to the focal point of the focusing lens within the autofocus module, which, in turn, corresponds to the current distance in the z direction between the objective lens and an interface of the cover slip in the optical axis of the optical instrument. Changes in the distance between the objective lens and cover-slip interface, which the autofocus module seeks to detect and correct for, are reflected in changes in the focal length of the focusing lens at which backscattered light from the cover-slip interface is focused onto the autofocus module detector. Thus, a detector that can be physically or logically moved, in the z-axis direction, within the autofocus module with respect to a focusing lens, and that can determine when backscattered light from a cover-slip interface is focused on the detector, can be used to determine a position $z_d$ of the detector relative to the focusing lens, within the autofocus module, corresponding to the current distance $z_0$ between the objective lens and the interface of the cover slip. This allows an absolute value for the distance between the objective lens and cover-slip interface $z_0$ to be determined by the relationship:

$$z_o = -\alpha \frac{1}{z_d}$$

The proportionality constant $\alpha$ can be determined from the geometry of the optical path shared by the autofocus module and optical instrument and characteristics of the autofocus-module focusing lens and the objective lens or lenses of the optical instrument.

Figure 8:
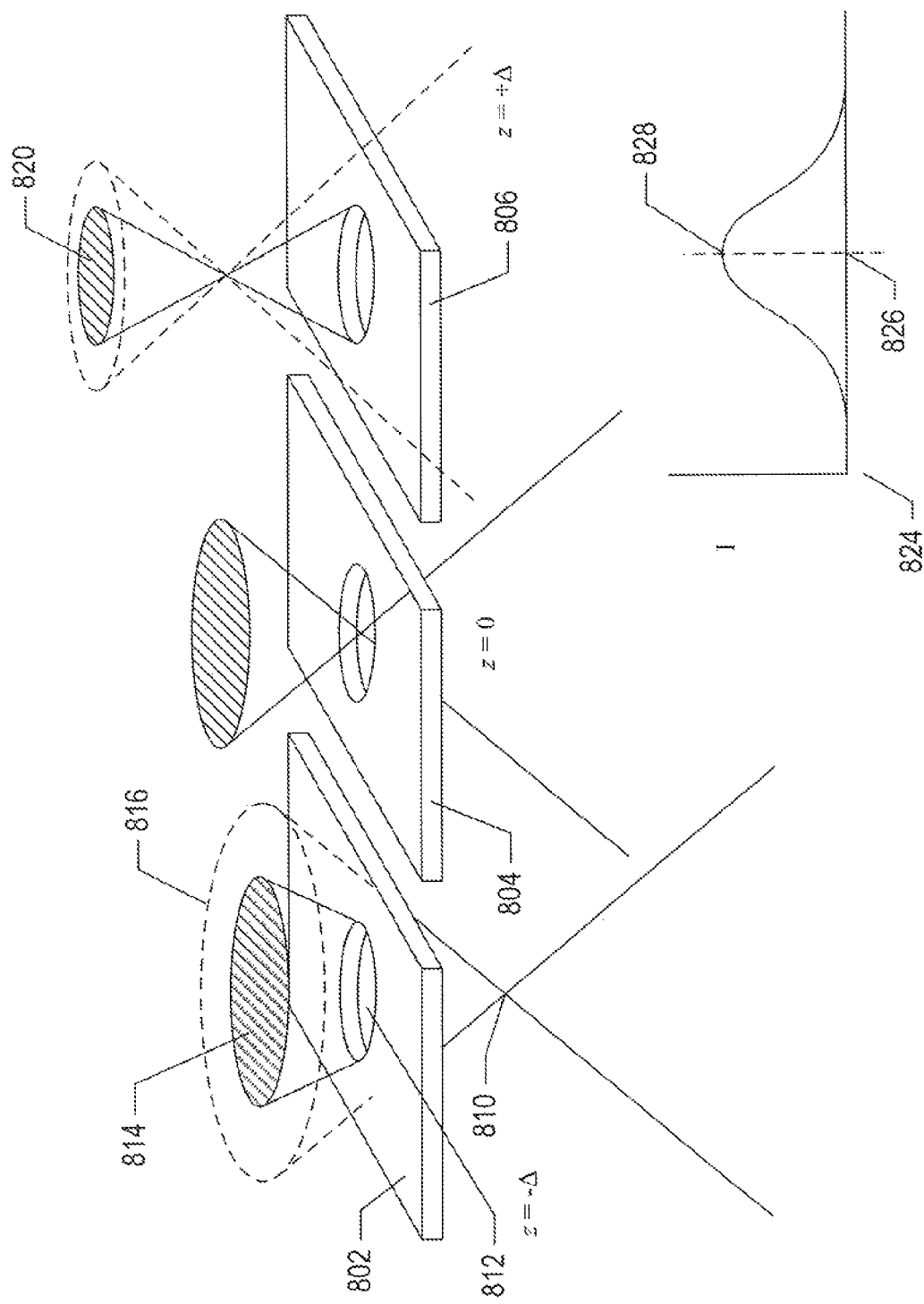
FIG. 8 illustrates a principal of operation of a small-aperture focal-point detector.

FIG. 8 illustrates a principal of operation of a small-aperture focal-point detector. In FIG. 8, a small circular aperture within an opaque material is shown 802, 804, and 806 with respect to three different focused light beams. The first light beam is focused at a point 810 below the circular aperture 812, as a result of which a portion of the light beam falls onto the back side of the opaque material, and only a central conical portion of the light beam with circular cross-section 814 is passed through the circular aperture. Were the light beam not partially blocked by the opaque material, the circular cross-section 816 of the light beam, at the same distance from the focal point as circular cross-section 814, would have a greater diameter and area. Thus, the decrease in intensity of the light after passing through the aperture is proportional to the ratio of the area of circular cross-section 814 to the area of circular cross-section 816. When a light beam is focused at a point coincident with the aperture, as in example 804 of FIG. 8, all of the incident light passes through the aperture and the intensity of the light passed through the aperture is equal to the intensity of the light beam prior to passing through the aperture. When the focal point of the input light falls beyond the aperture, as shown in the third example 806 in FIG. 8, a portion of the input light prior to the focal point falls onto the back side of the opaque material; thus, as in the case 802, only a portion 820 of the focused light beam passes through the aperture. Thus, a photodetector, placed behind a small circular aperture, which measures the intensity of a light beam passing through the small circular aperture can be used to indicate when the focal point of an input focused beam of light falls within the aperture. For example, a plot of the intensity detected by the photodetector versus the z position of a focusing lens relative to the circular aperture reveals the z=0 826 z-axis position of the pinhole aperture relative to the focusing lens at which the light is focused by the focusing lens within the aperture as the point on the horizontal axis of the plot 824 corresponding to the peak of measured intensity 828.

A mechanical drive for moving the detector relative to a focusing lens, as discussed with reference to FIGS. 7A-C, in which the detector comprises a photodetector placed at an appropriate distance behind a pinhole aperture, as shown in FIG. 8, could be used for determining the distance $z_d$ between the pinhole aperture and focusing lens corresponding to the focal point of light backscattered from a cover-slip interface. However, a mechanically movable detector would be expensive, and suffer the same time delays associated with scanning in the z direction by the optical instrument. Rather than using a focal-point detector that can be scanned in the z direction, as in FIGS. 7A-C, certain implementations employ a fixed photodetector and rapidly translating pinhole aperture or rapidly, incrementally extending the focused beam to carry out z-axis scans within an autofocus module.

Figure 9A:
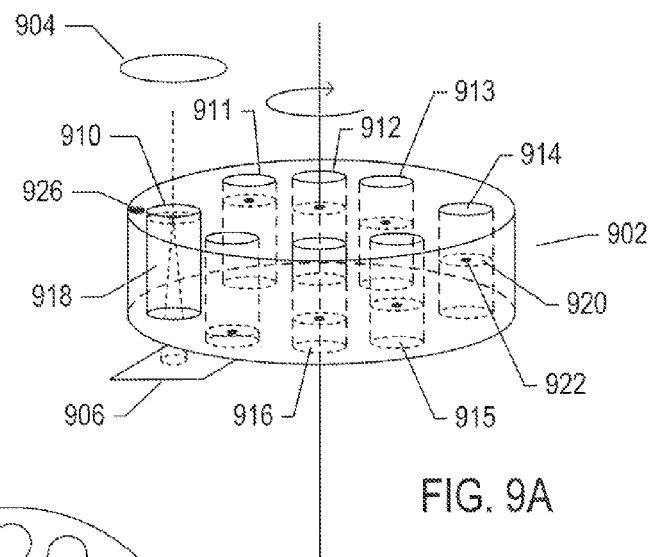
FIGS. 9A-C illustrate a pinhole-aperture rotor.
Figure 9B:
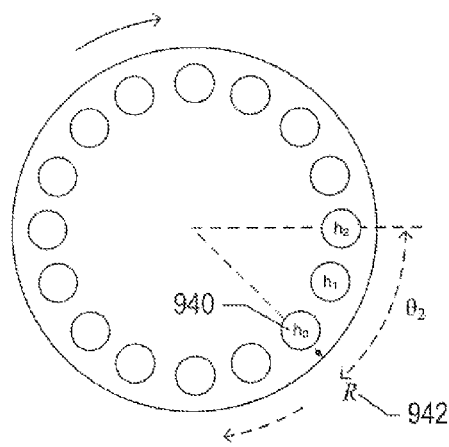
Figure 9C:
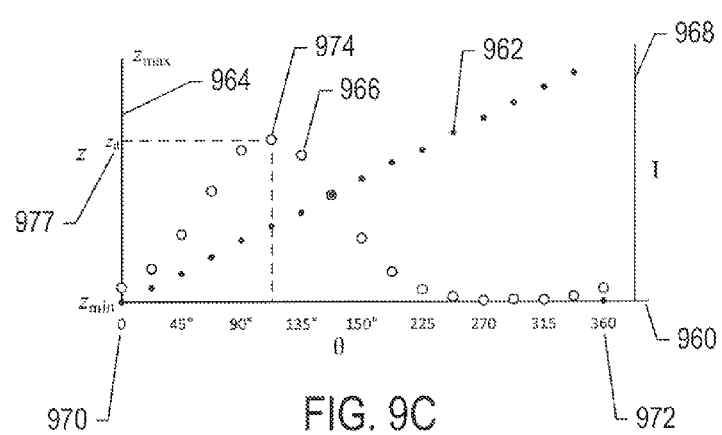

FIGS. 9A-C illustrate a pinhole-aperture rotor. The pinhole-aperture rotor 902 is interposed between a focusing lens 904 of an autofocus module 904 and a photodetector 906 within the autofocus module that measures the intensity of light falling on the photodetector. The pinhole-aperture rotor 902 includes a number of vertical, cylindrical shafts through which light passes from the focusing lens 904 to the photodetector 906 when the vertical, cylindrical shaft is rotated to a position between and aligned with the focusing lens and photodetector, as is vertical, cylindrical shaft 918 in FIG. 9A. Each vertical, cylindrical shaft contains an opaque disk with a central pinhole, such as opaque disk 920 with central pinhole aperture 922 within vertical, cylindrical shaft 914. The opaque disks are located at different distances from the top plane of the pinhole-aperture rotor in each of the different vertical, cylindrical shafts. As shown in FIG. 9A, the distance between the top plane of the rotor and the pinhole aperture increases linearly with increase in the numeric labels of the vertical, cylindrical shafts, forming a range of z-axis positions of pinhole apertures within the vertical, cylindrical shafts of the pinhole-aperture rotor 902. The pinhole-aperture rotor 902 includes at least one physical index 926 that can be read by an index detector within the autofocus module to determine when a particular vertical, cylindrical shaft is positioned to transmit light from the focusing lens 904 to the photodetector 906. Detection of the position of the physical index 926 and knowledge of the rotational speed of the pinhole-aperture rotor can together be used to compute times at which each vertical, cylindrical shaft is aligned to pass light from the focusing lens to the photodetector as the pinhole-aperture rotor is rotated at a constant speed by an electrical motor. The physical index may be a magnetic disk, light-emitting diode, reflective plate, or other type of physical index, the position of which can be determined quickly by an index detector, such as an electromagnetic coil, photodetector, or laser/photodetector, as the physical index rotates through a particular position.

FIG. 9B shows the pinhole-aperture rotor when viewed in a direction parallel to the z axis. When a first vertical, cylindrical shaft 940 is aligned with a focusing lens and a photodetector at a reference position R 942, the remaining vertical, cylindrical shafts $h_1$-$h_{n-1}$ are positioned at increasing rotational angles $\theta_1$-$\theta_{n+1}$ with respect to the aligned, vertical, cylindrical shaft 940. In the plot provided in FIG. 9C, where the rotational angles of the pinhole-aperture rotor are plotted over a range of 0 to 360 degrees with respect to the horizontal axis 960, filled-in circles, such as filled-in circle 962, represent z positions of each pinhole aperture with respect to the photodetector, plotted with respect to a left-hand vertical z-position axis 964, and open circles, such as open circle 966, represent intensity detected by the photodetector plotted with respect to a right-hand vertical intensity axis 968. As the pinhole-aperture rotor rotates from 0 degrees (970 in FIG. 9C) to 360 degrees (972 in FIG. 9C), the distance between the pinhole aperture within the currently aligned vertical, cylindrical shaft and photodetector increases while the measured intensity at the photodetector peaks 974 at a particular rotational angle 976 corresponding to a particular pinhole-aperture-to-photodetector $z_d$ distance 976. Thus, the combination of a rotating pinhole-aperture rotor 902 and fixed-position photodetector 906 can be used to rapidly and repeatedly scan through z-axis positions within an autofocus module to determine a distance $z_d$ between a pinhole aperture and focusing lens at which the measured intensity is greatest. That distance is related, as discussed above, to the distance between the objective lens and an interface of the cover slip in the optical instrument.

Figure 10A:
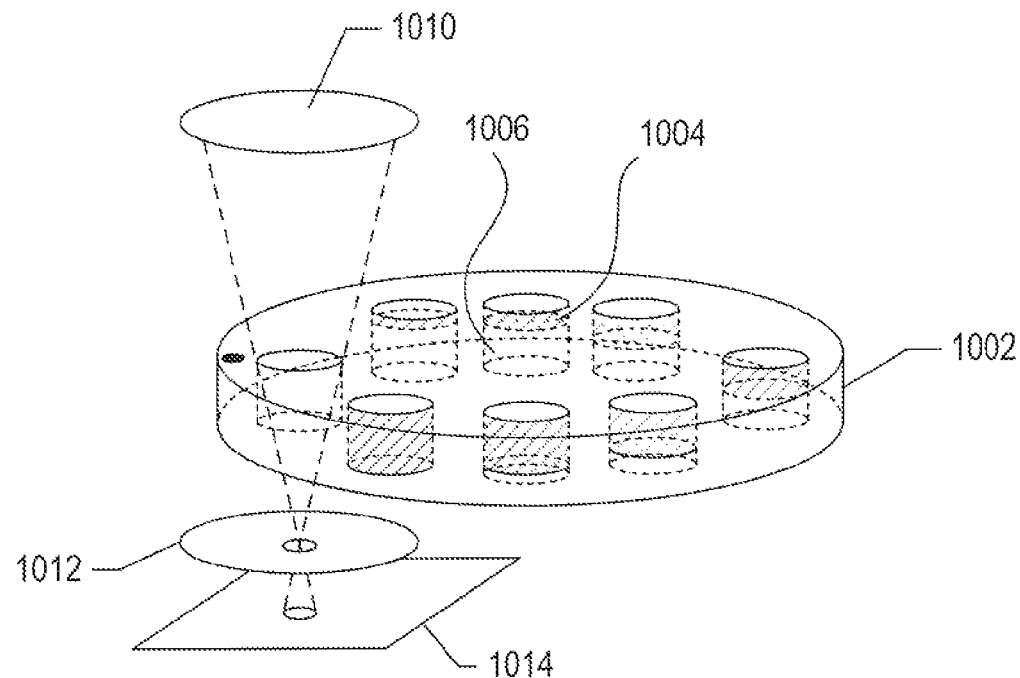
FIGS. 10A-B illustrate a different type of autofocus rotor.
Figure 10B:
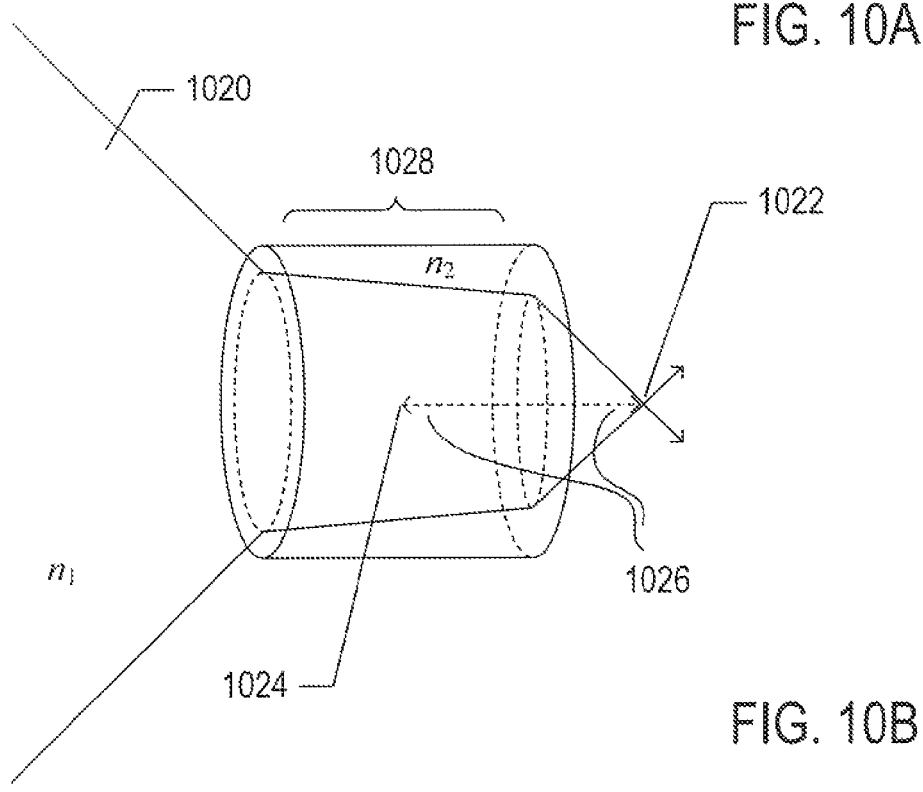

FIGS. 10A-B illustrate a different type of autofocus rotor. As shown in FIG. 10A, rather than placing pinholes at different distances within vertical, cylindrical shafts of an pinhole-aperture rotor, as in FIG. 9A, a path-extending rotor 1002 may instead include solid cylindrical rods of glass or another transparent material of various heights, or thicknesses, within the cylindrical, vertical shafts of the path-extending rotor. Alternatively, rather than having varying heights, the solid cylindrical rods may have equal heights, but may be composed of different materials with different refractive indexes. In essence, these can be thought of as disk-shaped windows that provide varying degrees of focus-extension, or focus-extension lengths. In FIG. 10A, the focus-extension windows are indicated by cross-hatching, such as window 1004 within cylindrical vertical shaft 1006 of the path-extending rotor 1002. The path-extending rotor is rotated so that successive vertical, cylindrical shafts are aligned with an optical path between the focusing lens 1010 and a pinhole aperture 1012 positioned above a photodetector 1014. As shown in FIG. 10B, a transparent cylindrical rod of a material with index of refraction $n_2$ is greater than that of air $n_1$ refracts an input focused beam 1020 in a way that extends the distance of the focal point 1022 of the focused beam from the focal point 1024 that the beam would have in the absence of the transparent cylindrical rod by a distance 1026 proportional to the height 1028 of the cylindrical rod. Thus, by including windows of increasing thicknesses or increasing refractive index in the path-extending rotor 1002, and by rotating the rotor to successively scan through the vertical, cylindrical shafts containing the windows, the path-extending rotor can be used, just as the pinhole-aperture rotor 902 in FIG. 9A, to effect a z-axis scan within an autofocus model. Rotation of the path-extending rotor produces z-axis/intensity plots with respect to rotation angle similar to plot 9C for the pinhole-aperture rotor 902 in FIG. 9A.

Figure 11:
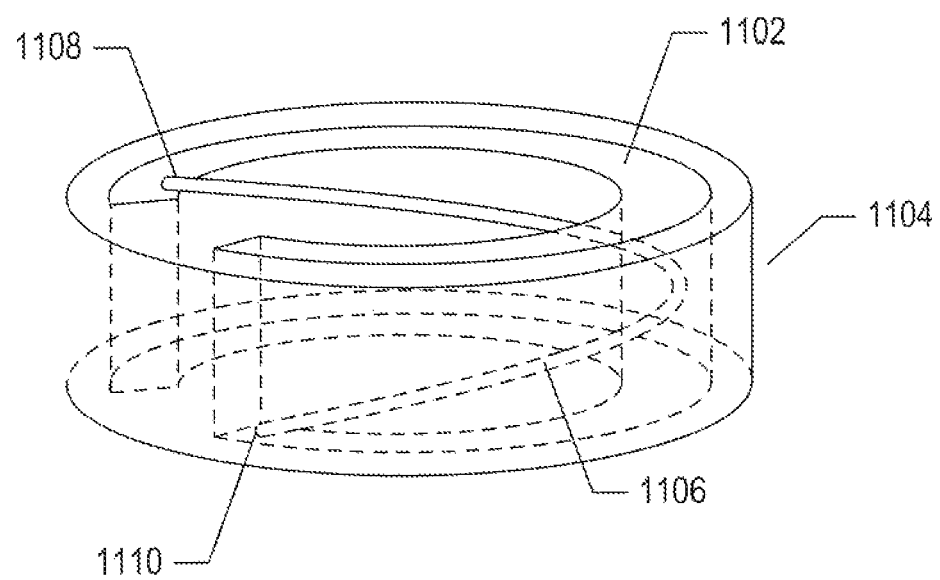
FIG. 11 shows a third type of autofocus rotor.

FIG. 11 shows a third type of autofocus rotor. This rotor is similar to the pinhole-aperture rotor shown in FIG. 9A, with a difference that, rather than using a series of vertical, cylindrical shafts, an almost circular slot 1102 within a rotor 1104 is employed, with a helical slit aperture 1106 and surrounding opaque helically formed material forming a continuous slit aperture that continuously descends, in z-axis position from a maximum z position 1108 to a minimum z position 1110. In additional embodiments, spoke-like members are employed to hold the inner portion of the slit-aperture rotor to the outer portion of the slit-aperture rotor.

The various autofocus rotors discussed above with reference to FIGS. 9A-11 feature uniformly decreasing or increasing z position of apertures or uniformly increasing or decreasing window thicknesses, in the case of the path-extension rotor, with rotation or displacement angle, with a single discontinuity, such as the discontinuity between z position of pinhole apertures between vertical shafts 917 and 918 in FIG. 9A. However, particularly when physical indexes are used to identify each vertical, cylindrical shaft, the z positions or window thicknesses may be arbitrarily varied, with rotation angle, and measured intensities mapped to z position by a mapping table or function. Even in the case that only one or a few physical indices are used, an arbitrary arrangement of window thicknesses or z positions can be computationally managed by an autofocus subsystem, provided that the window thickness or z position of the aperture within the vertical shaft at each displacement angle of the rotor is known and available in memory or on a mass-storage device. In certain implementations, multiple vertical shafts may contain identical windows or z positions of apertures, and, in certain cases, the z positions or window thicknesses may vary sinusoidally, so that there are no discontinuities in window thickness or z position with rotor rotation.

Figure 12:
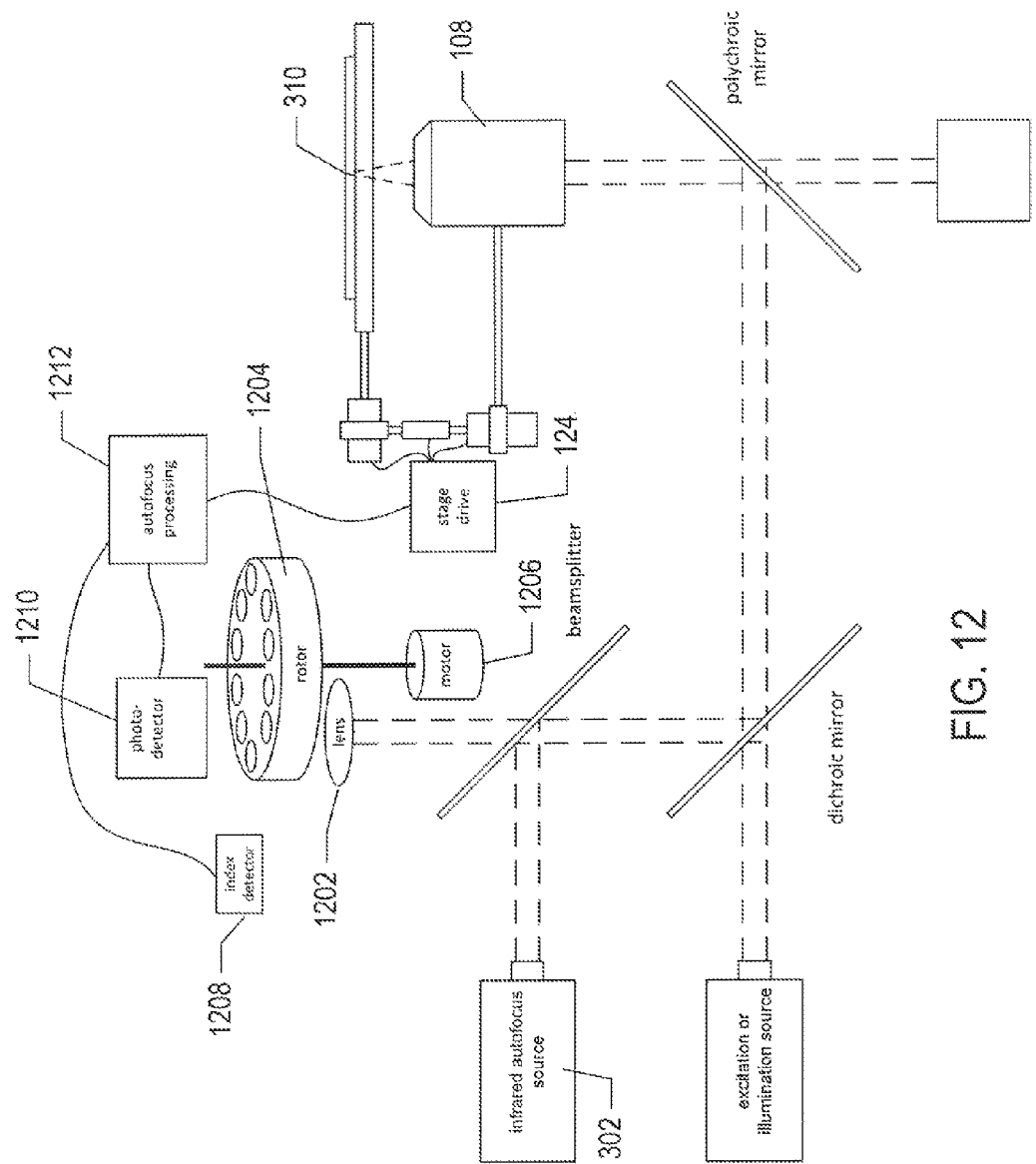
FIG. 12 illustrates an autofocus module incorporated within the optical path of a fluorescence microscope.

FIG. 12 illustrates an autofocus module incorporated within the optical path of a fluorescence microscope. FIG. 12 uses the same illustration conventions as used in FIGS. 1A-C, 3, and 9A-11. The autofocus module includes a focusing lens 1202, an autofocus rotor 1204 mounted to an axial shaft that is spun by an electrical motor 1206, a rotor-index detector 1208, a photodetector 1210, and an autofocus-processing component 1212 that computes z-axis position based on measured intensities of light passing from the focusing lens 1202 through the rotor 1204 onto the photodetector 1210 in a continuous fashion. In certain implementations, the rotor may be spun at speeds in excess of 1000 revolutions per minute, allowing computation of the distance between the objective lens and cover-slip interface to be computed at rates of ten per second or greater. The rotor 1204 may be an pinhole-aperture rotor, as discussed above with reference to FIGS. 9A-C, a path-extending rotor, as discussed above with reference to FIGS. 10A-B, a slit-aperture rotor, as discussed above with reference to FIG. 11, or another type of rotor that alone, or in combination with a pinhole aperture at a fixed distance with respect to the photodetector in the optical path between the focusing lens 1202 and photodetector 1210, carries out a z-axis scan of autofocus light produced by the autofocus light source 302 and scattered from a cover-slip interface 310. The autofocus-processing component 1210 continuously computes Δz corrections and issues Δz translation directives to the stage drive 124 in order to continuously reposition the mechanical stage so that the distance between the objective lens 108 and cover-slip interface 310 remains constant. The autofocus-processing component includes a microprocessor, logic circuits, or a combination of a microprocessor and logic circuits as well as an electronic memory that stores data related to autofocus-subsystem operations. As discussed above, while the described autofocus module employs light backscattered from a cover-slip interface, or light backscattered from another interface that has a fixed position relative to the sample, to compute the distance, in the z direction, between the objective and the cover-slip interface, the described autofocus module can be used to stably maintain a focal point of the objective lens with respect to the tube lens and detector of the optical instrument at an arbitrarily selected position within a sample. Again, the phrases "cover-slip interface" and "cover slip" are intended to broadly cover any of the various types of interfaces that can be employed as sources of backscattered autofocus light by an autofocus system. It should be noted that the described autofocus modules may be incorporated in various ways into optical instruments. In many cases, the autofocus module may be manually or automatically activated to carry out autofocus for specified or computed periods of time. In other cases, the autofocus subsystem may be activated programmatically, during certain types of image-acquisition modes. In all cases, the autofocus subsystem may be manually or automatically disengaged, during normal z-translations of the optical instrument and at other times.

FIGS. 13A-I illustrate one approach to computing the current distance between the objective lens and cover-slip interface of a microscope by the autofocus-processing subcomponent of an autofocus module. The method employs an array of shift registers 1302, an additional array of registers 1304, an array of summation operators 1306, three additional registers 1308-1310, a photodetector input 1312, and a rotor-index detector input 1314. The registers and register-components of shift registers have an appropriate size, in bits, to contain a numerical value equal to three times the maximum-valued intensity values reported by the photodetector, in the described computing subsystem. In general, 16-bit or 32-bit registers are of sufficient size for accurate z-position computation.

The z-position computation logic, embodied in circuits and/or firmware or software and illustrated in FIGS. 13A-I, computes the relative z position of a cover-slip interface with respect to the objective lens with a frequency equal to the rotation frequency of a rotor within an autofocus module. Photodetector input 1312 is a numerical value that represents the intensity of light detected by the photodetector at a particular point in time. Index detector input 1314 selects mappings between points in time and particular shift registers, as well as selecting points in time to carry out parallel shift operations, parallel summation operations, and other operation that together compute z positions at the frequency of rotor rotation within an autofocus module.

Figure 13A:
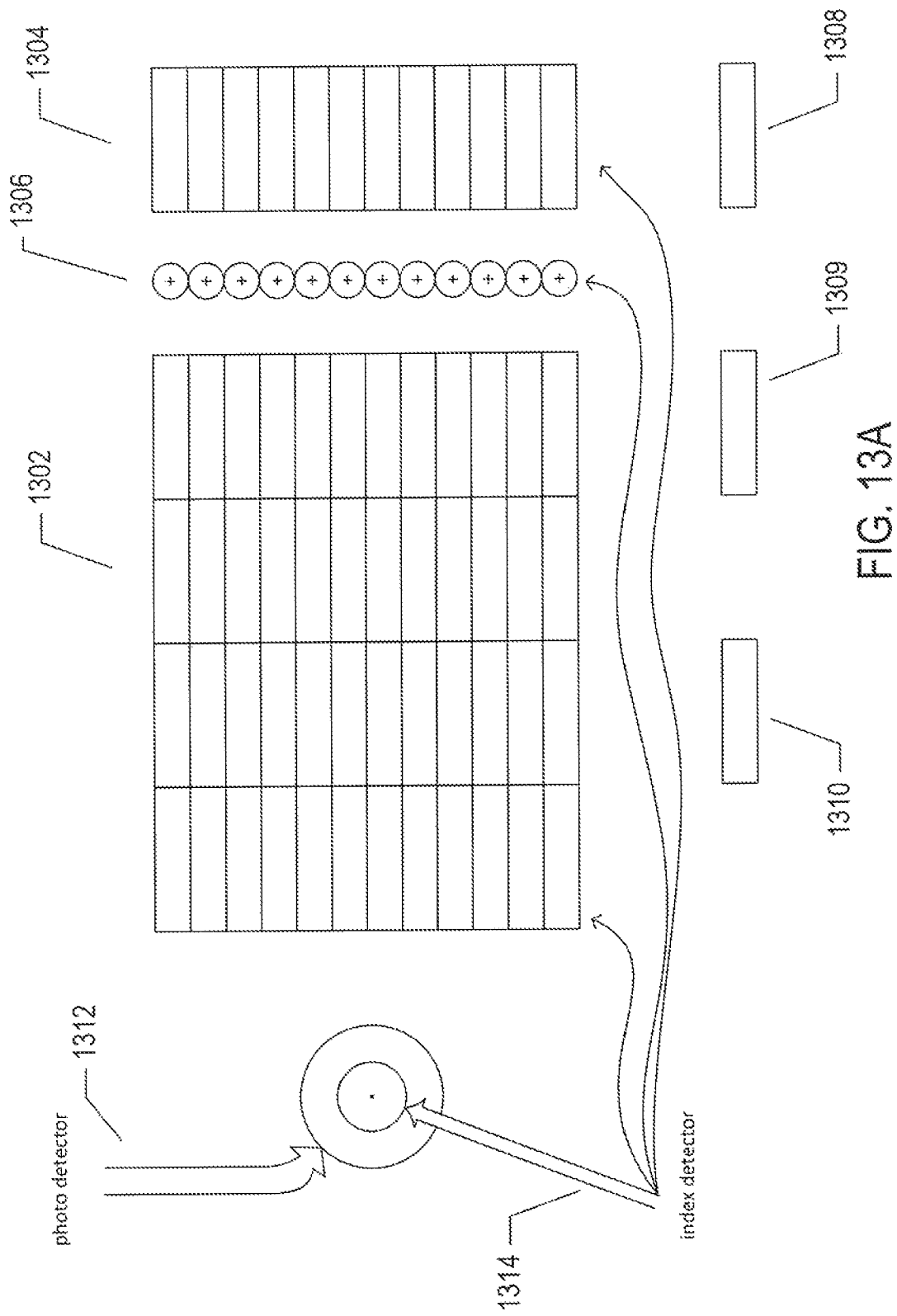
Figure 13B:
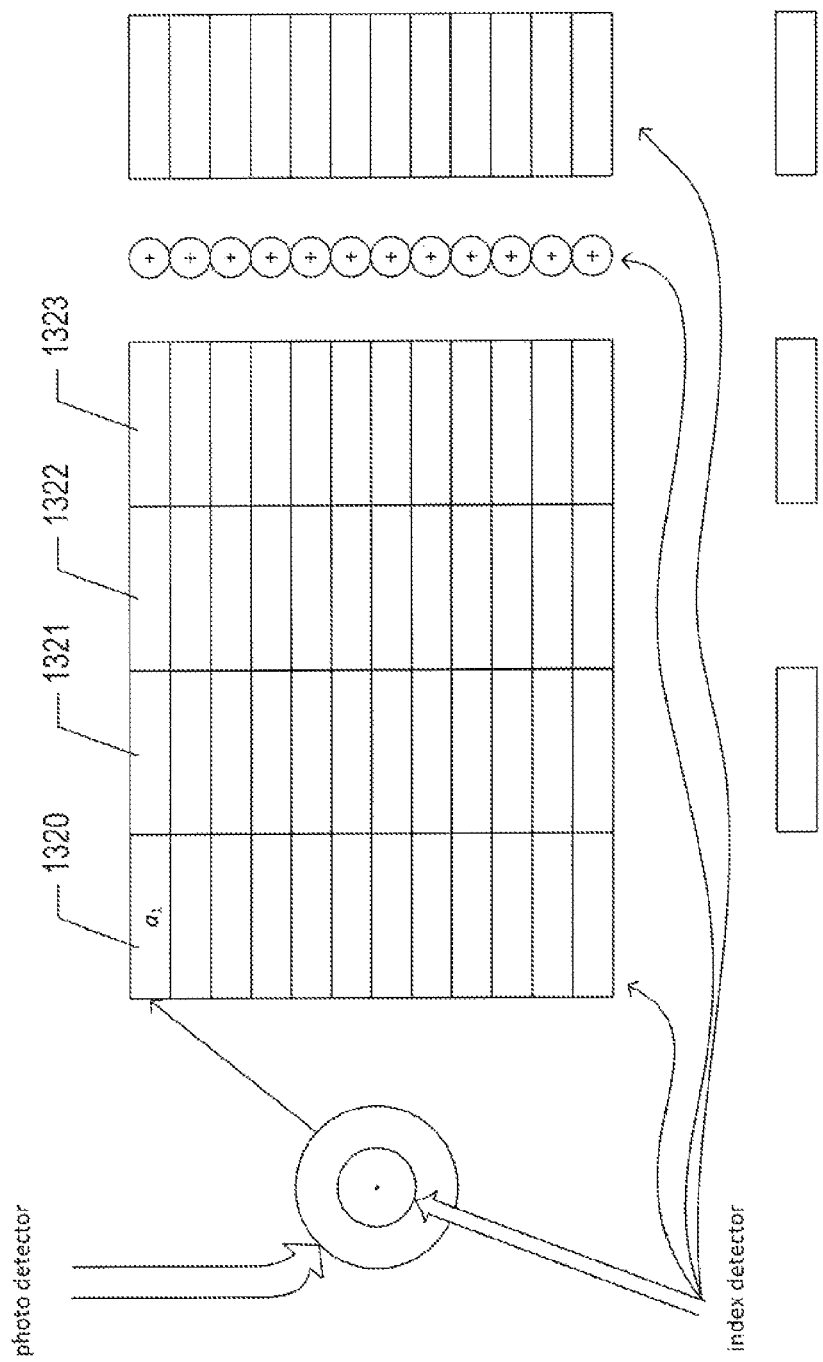
Figure 13C:
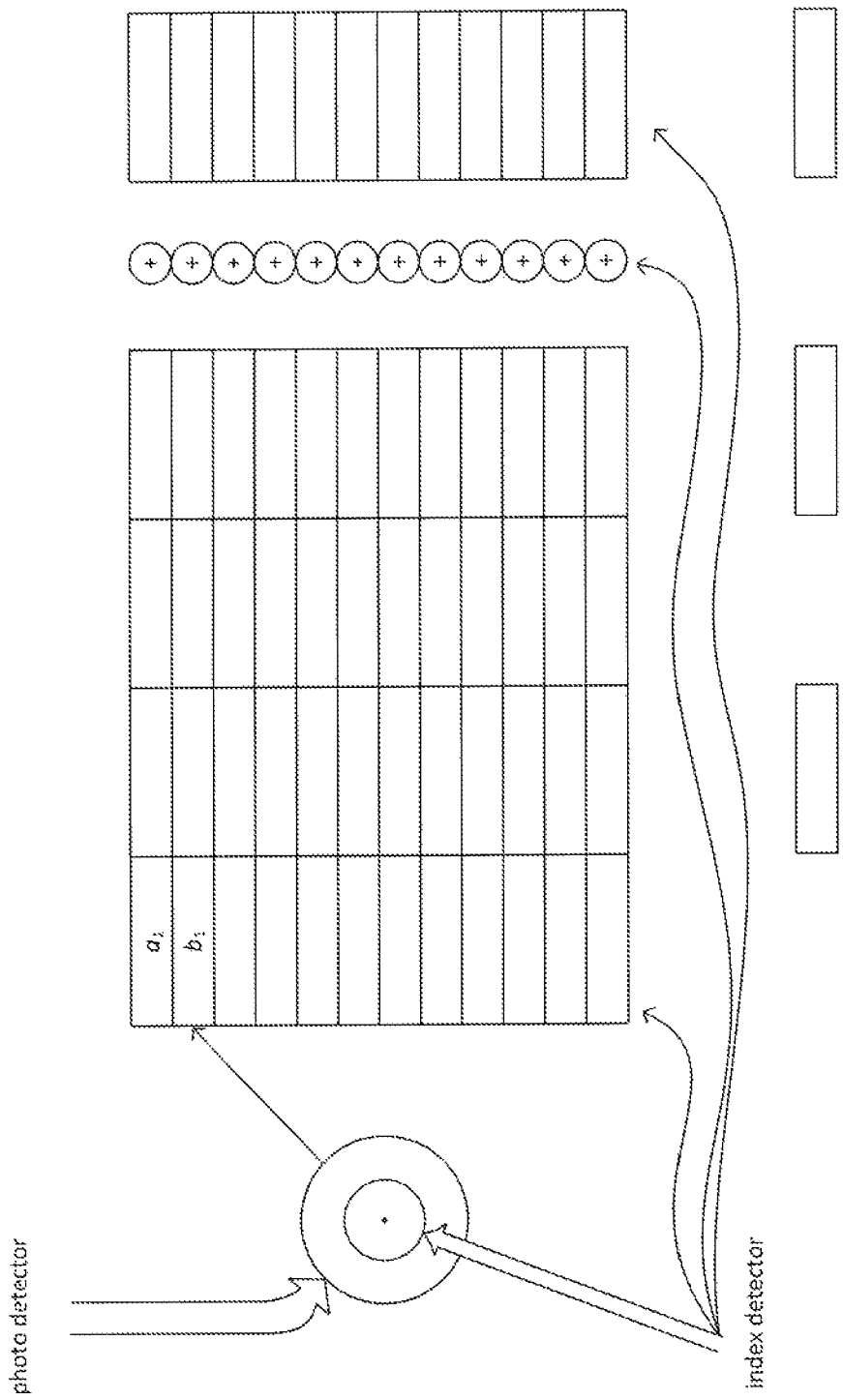
Figure 13E:
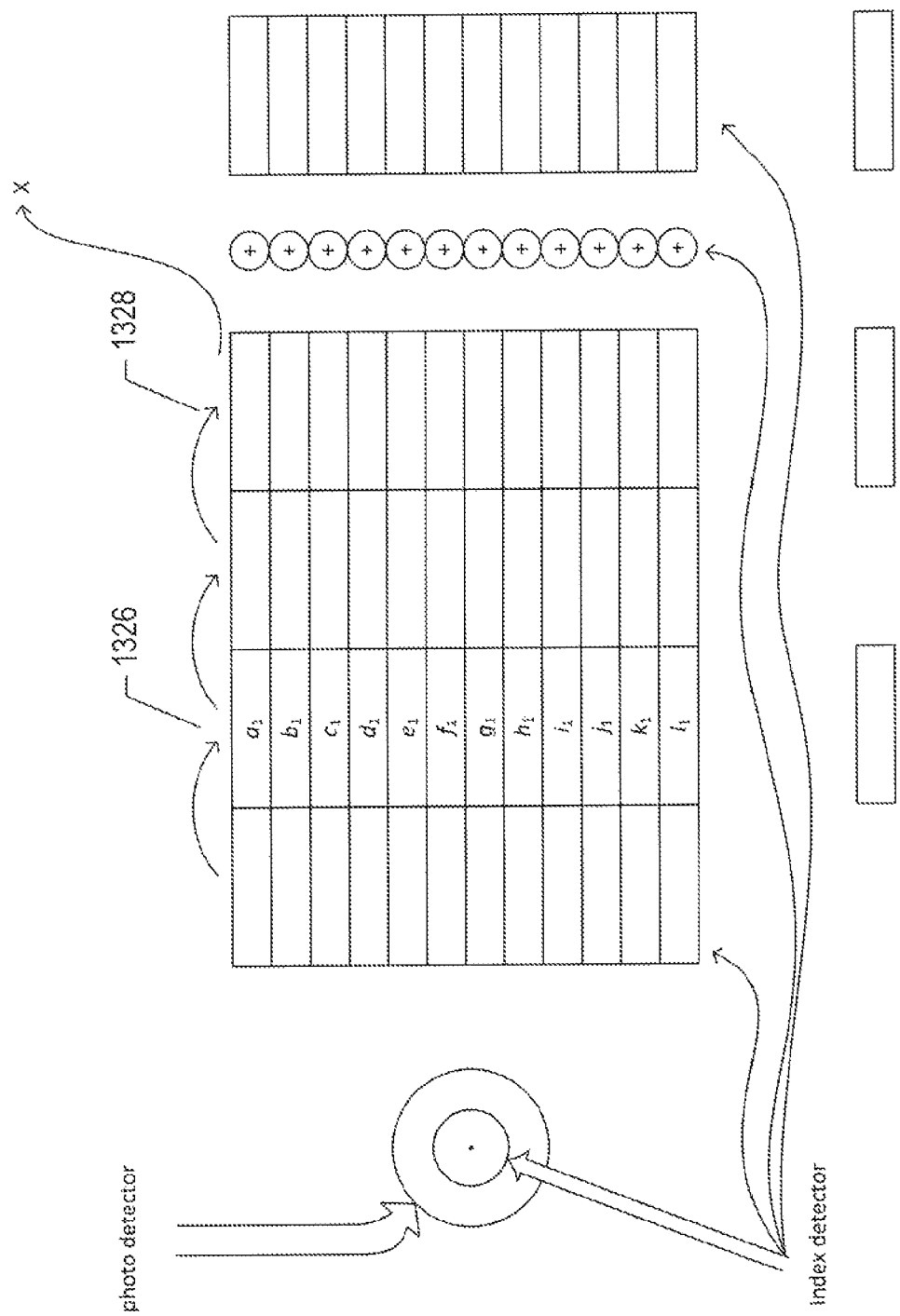
Figure 13F:
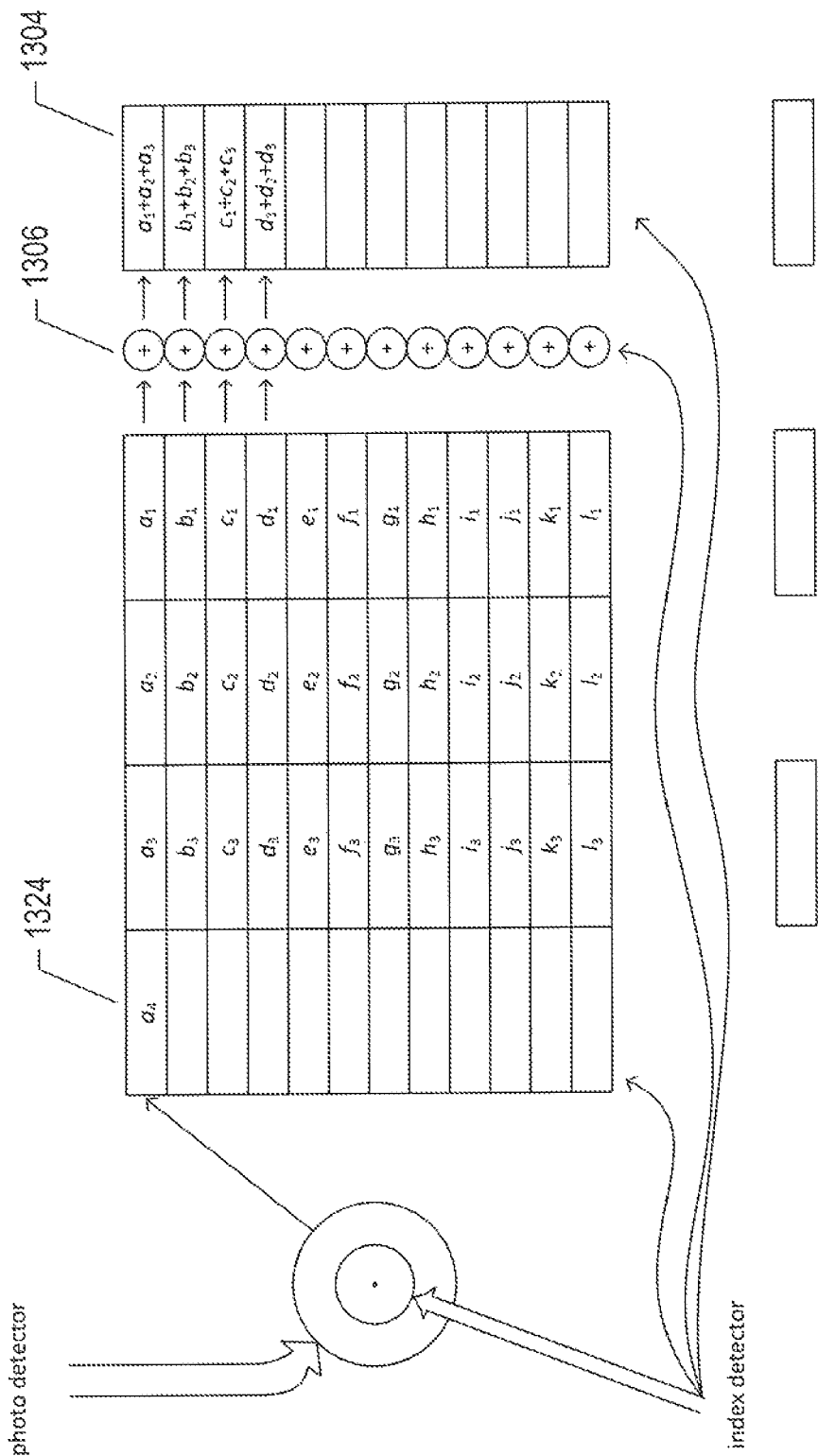
Figure 13G:
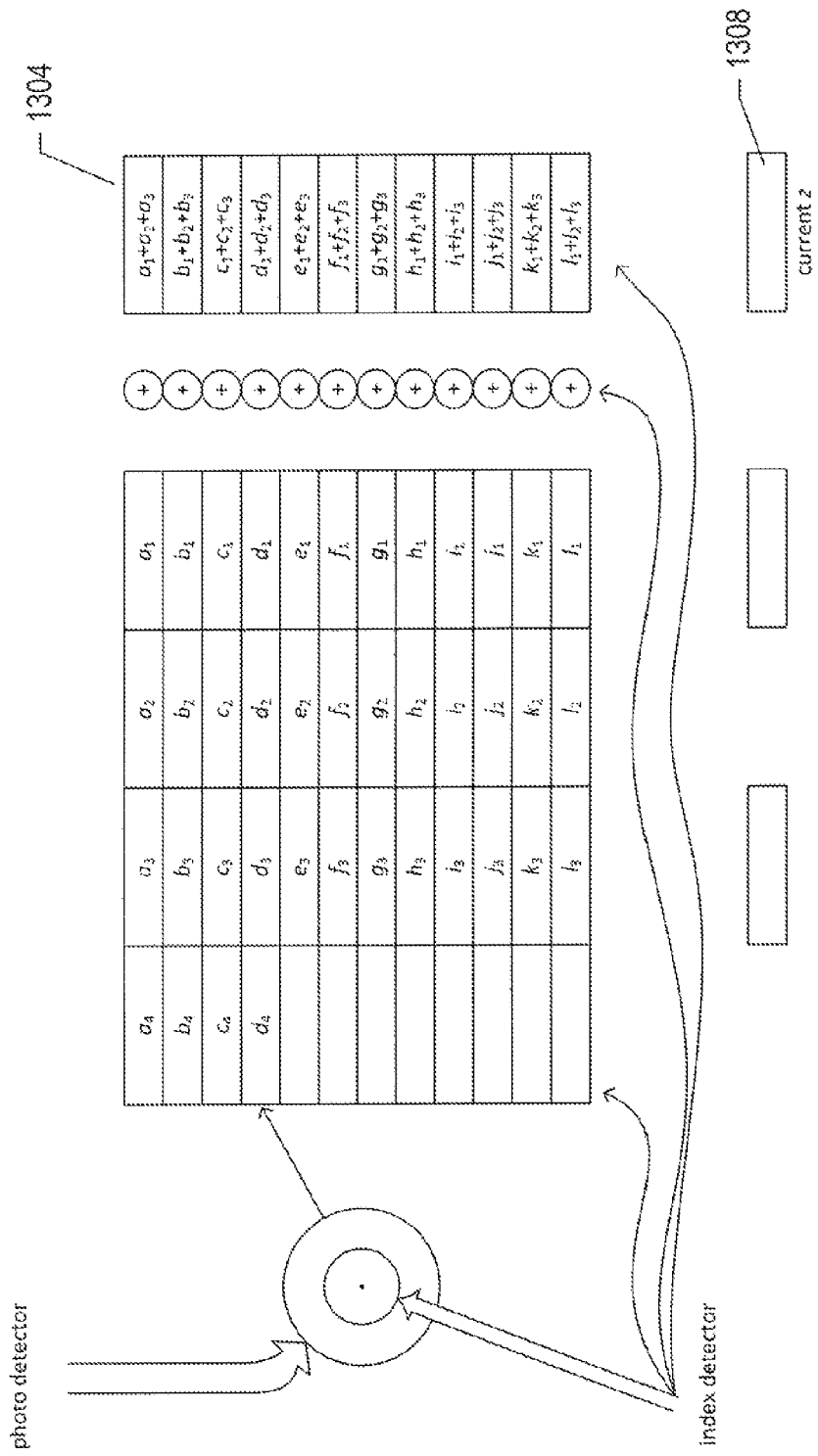
Figure 13H:
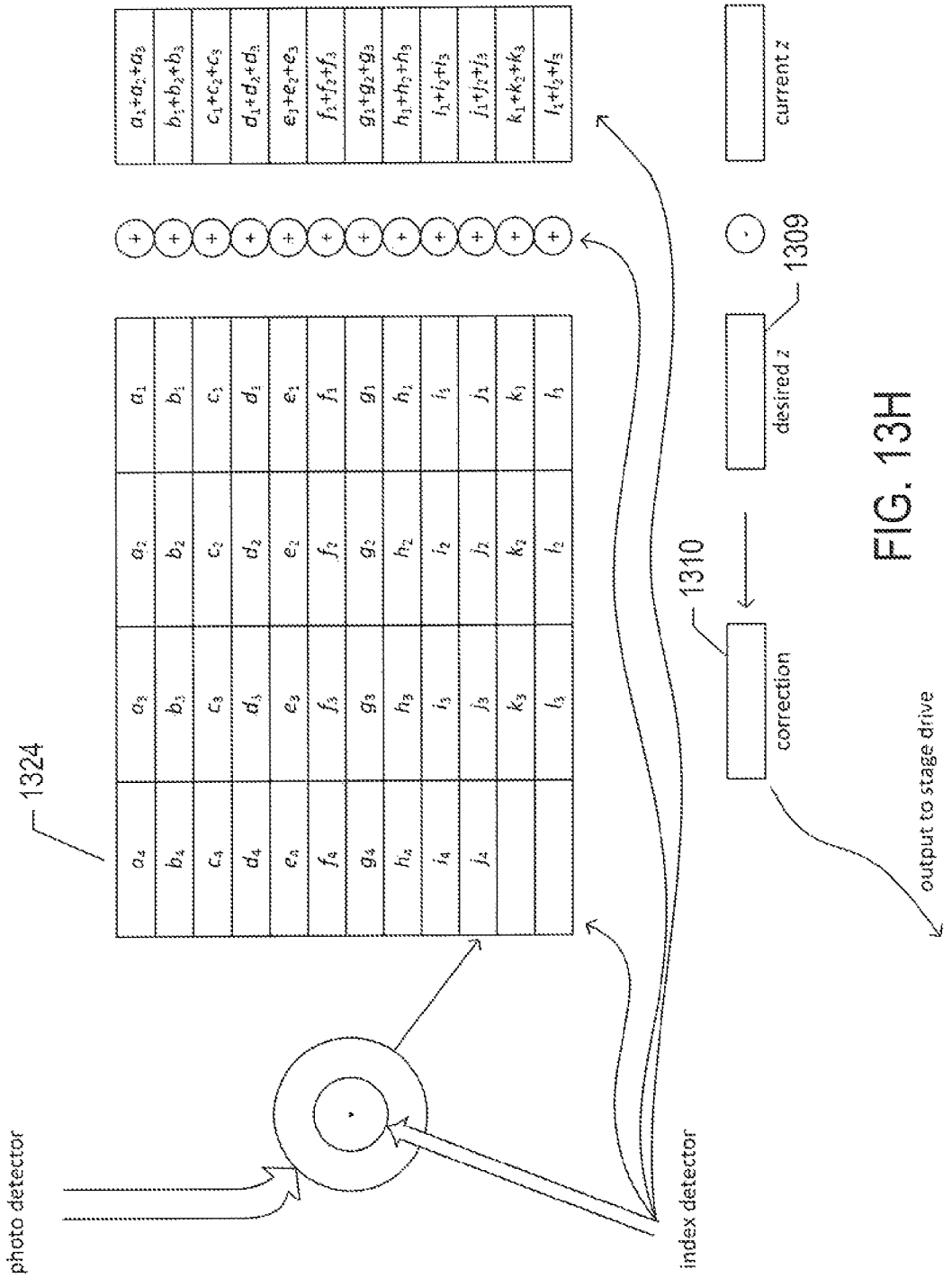
Figure 13I:
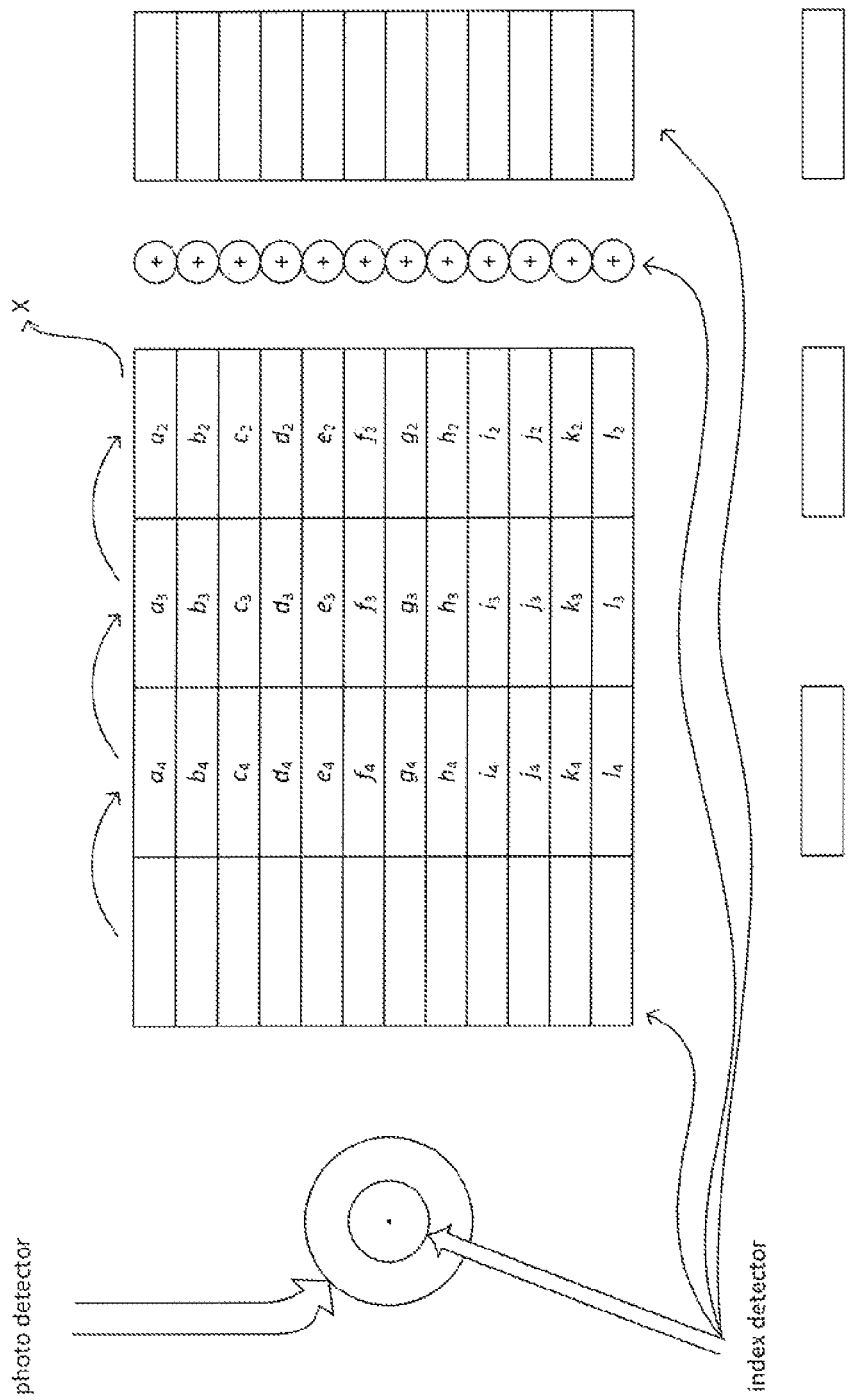

Computation is both highly parallel and includes asynchronous aspects. As shown in FIGS. 13B-D, as the rotor within the autofocus module rotates, and as the index detector determines points in time at which particular cylindrical holes of the rotor are aligned with the optical path of the autofocus module, photodetector intensity values are input into the first registers of each four-register shift register. In FIG. 13B, the intensity value $a_1$ corresponding to a first rotor shaft is placed into the first register 1320 of a first shift register comprising registers 1320-1323. In FIG. 13D, the rotor has made a complete revolution, resulting in intensity values placed into all of the first registers of the array of shift registers. Then, at the completion of one rotation, the parallel shift registers shift all of the values rightward by one place, as shown in FIG. 13E. Thus, the column of values 1324 in the array of shift registers is shifted, by the parallel shift operation, to column 1326 in FIG. 13E. The values in the final column of registers 1328 are discarded. As shown in FIG. 13F, following the parallel shift operation shown in FIG. 13E, concurrently with filling of the first column 1324 registers in the array of shift registers with a next series of intensity values, the parallel summation operators 1306 are activated to compute the sums of the final three registers in each four-register shift register, and the sums are placed into the column of registers 1304. The summation process is carried out, in parallel, asynchronously with respect to transfer of new photodetector values into the first column 1324 of registers within the array of shift registers. When the summations are completed, a microprocessor-implemented routine is called in order to compute a z-axis position within a range of z-axis positions corresponding to the maximum-detected intensity within the column of registers 1304. Note that this process is averaged over the three most recent scans of the rotor. The computed z-axis position is placed into register 1308 to represent the current distance in the z direction between the objective lens and a cover-slip interface, as shown in FIG. 13G. Then, as shown in FIG. 13H, current z position is subtracted from a desired z position, stored in register 1309, to produce a Δz correction, stored in register 1310, which is then output to a stage drive. Notice that computation of Δz correction proceeds in parallel with filling of the first column 1324 of parallel-shift-register registers with a next set of intensity values obtained from photodetector input. When the next set of intensity values has been obtained, as shown in FIG. 13I, the parallel shift register is activated to shift the columns of intensity values by one place, to prepare for computation of a next Δz correction.

Figure 14:
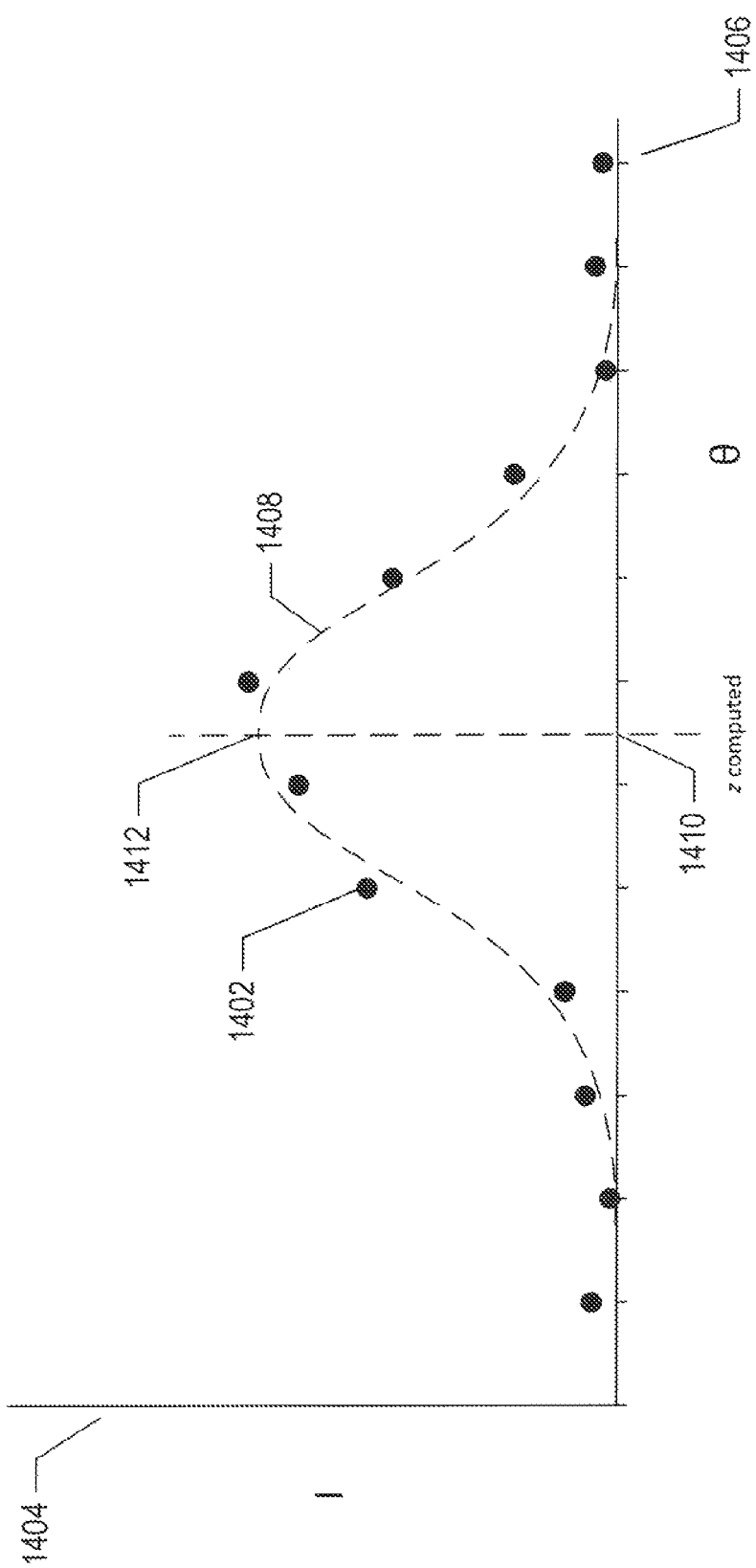
FIG. 14 illustrates computation of the current z position of an optical instrument from accumulated sums of intensity values.

FIG. 14 illustrates computation of the current z position of an optical instrument from accumulated sums of intensity values. FIG. 14 illustrates computation of the current z position, which is placed in register 1308 in the example discussed with reference to FIG. 13G. In FIG. 14, the intensity values at each cylindrical-shaft position are represented by filled circles, such as filled circle 1402. The intensity values are plotted with respect to vertical axis 1404 and cylindrical-shaft positions are plotted with respect to the horizontal axis 1406. The plotted filled disks correspond to the contents of the column of registers 1304 following the parallel summations, as discussed with reference to FIG. 13G. While it would be convenient for the intensity peak to always fall at a rotor position corresponding to a particular cylindrical shaft, and while it would be convenient for the measured intensities to be error free, this is generally not the case. Therefore, an autofocus-processing component of an autofocusing module may employ one of many different curve-fitting algorithms to fit an idealized intensity curve 1408 to the plotted points. An estimated z position can then be computed as the z position 1410 corresponding to the peak intensity 1412 of the computed curve 1408. The computed z position, as shown in FIG. 14, may fall between the z positions corresponding to the rotational angles at which light intensity is measured by the autofocus module. Thus, the number of shafts in a rotor may be less than, equal to, or greater than the number of positions that the electromechanical stage can be driven within the range of z positions scanned by the autofocus module.

Although determining the distance from the objective lens to the cover-slip interface by analyzing the intensity of back-reflected autofocus light, as discussed above with reference to graph 324 in FIG. 3, provides one basis for analysis of data, collected by the autofocus photodetector, by the autofocus processing component (1212 in FIG. 12), other approaches are possible. In one alternative approach, rather than determining the z position at which the intensity of backscattered light is highest, the autofocus system undertakes a calibration operation, at a z position selected by the user of an optical system or by automated program control of the optical system, in which a z-position scan is carried out slightly above and slightly below the selected z position. The purpose of the scan is to identify, in the Gaussian-like intensity curve for the backscattered light from the cover-slip interface, those z positions, and corresponding autofocus-rotor positions, corresponding to the steep sides of the Gaussian-like curve. It is in this portion of the Gaussian curve that measured changes in backscattered-autofocus-light intensity are most sensitively dependent on changes in z position of the objective lens with respect to the cover-slip interface. Then, during a data-collection phase following calibration, the changes in intensity measured from the identified autofocus-rotor positions are continuously monitored, and the z position is controlled to maintain the calibration-step intensities at those identified autofocus-rotor positions. Thus, in this alternative approach to analysis of autofocus-photodetector-acquired data, the z position of the optical instrument is controlled not as a relative offset to a z position at which backscattered autofocus light is maximally intense, but instead is controlled to maintain a calibration-step-determined intensity for backscattered light measured at those autofocus-rotor positions which are most sensitive to z-position change. In yet additional implementations, more complex curve-fitting algorithms may be used to precisely fit measured backscattered auto-focus light intensities to an empirically-determined or theoretical backscattered-auto-focus-light-vs.-z-position curve in order to maintain the optical-instrument z position at a desired value.

In another implementation, an additional optical component is introduced into the autofocus system between the infrared autofocus source 302 and the beam splitter 308, or an optical component already within the optical path is tuned or modified, in order to produce a slightly converging or slightly diverging autofocus-light beam, rather than a beam of parallel light rays. By inputting a slightly converging or diverging beam into the optical system, the autofocus light does not end up focused to a point, within the sample. When the autofocus light is precisely focused within the sample, the high intensity of autofocus light may deleterious effect the sample and optical-data collection. For example, when infrared autofocus light is used, highly focused autofocus light may lead to high temperatures within the sample and damage to living cells or temperature-induced changes in the chemical composition of the sample.

Figure 15:
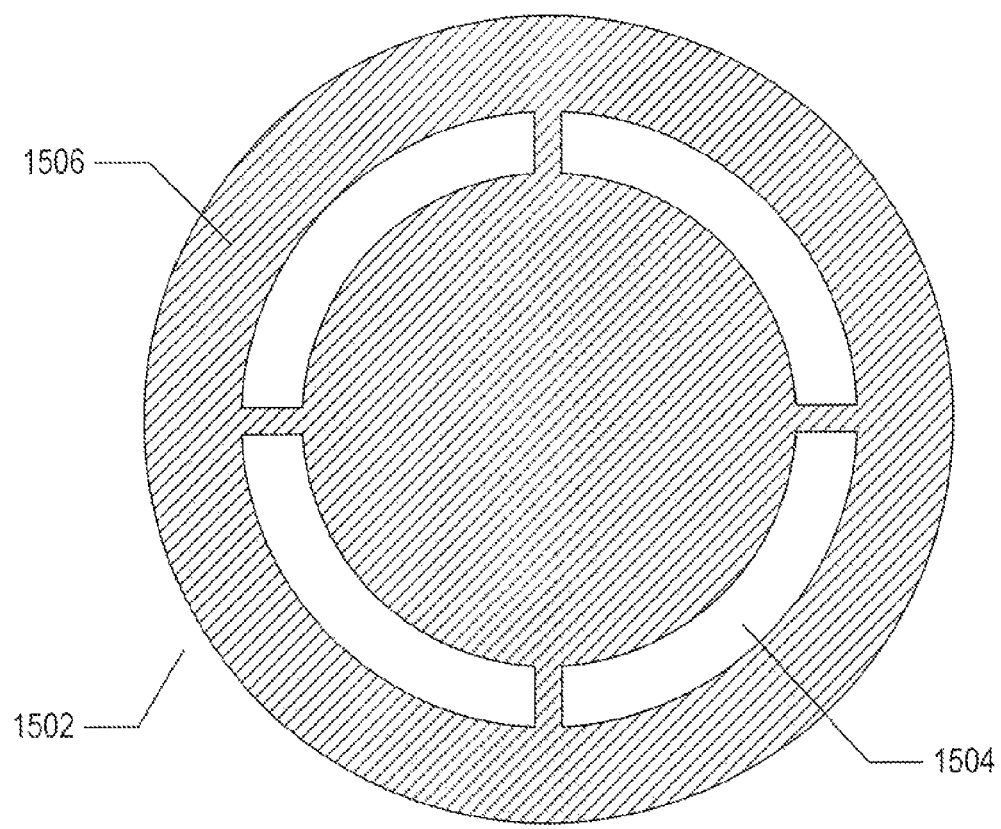
FIG. 15 illustrates a typical ring aperture.

In another embodiment implementation, a ring aperture is placed between the infrared autofocus source 302 and the beam splitter 308 in order to transmit through the ring aperture only those rays that would be focused at a steep angle by the objective lens toward the cover-slip interface. The percentage of back reflected light is greatest for such steeply angled rays and thus it is possible to reduce the overall amount of incident light on the sample while still maintaining the necessary back-reflected autofocus-light intensity by employing the ring aperture to filter out less steeply angled rays that contribute little to the intensity of the back-reflected. FIG. 15 illustrates a typical ring aperture. The ring aperture 1502 includes a transparent or empty ring 1505 within an otherwise opaque or translucent disk 1506. Any of various different types of ring apertures can be employed in various example implementations.

There are many different possible ways for using the back-scattered autofocus-light-intensity signal, referred to below as an "autofocus signal," associated with a window or aperture in an autofocus rotor, referred to below as an "autofocus-rotor element," in order to monitor changes and drift in the z position of an optical-instrument stage and correct for detected changes and drift. In one simple technique, the $z_d$ distance of an autofocus detector relative to an autofocus-rotor element that produces a largest autofocus signal is used to compute an absolute value for the distance between the objective lens of the optical instrument and the cover-slip interface, as discussed above. However, additional information is available to the above-described autofocus module. In the following discussion, an optical instrument is assumed to include an autofocus module that uses one of the above-described types of autofocus rotors. For simplicity, it is assumed that the autofocus rotor includes a discrete number of autofocus-rotor elements, each producing an autofocus signal when autofocus light is scattered back through the autofocus-rotor element.

Figure 16:
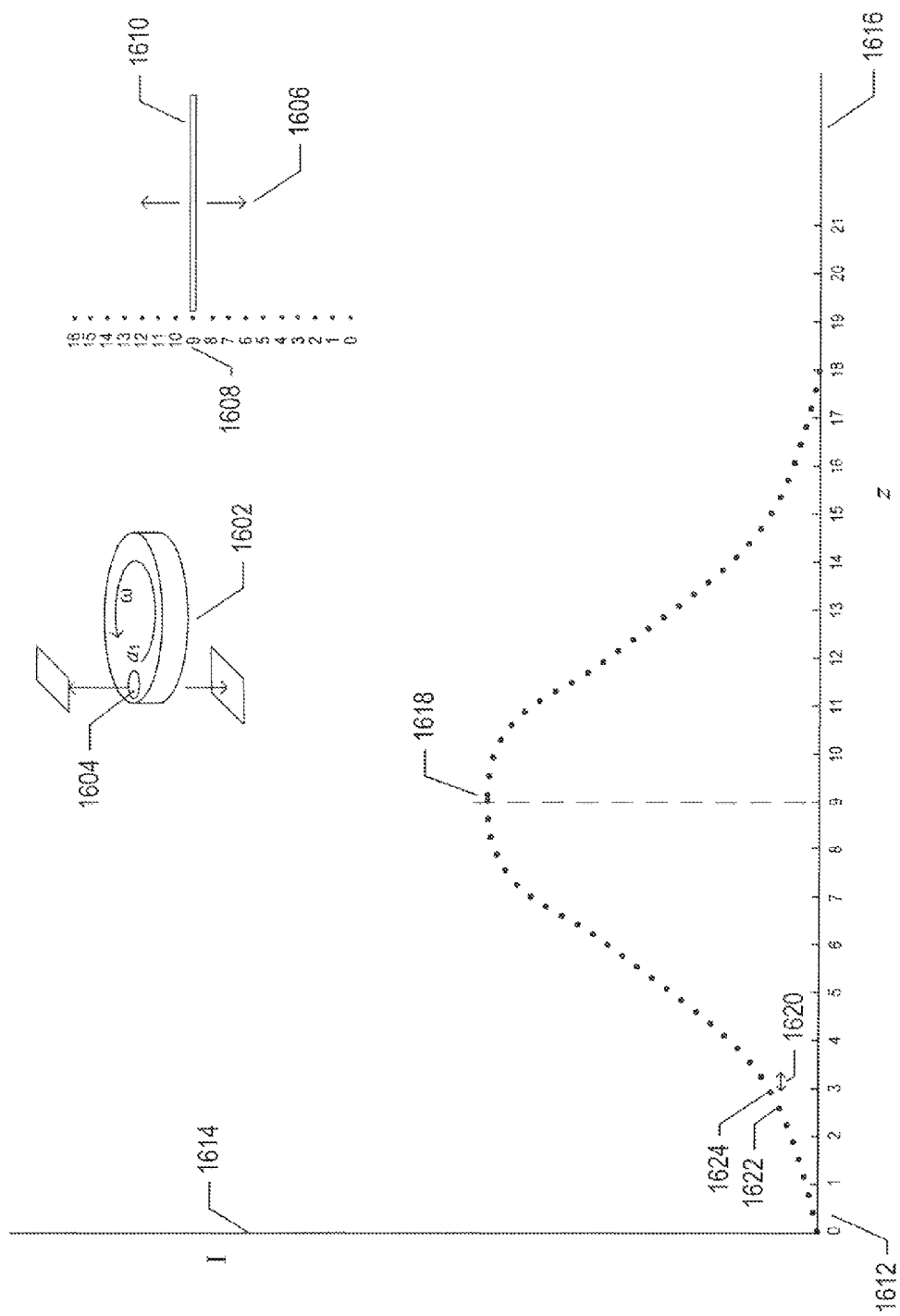
FIG. 16 illustrates a z-position scan through a single element of an autofocus rotor.

FIG. 16 illustrates a z-position scan through a single element of an autofocus rotor. As shown in FIG. 16 by the inset representation of an autofocus rotor 1602, the scan concerns only the autofocus signal produced from a particular autofocus-rotor element 1604. This scan can be achieved, for example, by detecting the autofocus signal periodically with an interval equal to the inverse of the rotational speed of the autofocus rotor, in revolutions per second, and with a fixed phase at which the particular autofocus-rotor element transmits the autofocus signal to the detector. As shown in the inset diagram 1606 in FIG. 16, the z scan is centered about an instrument z position "9" 1608, where the units of z position are arbitrary, that represents the maximum-signal $z_d$ for the autofocus-rotor element that involves moving the stage 1610 through a range of z positions above and below the focal point at z position "9." At z-position "9," the distance from the instrument objective to the cover-slip interface is such that $z_d$ and instrument z-position "9" are related by the above-discussed reciprocal relationship. The instrument focal point may coincide with z-position "9" or, more likely, may be offset from z-position "9." In the above-described implementations, the autofocus signal is of greatest magnitude for one autofocus-rotor element, at any instrument z position, allowing the z position to be calculated from the $z_d$ for that autofocus-rotor element.

The autofocus signal detected in the z-position scan is plotted, in the plot 1612 shown in the lower portion of FIG. 16, with respect to z position. In this plot, the vertical axis 1614 represents autofocus-signal intensity and the horizontal axis 1616 represents z position. The maximum autofocus-signal intensity 1618 occurs at the optical-instrument z position "9" 1618 and descends on either side of this peak z position, as shown by the plotted points in plot 1612. The horizontal distance between two successive data points, such as the horizontal distance 1620 between data points 1622 and 1624, represents the change in z position that occurs during the sampling interval due to scanning, and the current example assumes a constant rate of z-position change during the scan and a constant rotation rate for the autofocus rotor. When the stage is at a position at which the autofocus signal is maximum for the particular autofocus-rotor element 1604, the distance between the objective and the cover-slip interface, $z_0$, is equal to:

$$z_o = -\alpha \frac{1}{z_d}$$

as discussed above, where $z_d$ is an effective distance from the autofocus-rotor element or autofocus-rotor-element focal point to the autofocus detector. However, over a range of z positions sampled during a z-position scan, as shown in FIG. 16, the intensity of the autofocus signal passing through the autofocus-rotor element 1604 and falling on the detector continues to be related to the z position. Thus, the intensity of autofocus signal with respect to a particular autofocus-rotor element is a function of the z position of the optical instrument, the function corresponding to the z-position curve shown in FIG. 16. In the following discussion, it is assumed that a z-position scan relative to any given autofocus-rotor element produces a curve similar to the curve shown in FIG. 16.

Figure 17:
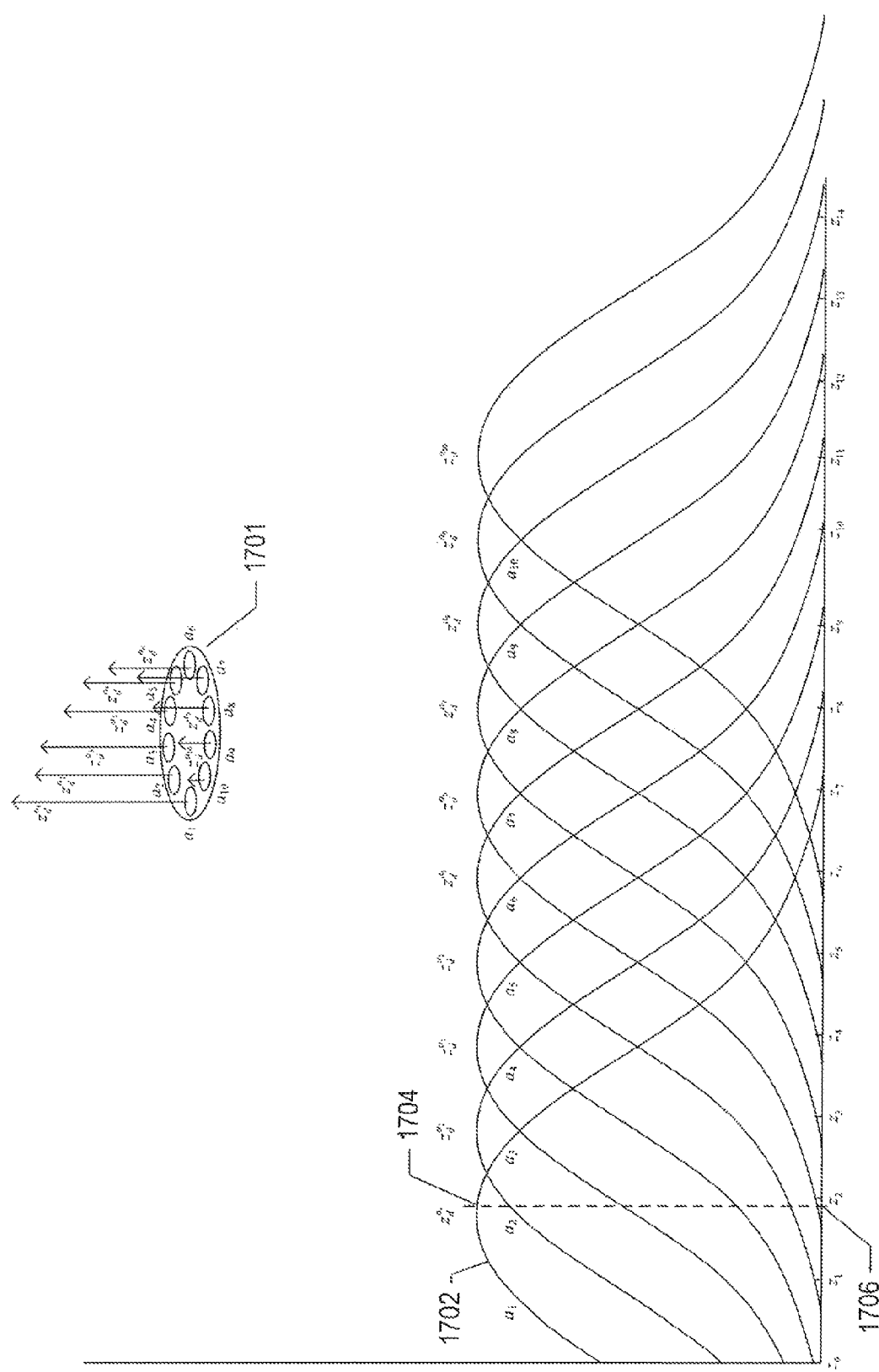
FIG. 17 shows autofocus-signal intensity versus z-position curves for ten autofocus-rotor elements of a ten-element autofocus rotor.

FIG. 17 shows autofocus-signal intensity versus z-position curves for ten autofocus-rotor elements of a ten-element autofocus rotor. As shown in FIG. 17, each particular z-position curve, such as curve 1702 labeled "$a_1$," for autofocus-rotor element $a_1$, has a maximum intensity at an autofocus-rotor-element position, such as peak position $z_d^{a_1}$ on the z-position curve 1702, related to an optical-instrument z position 1706 by the above-discussed reciprocal relationship. The peak of each curve is offset from the peaks of the other curves. By conducting a z-position scan over a range of z positions centered about a desired z position $z_1$, a set of overlapping z-position curves, such as those shown in FIG. 17, is generated. The autofocus-signal intensities generated by each element of the autofocus rotor at a particular optical-instrument z position constitute a multi-signal-intensity fingerprint of the z position. In one method example, a set of z-position curves, each curve corresponding to a different autofocus-rotor element, is collected as a set of calibration curves prior to data collection and a continuous-autofocus module periodically samples the autofocus signal intensities corresponding to each autofocus-rotor element to generate a z-position fingerprint that can be matched to a narrow range of z positions using the initially collected calibration curves.

Figure 18:
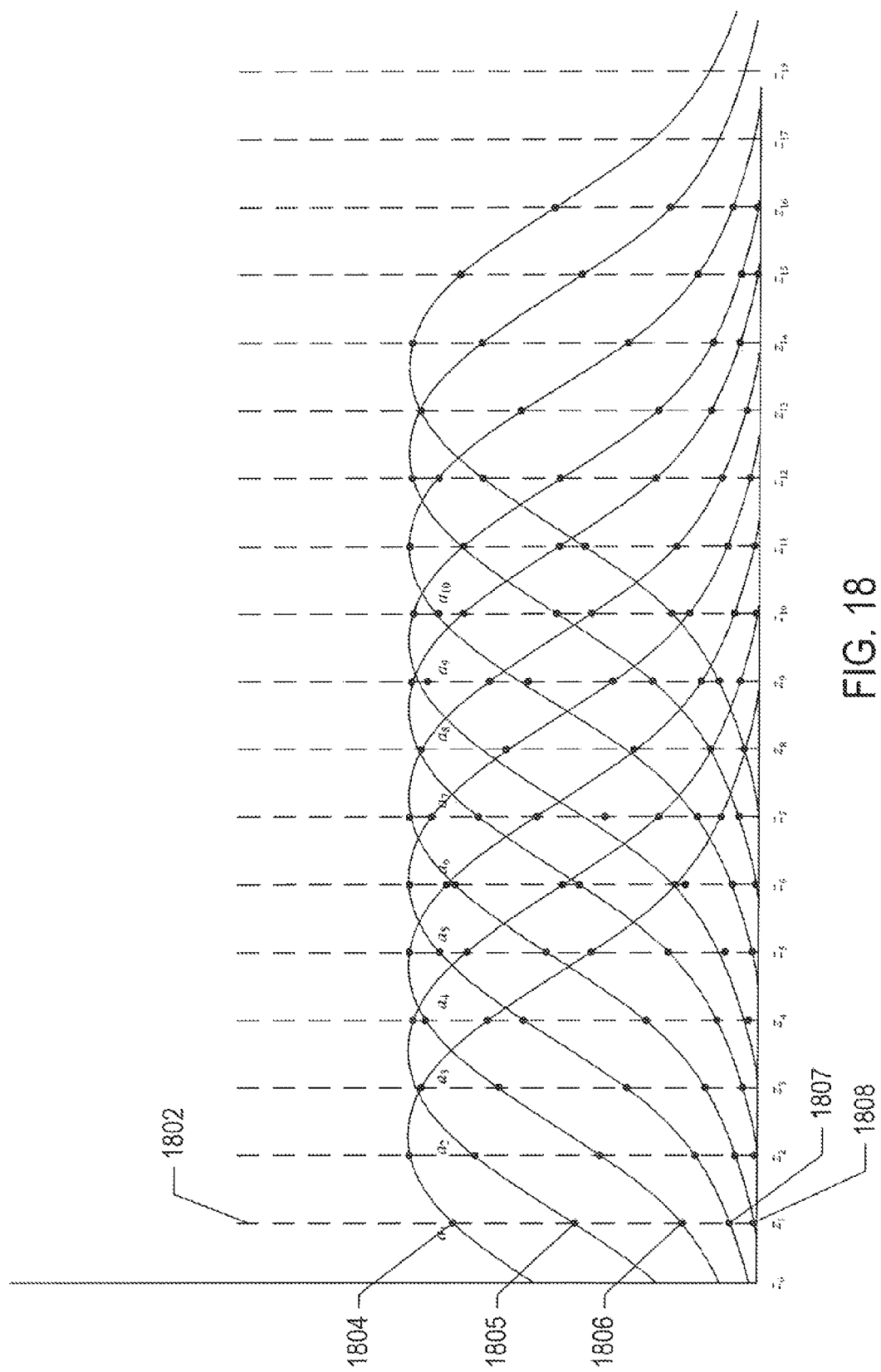
FIG. 18 illustrates one method for numerically characterizing a set of z-position curves.

FIG. 18 illustrates one method for numerically characterizing a set of z-position curves. FIG. 18 shows the same set of z-position curves as shown in FIG. 17. Each curve, as in FIG. 17, is labeled with a label, selected from the range Of labels $a_1$-$a_{10}$, assigned to a particular autofocus-rotor element as shown in inset 1701 of FIG. 17. At each of 18 equally spaced z positions, labeled $z_1, z_2 \ldots, z_{18}$, a vertical dashed line, such as vertical dashed line 1802, extends from the z position upward through all of the z-position curves that overlie that z position. The points 1804-1808 at which the vertical dashed line 1802 intersects each of the overlying z-position curves, represent the autofocus-signal intensities produced by autofocus-rotor elements $a_1$, $a_2$, $a_3$, $a_4$, and $a_5$, respectively, at the z position represented by vertical dashed line 1802, $z_1$. These sets of points constitute an autofocus fingerprint for z position $z_1$. Each of the remaining z positions $z_2$-$z_{18}$ are associated with a corresponding fingerprint, as shown in FIG. 18.

Figure 19:
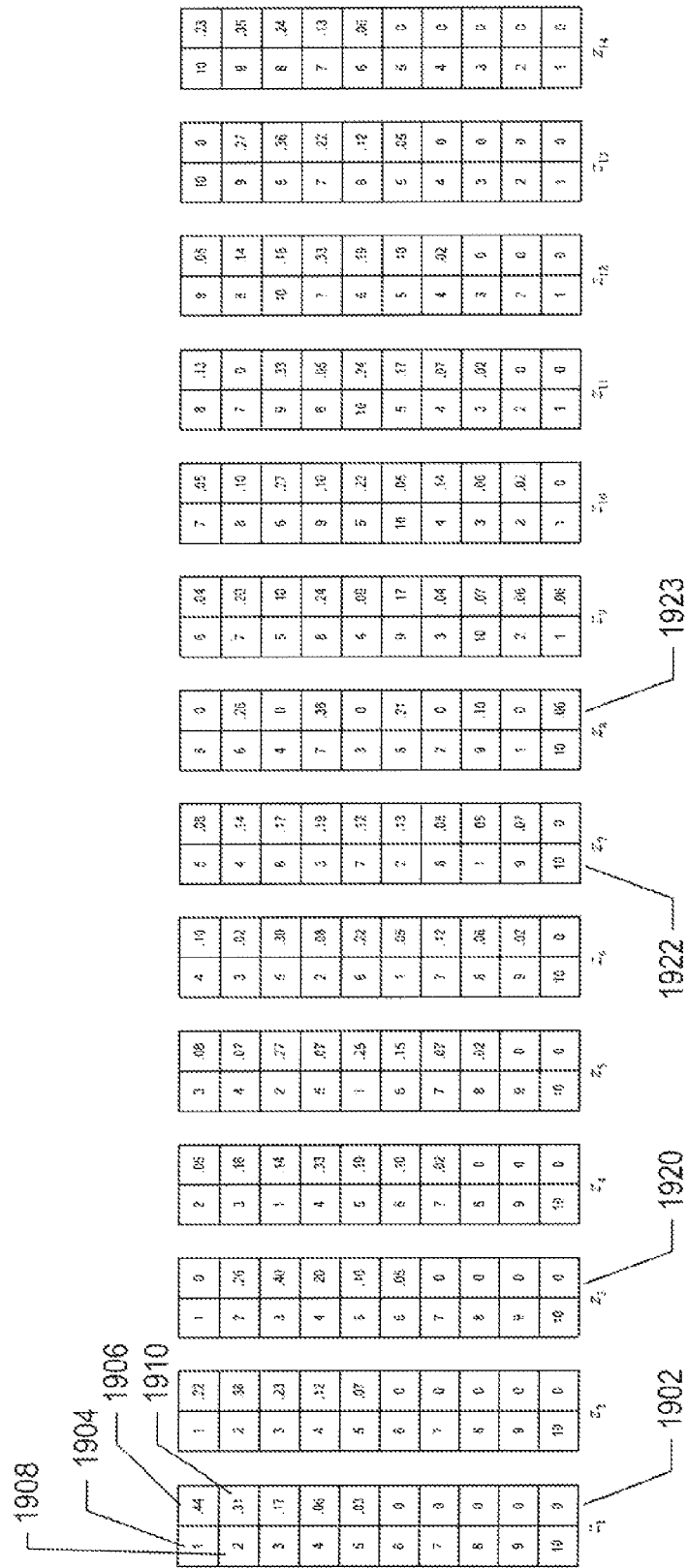
FIG. 19 illustrates z-position-fingerprint data structures corresponding to certain of the z positions shown in FIG. 18.

The autofocus fingerprints corresponding to each of the labeled z positions in FIG. 18 can be encoded into z-position-fingerprint data structures. FIG. 19 illustrates z-position-fingerprint data structures corresponding to certain of the z positions shown in FIG. 18. Each of the z-position-fingerprint data structures, such as the z-position-fingerprint data structure 1902 corresponding to z position $z_1$ in FIG. 19, is a matrix with two columns and a number of rows equal to the number of autofocus-rotor elements. The first column lists the autofocus-rotor elements in decreasing autofocus-signal order and the second column indicates the relative drop in signal intensity between pairs of elements. For example, consider z-position-fingerprint data structure 1902 and points 804-808 along vertical dashed line 1802 in FIG. 18. The point with highest intensity, 1804, represents the intersection of the autofocus-rotor-element curve corresponding to autofocus-rotor element $a_1$ and vertical line 802. The number "1" 1904 at the top of the first column in z-position-fingerprint data structure 1902 indicates that the highest-intensity autofocus signal at z position $z_1$ is produced by autofocus-rotor-element $a_1$. The number 0.44 1906 at the top of the second column indicates that the drop in intensity between point 1804 and point 1805 is 44 percent of the drop in intensity between point 1804 and the z axis. The next-highest-intensity point, point 1805 in FIG. 18, represents the intersection of the z-position curve corresponding to autofocus-rotor element $a_2$ of vertical line 1802 corresponding to z-position $z_1$. Thus, the number "2" 1908 in z-position-fingerprint data structure 1902 indicates that autofocus-rotor element $a_2$ produces the second-highest-intensity autofocus signal at z-position $z_1$. The number "0.31" 1910 in the second position of the second column indicates that the intensity drop between point 1805 and point 1806 is 31 percent of the intensity drop between point 1804 and the z axis. As can be seen in FIG. 18, points 1804-1808 correspond to, in descending intensity order, intersections of the z-position curves of autofocus-rotor elements $a_1$, $a_2$, $a_3$, $a_4$, and $a_5$, and therefore the first five entries in z-position-fingerprint data structure 1902 are "1," "2," "3," "4," and "5." The remaining z-position curves corresponding to autofocus-rotor elements $a_6$-$a_{10}$ do not overlie z-position $Z_1$ in the set of plots shown in FIG. 18, and therefore the intensity drop numbers associated with these positions are "0" in the z-position-fingerprint data structure 1902.

In FIG. 19, the first 14 z-position-fingerprint data structures for z-positions $z_1$-$z_{14}$ in FIG. 18 are shown. As can be seen by comparing FIG. 19 and FIG. 18, the first element in the first column of each z-position-fingerprint data structure indicates the z-position curve with maximum intensity at the corresponding z-position of the z-position-fingerprint data structure. In certain cases, such as the z-position-fingerprint data structure corresponding to z-position $z_3$ 1920, the highest-intensity point represents the intersection of two z-position curves, and therefore the first two elements in the first column indicate the two equally-highest-intensity z-position curves at the corresponding z position. In the following discussion, the phrase "z-position-fingerprint data structure" is shortened to "z-print." Thus, a z-print is a list, in intensity-decreasing order, of autofocus-rotor elements through which measurable autofocus-signal intensities are observed at a particular instrument z-position along with indications of relative intensity drops between successive autofocus-rotor elements.

Figure 20:
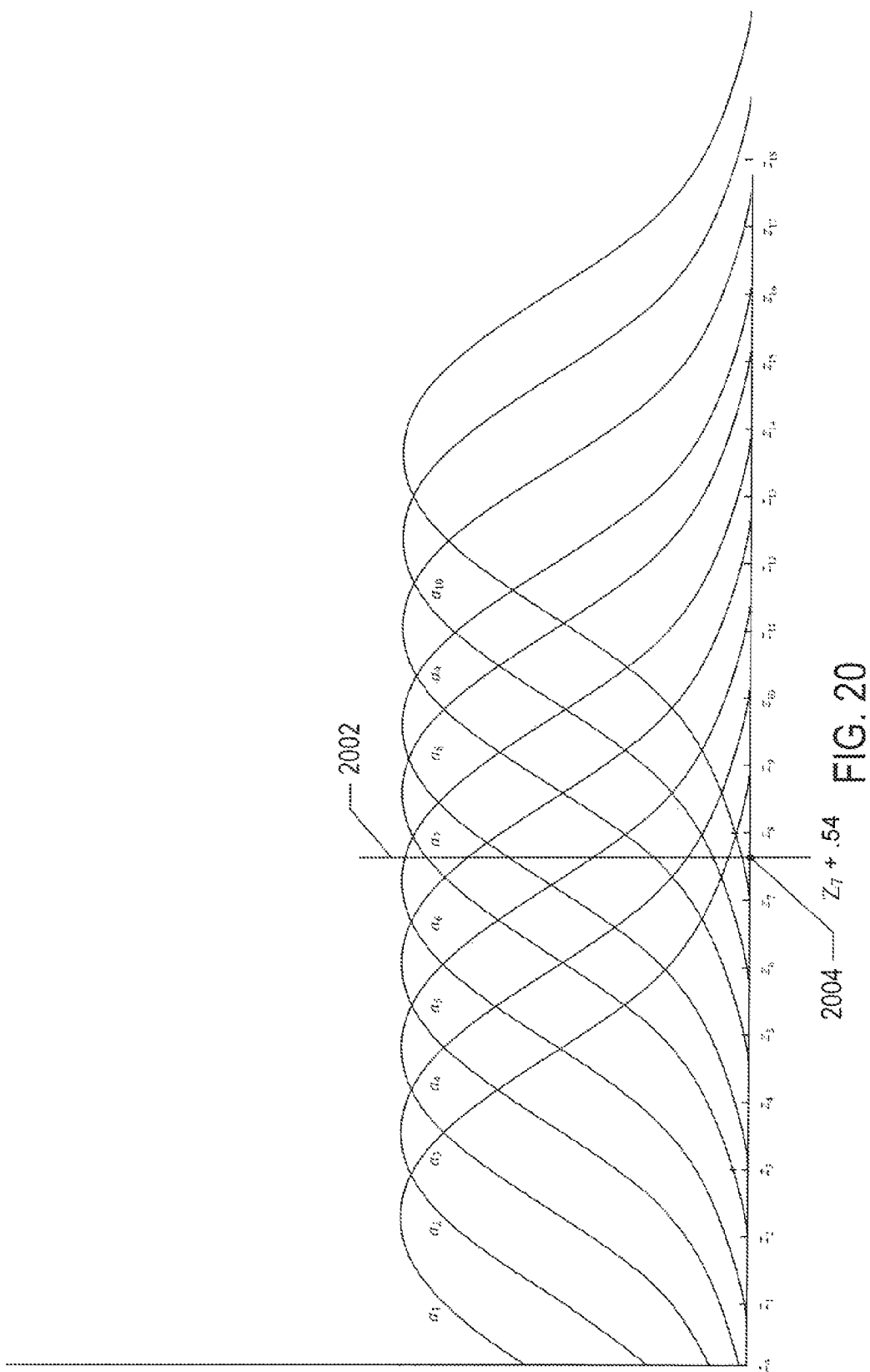
FIGS. 20-22 illustrate how the z-prints collected by a z-position scan can be used as calibration curves to determine, subsequently, the z position of an optical instrument.
Figure 21:
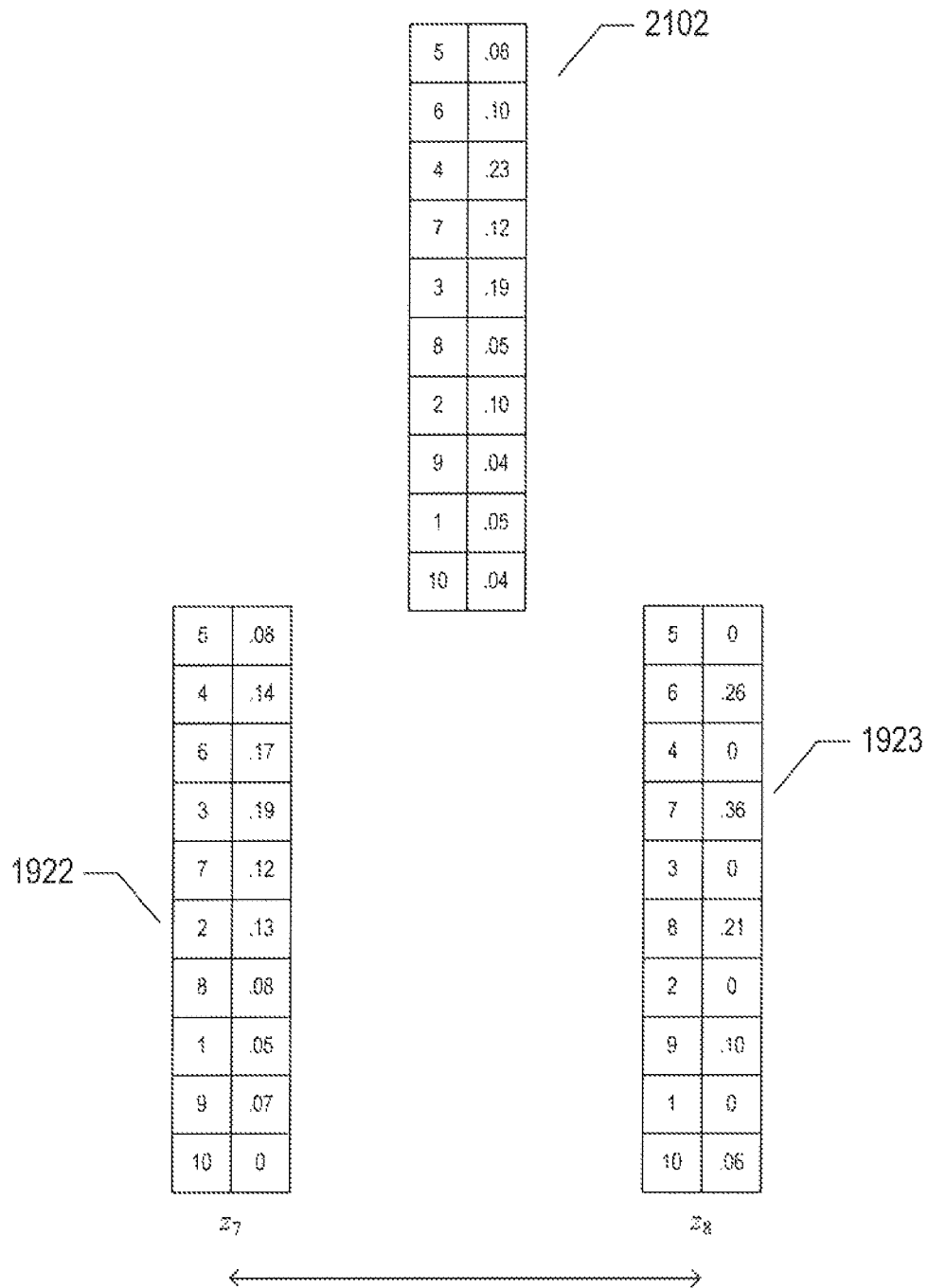
Figure 22:
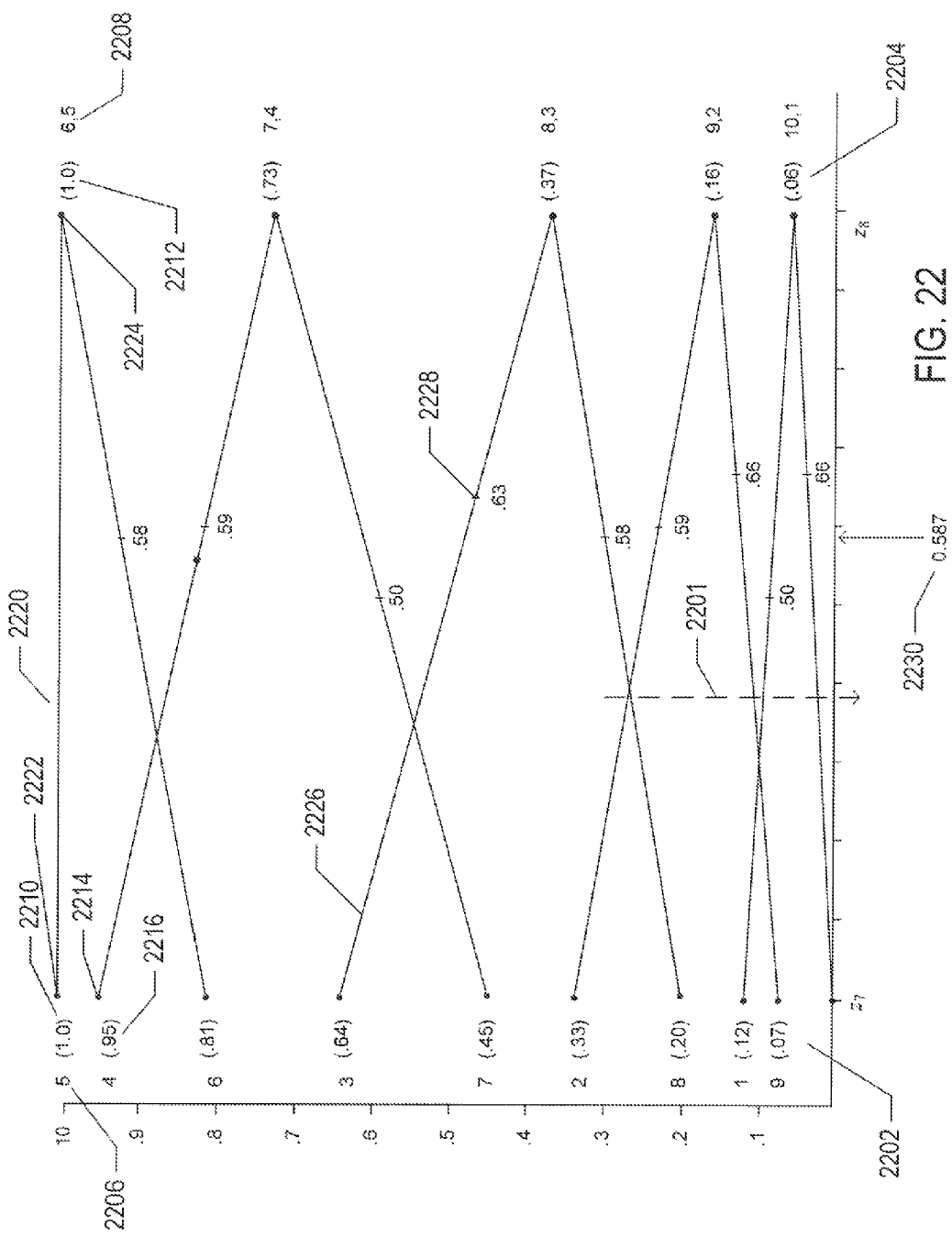

FIGS. 20-22 illustrate how the z-prints collected by a z-position scan can be used as calibration curves to determine, subsequently, the z position of an optical instrument. Continuing with the example of FIGS. 17-19, assume that the z-position curves and corresponding z-prints shown in FIGS. 18 and 19 have been obtained in a z-position scan and stored in electronic memory. Subsequently, the mechanical stage has been moved to an instrument z position corresponding to vertical line 2002 in FIG. 20, where the instrument z position is the point 2004 at the intersection of this vertical line and the z axis. However, assume that the z position shown in FIG. 20 is not known but that a z-position fingerprint, or z-print, corresponding to this point can be acquired by an autofocus module. The z-print 2102 corresponding to z position 2004 shown in FIG. 20 is shown in FIG. 21. In a first step, this z-print 2102 is compared to the set of z-prints shown in FIG. 19. By comparing the values in the experimentally determined z-print 2102 to the values in the z-print shown in FIG. 19, it is readily determined that z-print 2102 most closely resembles z-prints 1922 and 1923 corresponding to z positions $z_7$ and $z_8$. These two z-prints are shown, in FIG. 21, below z-print 2102, and bracket the z position corresponding to z-print 2102. Thus, as shown in FIG. 21, it is clear, based only on similarity matching of the experimentally determined z-print 2102 and the z-prints in the set of z-prints shown in FIG. 19, that the current instrument z position of the optical instrument lies in the interval between z positions $z_7$ and $z_8$. By similarity matching alone, the current instrument position can be located within a relatively narrow range of possible z positions.

As shown in FIG. 22, an even more precise determination of the current optical-instrument z position can be made based on the z-print shown in FIG. 21. In one approach, it is observed that the ordering of autofocus-rotor elements in the experimentally determined z-print 2102 differs from the ordering of autofocus-rotor elements in z-print 1922 but is the same as the ordering of z-rotor elements in z-print 1923. Thus, when the z position is continuously increased from z position $z_7$ to position $z_8$, a point will be reached when the z-position curves cross over such that all z positions to the right of a z-position in the interval between z positions $z_7$ and $z_8$ will have the autofocus-rotor element order of z-prints 2102 and 1923. Using a type of linear interpolation, discussed below, that z-position corresponds to vertical line 2201.

As shown in FIGS. 18 and 20, the z-position curves are non-linear. However, for simplicity, a type of linear interpolation can be used to determine the current optical-instrument z position. In FIG. 22, the absolute fractional intensity drops from z-position curve intersections are computed from z-prints 1922 and 1923 and plotted in columns 2202 and 2204 in FIG. 22. These absolute fractional intensity-drop values together comprise an absolute-intensity-drop vector corresponding both to an instrument z position and to a z-print corresponding to that instrument position. Because the z-position curve corresponding to autofocus-rotor element 5 exhibits highest autofocus-signal intensity in the z-print for z-position $z_7$ and shares the highest position with the curve corresponding to autofocus-rotor element $a_6$ in the z-print for z-position $z_g$, autofocus-rotor element 5 is located at the tops of both columns, 2206 and 2208, respectively, and the absolute intensity drop from this point to the z axis is 1.0, 2210 and 2212 respectively. The remaining points in the plot correspond to the absolute fractional intensity drops from the remaining autofocus-rotor-element-associated z-position curves. Because the relative-intensity drops in the z-prints are computed to low precision, there may be slight numerical discrepancies. For example, the absolute fractional intensity drop from point 2214 is shown as 0.95 2216, which is the sum of all the relative intensities in z-print 1922 from the bottom up to the entry corresponding to autofocus-rotor element $a_4$. However, the absolute fractional intensity from point 2214 can also be calculated as 1.0 minus the relative-intensity drop shown in the first element of the first column of z-print $z_7$, "0.08," and would thus be 0.92. For the linear interpolation method illustrated in FIG. 22, such slight numerical discrepancies have little or no significance.

Next, the points corresponding to a particular autofocus-rotor element in each of the two columns are connected by straight lines in FIG. 22, such as the straight line 2220 interconnecting point 2222 corresponding to autofocus-rotor element 5 in z-print $z_7$ and point 2224 corresponding to autofocus-rotor element 5 in z-print $z_8$. The slope of these lines forms the basis for linear interpolation of the current z position based on the experimentally observed z-print 2102. For example, consider interpolation with respect to autofocus-rotor element 3, corresponding to line 2226 in FIG. 22. Summing all of the relative intensities from the bottom of z-print 2102 up to and including the relative intensity drop 0.19 corresponding to autofocus-rotor-element z-position curve for autofocus-rotor element 3, 0.19, the absolute intensity drop 0.47 for autofocus-rotor element 3 is obtained. The ratio 0.64-0.47 to 0.64-0.37 represents the fractional drop in intensity over the $z_7$-to-$z_8$ z-position range. The value for this ratio, 0.63 (2228 in FIG. 22), is also equal to the fraction of the distance between z-position $z_7$ and $z_8$ of the current instrument z position associated with z-print 2102. In FIG. 22, these fractional distances, obtained by interpolation for each autofocus-rotor element, are shown as points on lines connecting the lines in column 2202 and 2204. These fractional z positions can be summed and averaged to produce an average fractional z position 0.587 2230. Thus, by the relatively crude linear-interpolation method, a current optical-instrument z position of $z_7$+0.587 is obtained. This differs from actual z position (2004 in FIG. 20) of $z_7$+0.54 by less than 0.05. Thus, by a combination of similarity comparison of experimentally observed z-prints with a set of calibration z-prints obtained in a z-position scan, along with linear interpolation, a relatively accurate determination of the current optical-instrument z position can be obtained.

The z-print-based z-position determination method, discussed above, and correction of instrument z-position based on this determination is subsequently referred to as "coarse adjustment." Coarse adjustment, or the relative-intensity method, is used, in one example autofocus module, to adjust the z position of the optical instrument when a rather large drift or disturbance in z position is observed. There are many possible variations of the course-adjustment method. Rather than employing linear interpolation, as discussed above, a more complex type of interpolation based on a parameterized presentation of the z-position curves can be employed for greater accuracy. Alternatively, the course-adjustment method may be based solely on similarity matching with z-prints in a database and on estimating a z-position range over which the observed ordering of autofocus-rotor-element-associated z-position curves matches the observed z-print. Similarity matching may consider only the ordering of autofocus-rotor elements within a z-print or may additionally consider the relative intensity drops.

Figure 23:
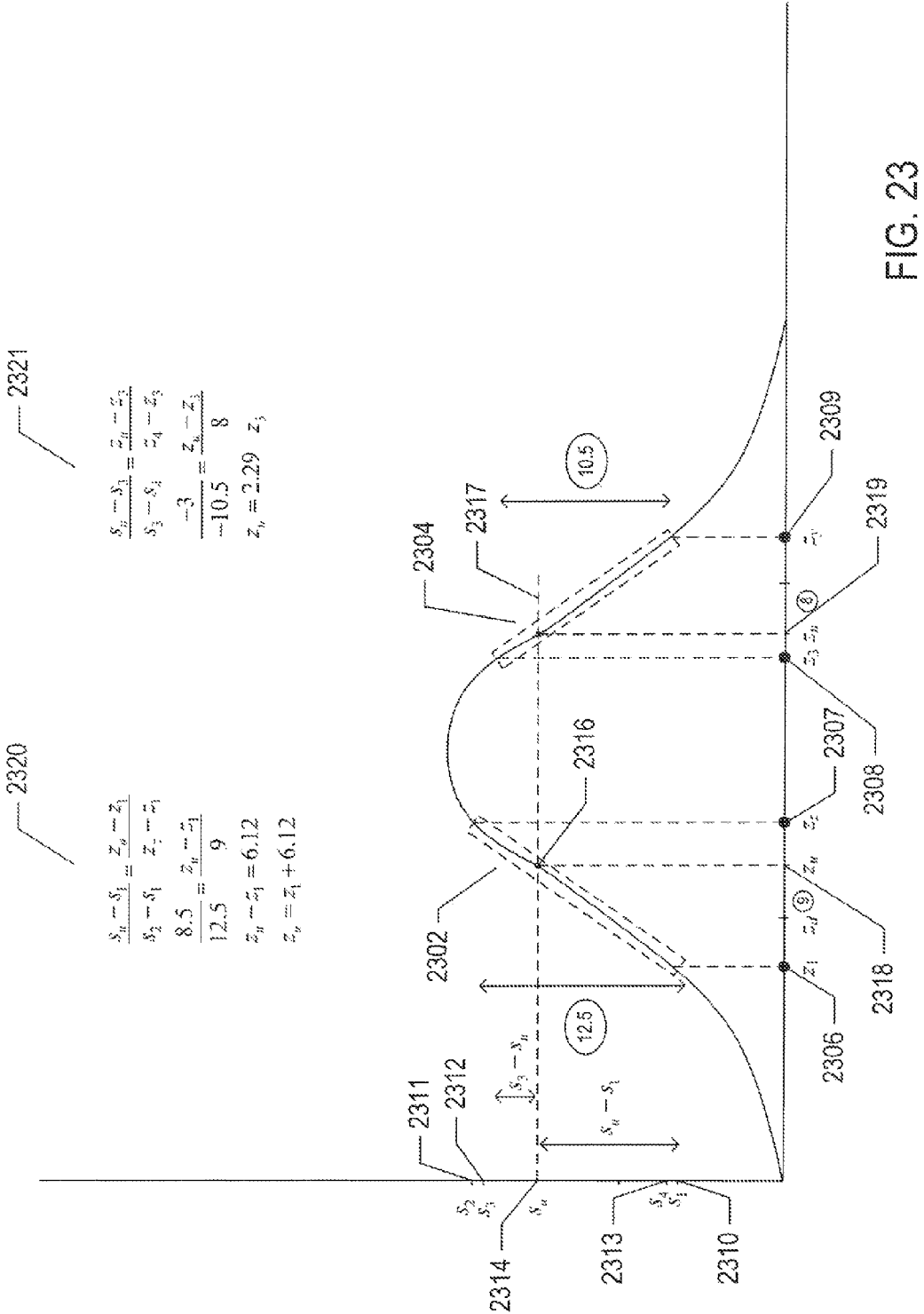
FIG. 23 illustrates the basis for a second z-position-determination method.

FIG. 23 illustrates the basis for a second z-position-determination method. FIG. 23 shows a plot of a z-position curve corresponding to a particular autofocus-rotor element. There are two portions of the curve 2302 and 2304, boxed in with dashed lines, that represent the steepest slopes of the curve and also approximately linear sections of the curve. Were one to use the curve to determine the optical-instrument z position, that position could be most accurately determined from data points within these steepest, approximately linear portions of the curve 2302 and 2304. The steepness of the curve is proportional to the magnitude of signal response with respect to z-position change. The larger the signal response, the more accurately a z-position change can be determined.

FIG. 23 illustrates an example of determining a current optical-instrument z position based on the autofocus signal observed with respect to a particular autofocus-rotor element. Assume that the autofocus signal for points $z_1$ 2306, $z_2$ 2307, $z_3$ 2308, and $z_4$ 2309 have been predetermined as $s_1$ 2310, $s_2$ 2311, $s_3$ 2312, and $s_4$ 2313, respectively. The observed autofocus signal-intensities $s_1$, $s_2$, $s_3$, and $s_4$ may be determined and recorded during a calibration step. Subsequently, assume that the autofocus-signal intensity $s_u$ 2314 is observed. The observed autofocus-signal intensity $s_u$ intersects the z-position curve at two points 2316 and 2317. The z-position coordinates of these two points 2318 and 2319, both labeled $z_u$ in FIG. 23, correspond to the two possible current optical-instrument z positions based on the currently observed autofocus-signal intensity $s_u$ and the predetermined z positions $z_1$-$z_4$ and signal intensities $s_1$-$s_4$. The linear interpolation calculations used to compute the two z positions 2318 and 2319 are shown as insets 2320 and 2321 in FIG. 23. This is the same linear interpolation method used in the course-adjustment method illustrated in FIG. 22.

The following procedure can be used to determine a $\Delta z$ by which the z position of an optical instrument is changed in order to correspond to a desired z position $z_1$, $s_1$=signal measured at $z_1-\delta z_1$ $s_2$=signal measured at $z+\delta z_2$ $s_i$=signal measured at $z_1$ subsequently, measure $s_u$ where $s_u$ lies between $s_1$ and $s_2$ calculate $\Delta z$ to drive the stage back to $z_1$ by:

$$\Delta z = (z_i + \delta z_2) - (z_i - \delta z_1)\frac{s_i - s_u}{s_2 - s_1}$$

$$\Delta z = (\delta z_2 + \delta z_1)\frac{s_u}{s_2 - s_1}$$

Figure 24:
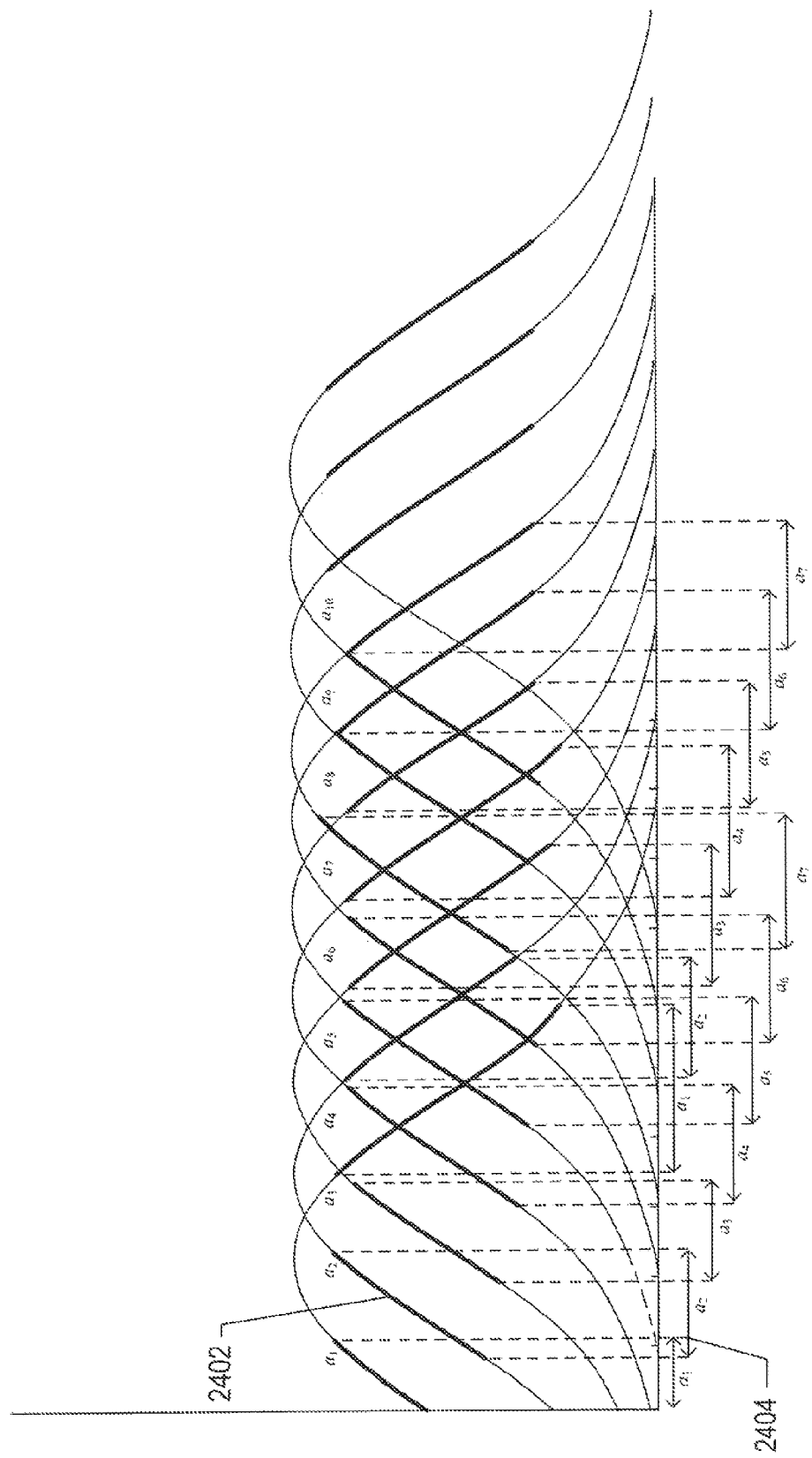
FIG. 24 illustrates a collection of z-position curves for autofocus-rotor elements $a_1$-$a_{10}$ obtained during a z-position scan.

As discussed above, z-position curves can be obtained for each autofocus-rotor element during a z-position scan. FIG. 24 illustrates a collection of z-position curves for autofocus-rotor elements $a_1$-$a_{10}$ obtained during a z-position scan. The steep, approximately linear portions of these curves are bolded, in FIG. 24, and projected to horizontal line segments denoted with double-headed arrows below the z axis. For example, the steep linear portion 2402 of z-position curve for autofocus-rotor element $a_2$ is projected to the z-position range 2404 below the z axis. As can be seen in FIG. 24, these projections of z-position ranges generally overlap with one another so that, for most z positions underlying the collection of z-position curves, there are multiple z-position ranges corresponding to multiple steep, linear portions of z-position curves that can be used to estimate a current optical-instrument z position based on corresponding autofocus-rotor-element-associated autofocus-signal intensities.

In one z-position-determination method embodied in the autofocus module, used in this example for fine-grain autofocus adjustments and referred to as the vector-focus method, vectors of autofocus-signal intensities, each corresponding to a different autofocus-rotor element, are computed and stored, in a calibration cycle, and subsequently used to determine, with relatively high precision, the current optical-instrument z position to determine a $\Delta z$ by which the optical instrument can be adjusted to place the optical-instrument z position at a desired z position $z_i$.

Figure 25:
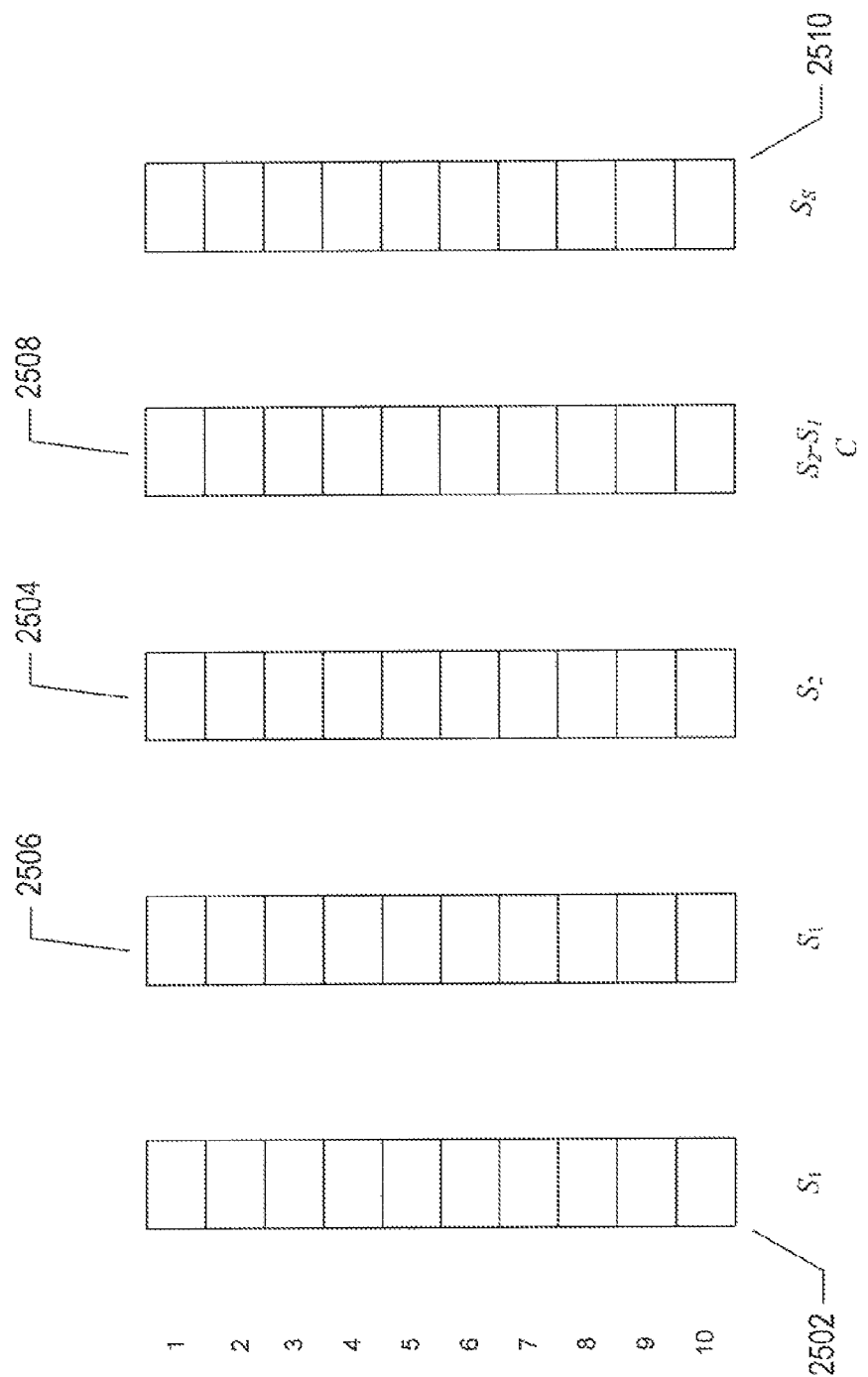
FIG. 25 illustrates a vector-based autofocus z-position-adjustment method.

FIG. 25 illustrates the vector-based autofocus z-position-adjustment method. In essence, for each of multiple z-position ranges projected from steep, approximate linear portions of overlying z-position curves, the autofocus-signal intensities at the ends of the z-position range are observed, recorded, and electronically stored in vectors $S_1$ 2502 and $S_2$ 2504, respectively. The autofocus-signal intensities with respect to each autofocus-rotor element are observed for a particular point of interest, recorded, and stored in a vector $S_i$ 2506. A vector C is obtained by subtraction of $S_1$ from $S_2$ 2508. Subsequently, at any given optical-instrument z position, autofocus-signal intensities corresponding to each autofocus-rotor element are observed and recorded as a vector $S_s$ 2510. Note that, in each of the vectors $S_1$, $S_2$, $S_i$, and $S_s$, the autofocus-signal intensities are ordered with respect to a numerical index of the corresponding autofocus-rotor elements. A $\Delta z$ by which the optical instrument stage can be moved in order to return the z position of the optical instrument to a desired z position $z_1$ can then be computed as:

$$\Delta z = (z_2 - z_1)\frac{\langle S_i - S_s, C\rangle}{\langle C, C\rangle}$$

where the notation $\langle C,C\rangle$ refers to the dot product, or inner product, of vector C with itself and the notation $\langle S_i - S_s, C\rangle$ refers to the dot product of vector $S_i - S_s$ with vector C.

Figure 26:
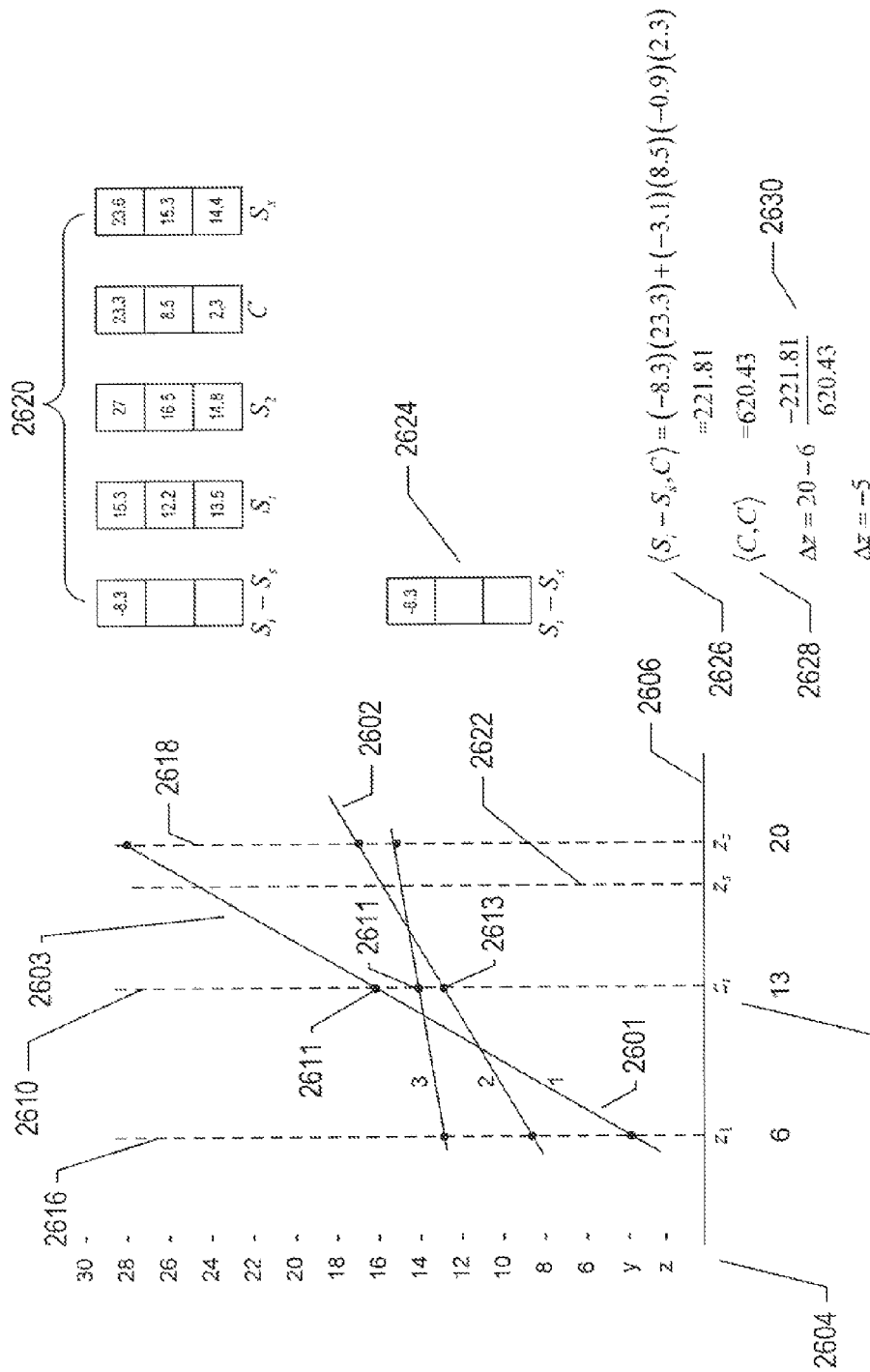
FIG. 26 illustrates computation of a z-position adjustment $\Delta z$ based on three-element vectors using the vector-based autofocus method discussed with reference to FIGS. 23-25.

FIG. 26 illustrates computation of a z-position adjustment $\Delta z$ based on three-element vectors using the vector-based autofocus method discussed with reference to FIGS. 23-25. In FIG. 26, the linear portions of three z-position curves 2601, 2602, and 2603 are plotted. The vertical axis 2604 represents signal intensity and the horizontal axis 2606 represents the z position. The desired z position $z_i$ 2608 is represented by vertical dashed line 2610, and intersects the three linear portions of z-position curves at points 2611-2613. The coordinates of these three points as well as the points of intersection of the linear portions of the z-position curves and vertical lines 2616 and 2618 representing z position $z_1$ and $z_2$, respectively, are used to construct the five vectors $S_1$, $S_i$, $S_2$, $S_C$, and $S_S$ 2620 discussed above with reference to FIG. 25. Assume that the optical instrument is now positioned at a z position $z_S$ represented by vertical line 2622. The above vector expression can be used to calculate a $\Delta z$ by which the stage of the optical instrument can be moved so that the z position of the optical instrument is again $z_i$. First, the vector $S_i - S_S$ 2624 is computed by vector subtraction. Next, the inner products, or dot products, of this vector and the vector C as well as the vector C with itself, 2626 and 2628, are computed as shown in FIG. 26. Finally, Δz is computed using z positions $z_2$ and $z_1$ and the ratio of the inner products 2630.

The vector-focus method, discussed above with reference to FIGS. 23-26, generally uses less stored data, needing only the autofocus-signal intensities at the ends of each z-position range corresponding to steep, linear portions of z-position curves as well as the z positions of the z-position-range end points, in addition to data for the z-position of interest $z_i$. Furthermore, when the vector-focus method is applicable, it generally provides a more accurate positioning than the course-adjustment method, previously discussed. This is due to the fact that only the most sensitive portions of the z-position curves contribute significantly to z-position determination and because the linear-interpolation method works best when applied to approximately linear portions of the curves. However, as discussed further below, the vector-focus method involves storing the various vectors obtained through a coarse z-position scan relative to each point of interest $z_i$ with respect to which data is subsequently collected during a data-collection phase. By contrast, the course-adjustment method can employ sets of z-prints computed from data observed from a grid-like array of points in the instrumental x,y plane, since points for which the z-prints are obtained that are near to a point of interest can be used in the course-adjustment method. The course-adjustment method is far less affected by changes in reflectance within the sample, changes in illumination-source intensity, or other such changes, and therefore z-print calibration sets may need to be collected less often and can be more generally applied to various data-collection regimes.

The vector-focus method can apply all possible autofocus-signal intensities contained in a coarse z-position scan around a point of interest $z_i$, rather than only selecting the autofocus-signal intensities corresponding to steep and linear portions of z-position curves, since the inner product $\langle S_1 - S_s, C \rangle$ naturally weights the terms according to the steepness of the calibration curves. However, in many examples, the raw z-scan data is processed to select only reasonably steep and linear sections of relevant z-position curves for each point of interest $z_i$.

Figure 27:
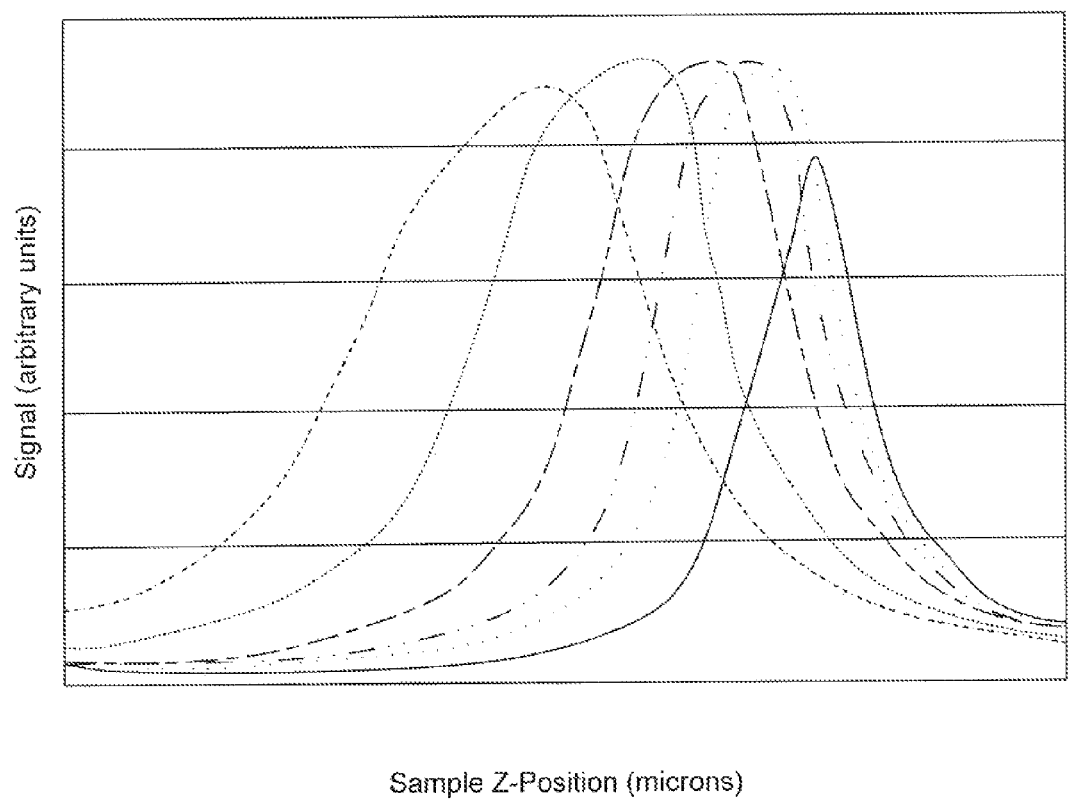
FIG. 27 illustrates sample z-position curves corresponding to autofocus-rotor elements obtained from an actual autofocus module of an optical instrument.

It should be noted that the sets of z-position curves shown in FIGS. 17-18, 20, and 24 are idealized. In practice, the z-position curves are not uniformly spaced apart and do not exhibit uniform profiles. FIG. 27 illustrates sample z-position curves corresponding to autofocus-rotor elements obtained from an actual autofocus module of an optical instrument. However, the above-described methods do not depend on uniformity of spacing of the curves or on the curves having uniform profiles. The methods are general and fully applicable to actual sets of z-position curves, such as those shown in FIG. 27.

An autofocus module can be implemented to use either or both of the above-described course-focus methods and vector-focus methods. In the following, an example autofocus-module implementation is described, using control-flow diagrams. This autofocus-module implementation incorporates the course-adjustment method when relatively large z-position adjustments are to be undertaken, during autofocus-monitored data collection, and the vector-focus method is used for smaller, more incremental z-position adjustments.

Figure 28:
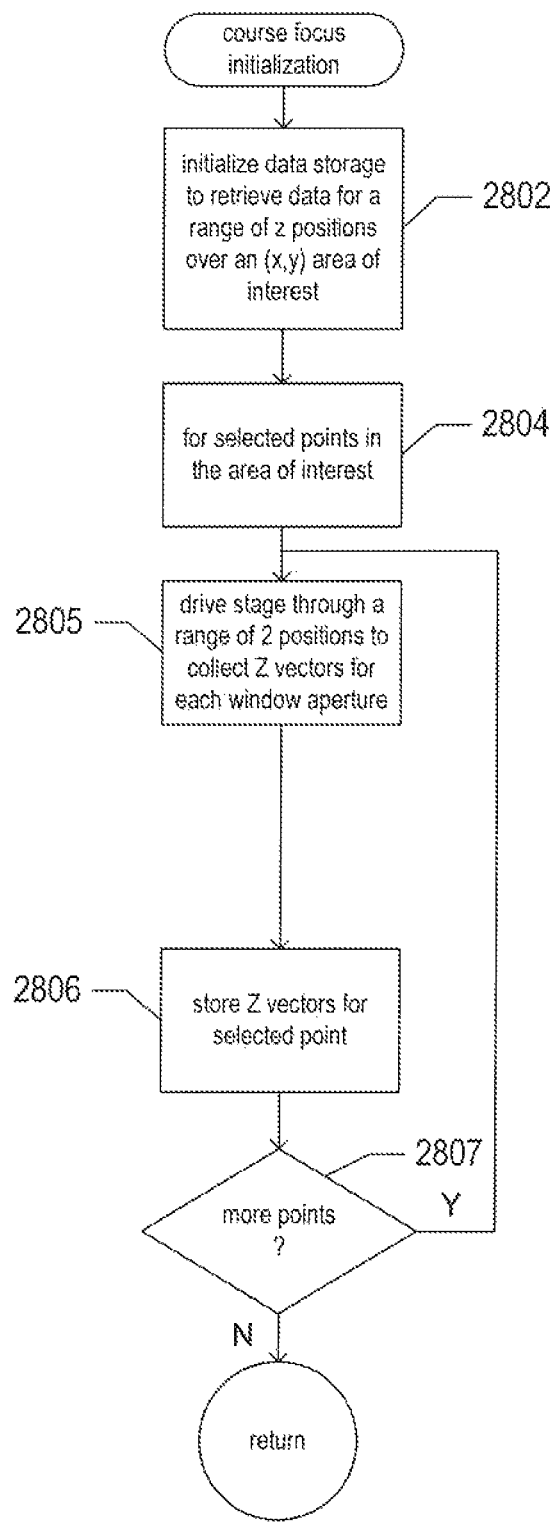
FIG. 28 illustrates a course-adjustment-method initialization in which z-position scans are conducted for a number of selected points within a three-dimensional optical-instrument-sample-position space.

FIG. 28 illustrates a course-adjustment-method initialization in which z-position scans are conducted for a number of selected points within a three-dimensional optical-instrument-sample-position space. In step 2802, one or more electronic memories are initialized for subsequent storage of z-prints obtained through calibration z-position scans of selected points within optical-instrument three-dimensional position space. Next, in the for-loop of steps 2804-2807, calibration z-position scans are carried out for each selected point. In step 2805, the stage of the optical instrument is driven through a range of z positions to collect the data for z-prints corresponding to the different autofocus-rotor-element-associated z-position curves at each of a number of instrument z positions. Next, in step 2806, the method computes the z-prints based on the z-position scan and stores the z-prints associated with the selected point in memory, a database, or in some other form of electronic storage.

Figure 29:
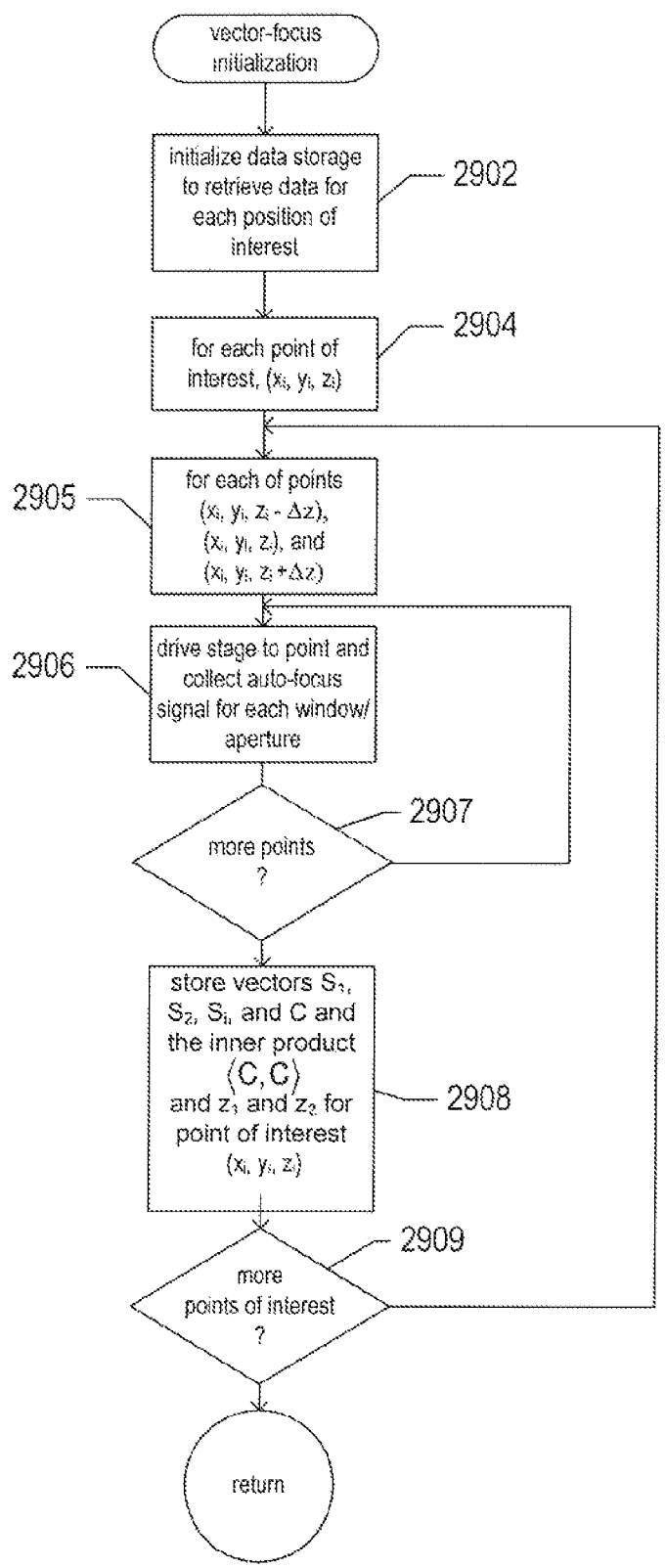
FIG. 29 provides a control-flow diagram for initialization of the vector-based autofocus method.

FIG. 29 provides a control-flow diagram for initialization of the vector-based autofocus method. In step 2902, electronic memory and/or other types of electronic data storage are initialized in order to receive vector data for positions of interest during the following calibration scans. In the for-loop of steps 2904-2909, a set of vectors for each point of interest that are subsequently used for vector-focus z-position adjustments are computed from a coarse, 3-point z-position scan about each point of interest ($x_i$, $y_i$, $z_i$) in a three-dimensional optical-instrument position space. In step 2906, the optical-instrument stage is driven to three z positions, $z_1$, $z_i$, and $z_2$ and autofocus-signal intensities are determined for each autofocus-rotor element at those positions. The inner loop of steps 2906 and 2907 are iterated over the three z positions $z_1$, $z_i$, and $z_2$. In alternative examples, additional calibration of z positions may be used for additional data collection to facilitate more accurate z-position determination. After data has been collected from all of the z positions, the vectors $S_1$, $S_2$, $S_i$, and C are computed and stored along with the inner product $\langle C,C \rangle$, $z_1$, and $z_2$ in association with the point of interest ($x_i$, $y_i$, $z_i$) in step 2908.

Figure 30:
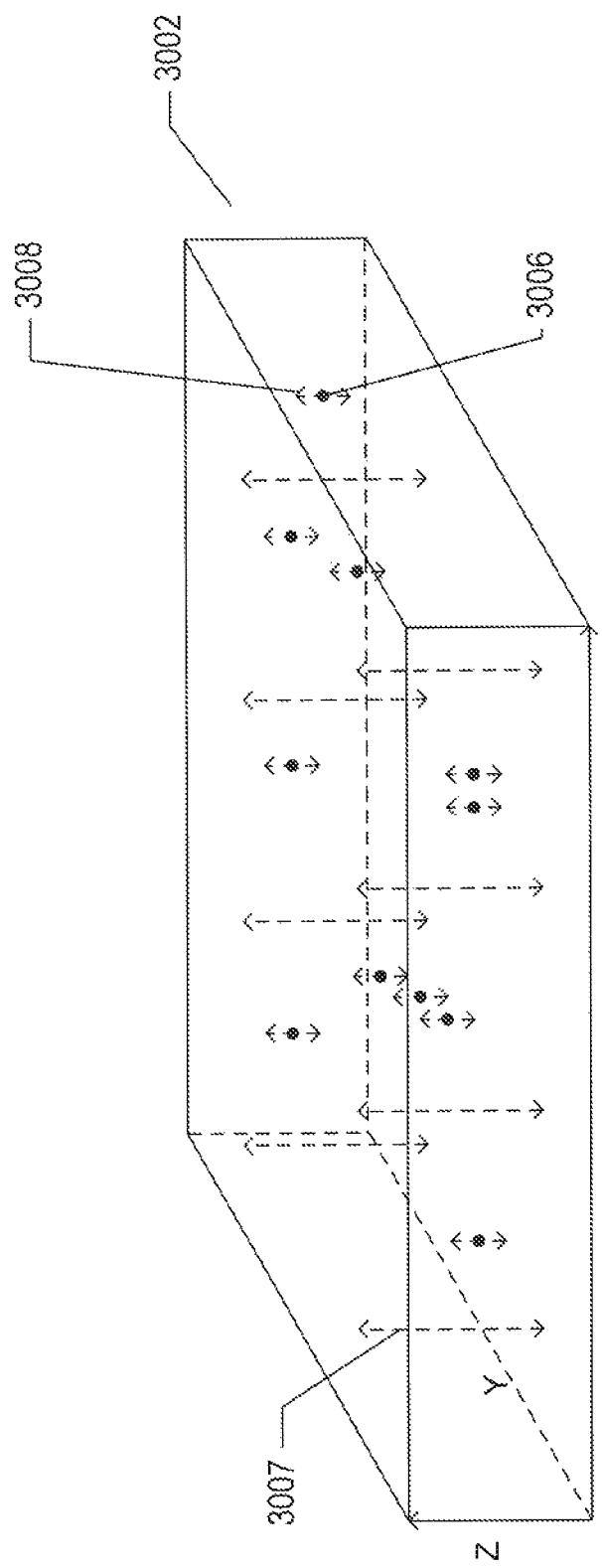
FIG. 30 illustrates a set of calibration scans.

The above-discussed course-adjustment initialization and vector-focus initialization therefore involves relatively high-granularity z-position scans at selected points, in the case of course-focus initialization, and relatively low-granularity position scans in the case of vector-focus initialization. FIG. 30 illustrates a set of calibration scans. In FIG. 30, a rectangular volume 3002 represents a volume in optical-instrument three-dimensional position space within which data is to be collected from a number of positions of interest. For course-adjustment initialization, a number of high-granularity, relatively broad z-position scans are conducted at points of a grid, represented in FIG. 30 by relatively long vertical dashed arrows, such as dashed arrow 3004. As mentioned above, course-adjustment calibration data is not point-of-interest specific, but can instead be collected from a regularly spaced pattern of points across an area in the x,y plane of the three-dimensional position space. Coarse adjustment can be carried out on any particular point ($x_i$, $y_i$, $z_i$) using the z-print obtained from a nearby point selected for course-adjustment-related calibration scanning. By contrast, a number of points, such as point 306, are shown within the volume of three-dimensional optical-instrument position space that represent points of interest at which data is intended to be subsequently collected during a data-collection phase. At each of these points, the low-granularity, narrow, 3-point z-position scan needed for carrying out the vector-focus method are carried out in a calibration step. In FIG. 30, these relatively low-granularity, narrow z-position scans are represented by short arrows centered around the points of interest, such as short arrow 3008 vertically centered with respect to point of interest 3006. During the data-collection phase, data may be collected from one or more of the points of interest. During data collection, the vector-focus method is employed for relatively fine-grain adjustment of the optical-instrument z position to maintain the optical-instrument z position at the z position of the point of interest. In the case that the z position of the optical instrument drifts or is perturbed significantly, so that the vector-focus method cannot be accurately applied, a nearby point for which a z-print set has been collected during course-adjustment initialization is selected and used for coarse adjustment of the optical-instrument z position, after which the optical instrument can be more accurately positioned using the vector-focus method.

Figure 31:
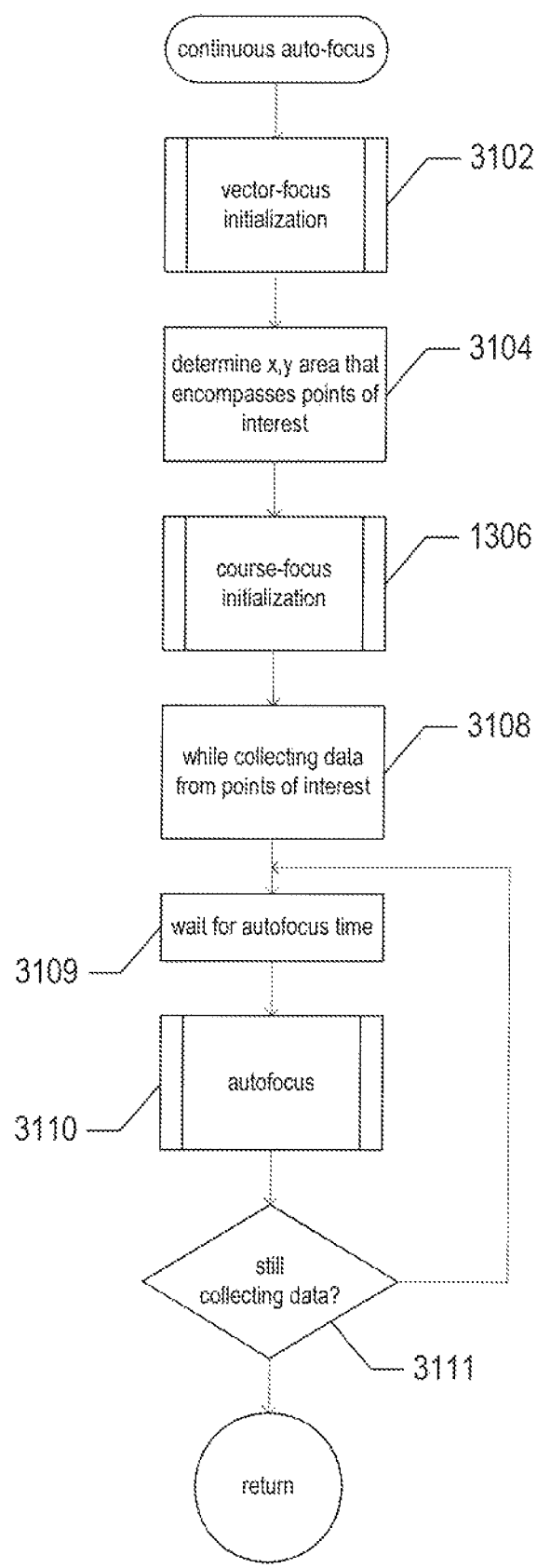
FIG. 31 provides a control-flow diagram for a continuous autofocus method incorporated within an autofocus module of an optical instrument.

FIG. 31 provides a control-flow diagram for a continuous autofocus method incorporated within an autofocus module of an optical instrument. In step 3102, vector-focus initialization is carried out for a set of points of interest input using the continuous autofocus method. In step 3104, an x,y area of an optical-instrument three-dimensional position space is determined which encompasses all of the points of interest. Then, in step 3106, course-adjustment initialization is carried out to prepare z-prints at regularly spaced locations throughout the x,y area determined in step 3104. At the conclusion of step 3106, the continuous-autofocus method has collected sufficient calibration data to maintain focus of the optical instrument during data collection from the points of interest during a subsequent data-collection phase. Next, in the while-loop comprising steps 3108-3111, a continuous-autofocus method continually calls the routine "autofocus," in step 3110, to adjust the z position of the optical instrument to maintain focus during data collection. A wait step 3109 is introduced into the while-loop to implement a periodic autofocus implementation. In other words, the autofocus module corrects the z position at discrete intervals in time. In alternative examples of the continuous-autofocus method, the autofocus routine may be continuously called, without a wait step.

Figure 32:
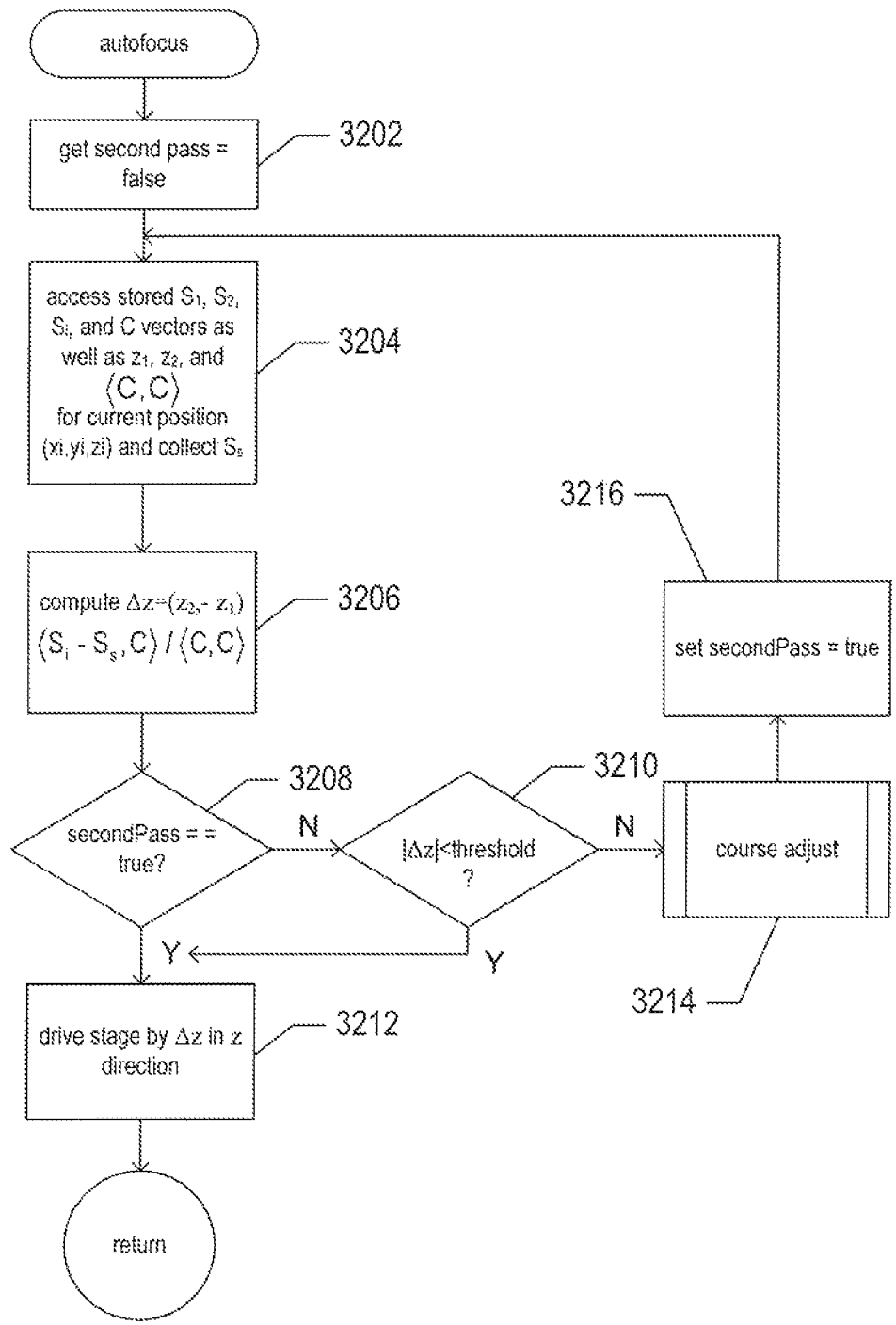
FIG. 32 provides a control-flow diagram of the autofocus routine called in step 3110 of FIG. 31.

FIG. 32 provides a control-flow diagram of the autofocus routine called in step 3110 of FIG. 31. In step 3202, a local variable "secondPass" is set to FALSE. In step 3204, the vector-focus vector data for the current position of interest at which data is being collected are retrieved from memory, along with the $z_1$, $z_2$, and $\langle C,C \rangle$ values for that position. Then, in step 3206, a $\Delta z$ is computed by the vector-focus method, as described above, with reference to FIGS. 25 and 26. In conditional step 3208, the routine "autofocus" determines whether or not the local variable "secondPass" is currently TRUE. In the first execution of the step, the local variable "secondPass" is FALSE, so control flows to step 3210, where the routine "autofocus" determines whether the magnitude of the computed $\Delta z$ is less than a threshold value. When the magnitude of the computed $\Delta z$ is less than the threshold value, indicating that the vector-focus method executed in steps 3204 and 3206 has been successful, then control flows to step 3212, in which the autofocus routine drives a stage by the computed $\Delta z$ in order to adjust focus of the optical instrument. However, if the magnitude of $\Delta z$ is not less than the threshold value, as determined in step 3210, then the routine "course adjust" is called, in step 3214, to carry out the course-adjustment method following which the local variable "secondPass" is set to TRUE in step 3216 before control flows back to step 3204, where another fine-grain vector-focus method is carried out. Other types of tests may be used in place of, or in addition to, the above-described threshold test to determine whether or not the initial computed $\Delta z$ is valid.

Figure 33:
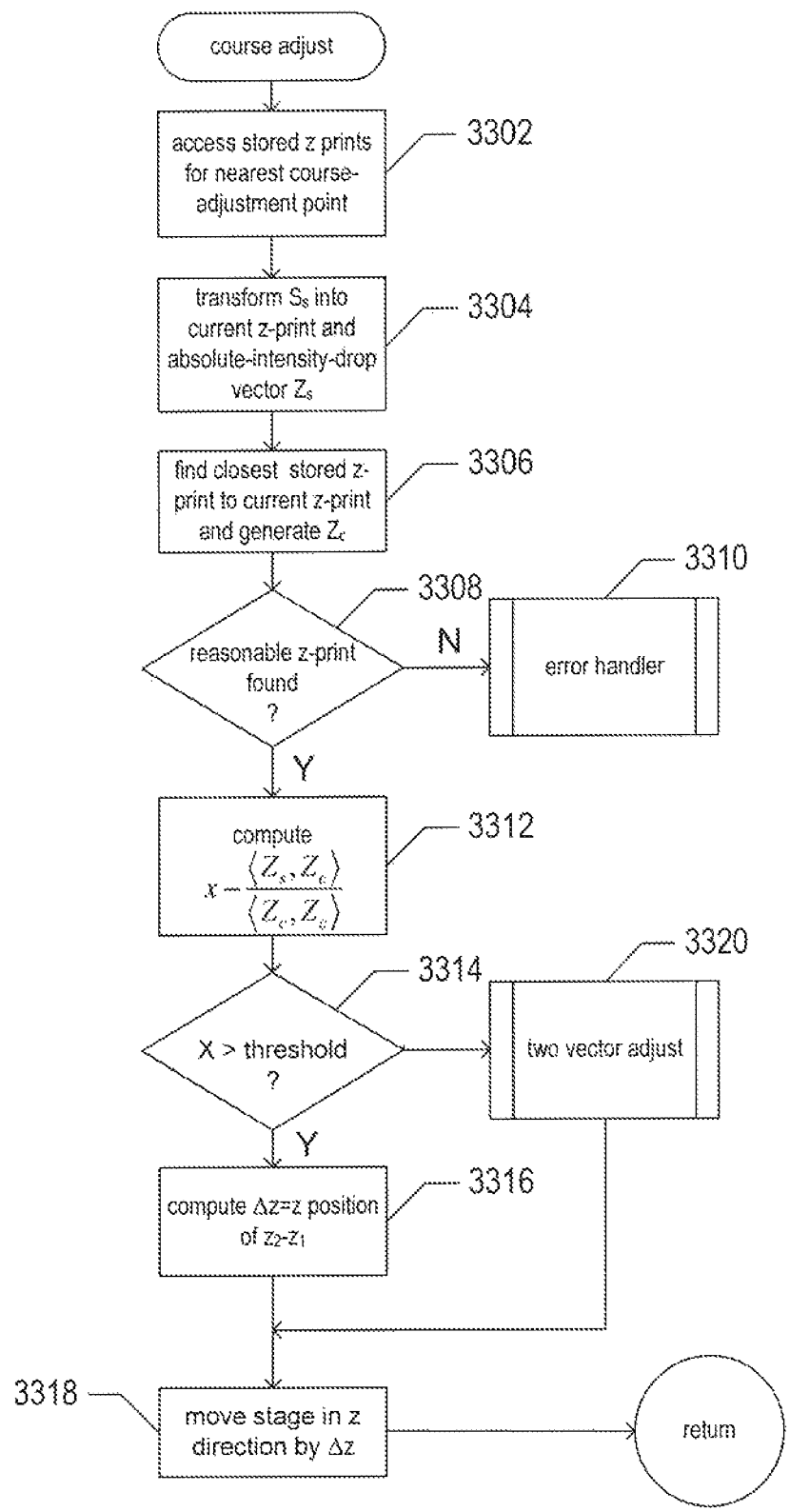
FIG. 33 provides a control-flow diagram for the routine "first adjust" called in step 3214 of FIG. 32.

FIG. 33 provides a control-flow diagram for the routine "coarse adjust" called in step 3214 of FIG. 32. In step 3302, the stored z-prints for a point nearest to the current point of interest for which z-prints are available are accessed from memory and, in step 3304, the current autofocus-signal intensities in vector $S_s$, obtained in step 3204 of the autofocus routine illustrated in FIG. 32, are transformed to produce a corresponding current z-print and absolute-intensity-drop vector 4. Then, in step 3306, a closest z-print to the current z-print is selected from among the retrieved z-prints, obtained in step 3304, and absolute-intensity-drop vector $Z_c$ is prepared from it. When a reasonable candidate closest z-print is found, as determined in step 3308, then control flows to step 3312. However, when a suitable closest z-print cannot be found, then an error-handling routine is called in step 3310. The error-handling routine may abort data collection to force a manual focusing of the optical instrument or may employ other types of focus techniques that are to bring the focus of the optical instrument within a z-position range at which currently described z-position adjustment methods can be employed. Although only a single call to an error handler is shown in the current implementation, errors may occur in other steps of the autofocus routines to necessitate amelioration or abortion of the current data-collection phase. When a reasonable closest z-print is found in step 3306, value x equal to the ratio of the inner product of $Z_s$ and $Z_c$ to the inner product of $Z_c$ with itself is calculated in step 3312. If x is greater than a threshold value, as determined in step 3314, then the current instrument position is assumed to be the z position corresponding to the closest z-print, allowing $\Delta z$ to be computed based only on the closest z-print in step 3316. Then in step 3318, the routine "coarse adjust" moves a stage z direction by $\Delta z$. When x is not greater than a threshold value, then the routine "two vector adjust" is called in step 3320 to compute a $\Delta z$ based on two z-prints.

Figure 34:
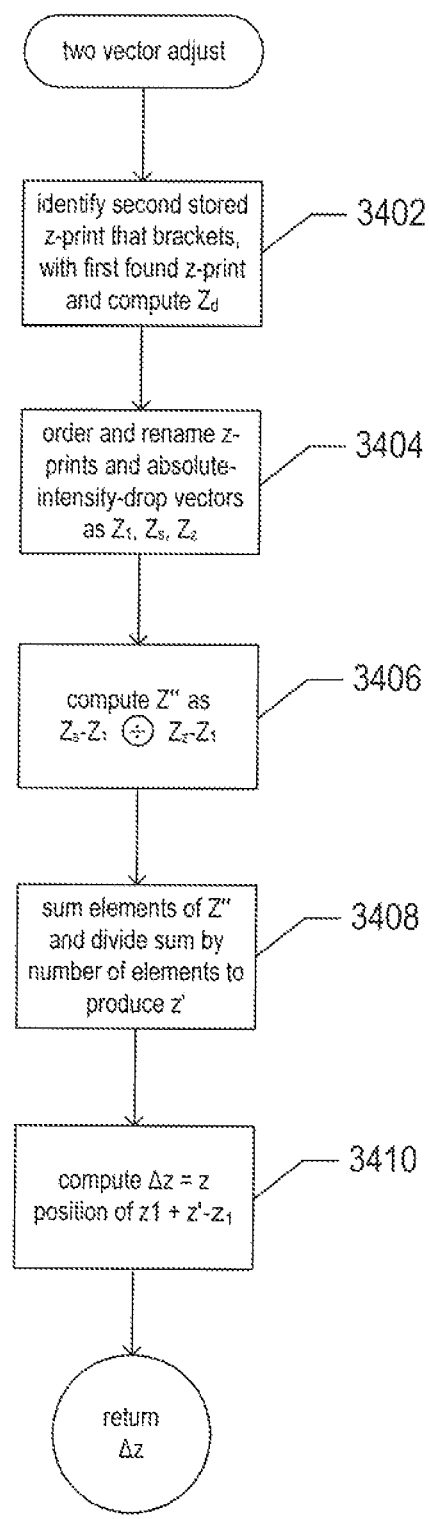
FIG. 34 provides a control-flow diagram for the routine "two vector adjust."

FIG. 34 provides a control-flow diagram for the routine "two vector adjust." In steps 3402 and 3404, a second stored z-print is identified which, together with the first closest z-print, brackets the z-print for the current instrument z position, as shown in FIG. 21 and discussed with reference to FIG. 21. An absolute-intensity-drop vector $Z_d$ is prepared from the second closest z-print, and the absolute-intensity vectors for the closest z-prints are ordered in z position and referred to as $Z_1$ and $Z_2$, with $Z_1$ corresponding to a z position less than the z position corresponding to $Z_2$. In step 3406, an intermediate result vector $Z''$ is computed by element-by-element division of the vector $Z_s$-$Z_1$ by the vector $Z_2$-$Z_1$. In step 3408, the elements of vector $Z''$ are added and divided by the number of elements to produce an average value z'. Finally, in step 3410, $\Delta z$ is computed as the z position corresponding to $Z_1$ added to z'-$z_i$, as discussed above with reference to FIG. 22. Steps 3404, 3406, 3408, and 3410 together carry out the linear interpretation method discussed with reference to FIG. 22.

Although the present invention has been described in terms of particular embodiments, it is not intended that the invention be limited to these embodiments. Modifications will be apparent to those skilled in the art. For example, as discussed above, any of a variety of different types of mechanical rotors can be used to effect a z-position scan, in the optical-axis direction, in order to locate the peak intensity of a backscattered autofocus-light from a cover-slip interface in order to determine the current z position of the objective lens with respect to the cover slip. A variety of different types of autofocus-processing subcomponents can be implemented from logic circuitry or a software-controlled microprocessor in order to continuously compute z position from intensity data collected from the photodetector of the autofocus system by varying any of many design and implementation parameters, including programming language, modular organization, control structures, data structures, and other parameters.

The foregoing description, for purposes of explanation, used specific nomenclature. However, it will be apparent to one skilled in the art that the specific details are not required in order to practice the present invention. The foregoing descriptions of specific embodiments are presented for purpose of illustration and description. They are not intended to be exhaustive or to limit the present invention to the precise forms disclosed. Many modifications and variations are possible in view of the above teachings. The embodiments are shown and described in order to best explain the principles of the invention and its practical applications, to thereby enable others skilled in the art to best utilize the present invention and various embodiments with various modifications as are suited to the particular use contemplated. It is intended that the scope of the present invention be defined by the following claims and their equivalents:

The invention claimed is:

1. An autofocus subsystem included within an optical instrument, the autofocus subsystem comprising:
   an autofocus light path through which the autofocus subsystem receives electromagnetic radiation backscattered from an optical interface of the optical instrument;
   an autofocus rotor including two or more autofocus-rotor elements through each of which the backscattered electromagnetic radiation passes, when the autofocus rotor is aligned with the autofocus light path, onto an autofocus detector that produces a corresponding autofocus signal; and
   an autofocus processing component including an electronic memory and a processing component that
      controls positioning of one or more instrument components in optical-instrument position space with coordinate axes x and y perpendicular to an optical-instrument optical axis and coordinate axis z along the optical-instrument optical axis,
      acquires and stores, in memory, two or more calibration curves, each representing autofocus signal magnitudes associated with a particular autofocus-rotor element with respect to optical-instrument position, and
      uses the two or more calibration curves to monitor and adjust optical-axis position during data collection.

2. The autofocus subsystem of claim 1 wherein the autofocus subsystem carries out optical-instrument calibration prior to data collection in an autofocus initialization phase during which the two or more calibration curves are acquired by collecting autofocus-signal intensity data during a scan through a range of optical-instrument z positions for each of two or more autofocus-rotor elements, each autofocus-rotor element producing a largest autofocus-signal intensity at a characteristic optical-instrument z position.

3. The autofocus subsystem of claim 2 wherein the calibration curves are acquired over a range of optical-instrument z positions and used to determine relative autofocus-signal magnitudes at each of two or more optical-instrument z positions within the range of optical-instrument z positions for the autofocus-rotor elements corresponding to the calibration curves, the relative autofocus-signal magnitudes at each of the two or more z positions within the range of optical-instrument z positions representing autofocus-signal fingerprints, each associated with an optical-instrument z position.

4. The autofocus subsystem of claim 3 wherein, during data collection, the autofocus subsystem acquires autofocus-signal intensities with respect to two or more autofocus-rotor elements, constructs a current autofocus-signal fingerprint from the acquired autofocus-signal intensities, and determines a current optical-instrument z position as one of:
   the optical-instrument z position associated with a stored autofocus-signal fingerprint with a largest calculated similarity to the current autofocus-signal fingerprint; and
   a value interpolated from the optical-instrument z positions associated with two stored autofocus-signal fingerprints with two largest calculated similarities to the current autofocus-signal fingerprint.

5. The autofocus subsystem of claim 4 wherein the autofocus subsystem calculates the similarity between a first autofocus-signal fingerprint and a second autofocus-signal fingerprint by comparing the relative order of autofocus-signal magnitudes and associated autofocus-rotor elements between two autofocus-signal fingerprints, two autofocus-signal fingerprints having the same relative order of autofocus-signal magnitudes and associated autofocus-rotor elements assigned a larger similarity than two autofocus-signal fingerprints having different relative orders of autofocus-signal magnitudes and associated autofocus-rotor elements.

6. The autofocus subsystem of claim 2
   wherein each calibration curve comprises autofocus-signal intensities relative to an autofocus-rotor element obtained at three or more optical-instrument z positions, including a z position of interest, and
   wherein two or more calibration curves are acquired for each point of interest in optical-instrument position space at which data is subsequently collected.

7. The autofocus subsystem of claim 6 wherein, during data collection, the autofocus subsystem acquires autofocus-signal intensities with respect to two or more autofocus-rotor elements at a current optical-instrument z position and interpolates a current optical-instrument position from the acquired autofocus-signal intensities and stored calibration curves.

8. The autofocus subsystem of claim 2 wherein the autofocus subsystem
   carries out data collection at a points of interest in optical-instrument position space following optical-instrument calibration;
   concurrently uses the calibration curves and currently measured autofocus-signal intensities with respect to two or more autofocus-rotor elements to determine a directed distance between a current optical-instrument position and the point of interest; and
   adjusts the optical-instrument position by the directed distance to focus the optical instrument at the point of interest.

9. A method for adjusting the position of an optical instrument during data collection at a point of interest by an autofocus subsystem within an optical instrument, the method comprising:
   acquiring, prior to data collection, two or more calibration curves, each calibration curve representing autofocus-signal magnitude detected through a particular autofocus-rotor element with respect to optical-instrument position;
   storing data for the two or more calibration curves in an electronic memory;
   during data collection, determining a current autofocus-signal magnitude through two or more autofocus-rotor elements;
   using the two or more determined current autofocus-signal magnitudes associated with two or more autofocus-rotor elements and the data for the two or more calibration curves stored in memory to determine a directed distance from a current optical-instrument position and the point of interest; and
   adjusting the optical-instrument position by the determined directed distance.

10. The method of claim 9 wherein the autofocus subsystem comprises:
an autofocus light path through which the autofocus subsystem receives electromagnetic radiation backscattered from an optical interface of the optical instrument;
an autofocus rotor including two or more autofocus-rotor elements through which the backscattered electromagnetic radiation is focused onto an autofocus detector that produces a corresponding autofocus signal; and
an autofocus processing component including the electronic memory and a processing component that
controls positioning of one or more instrument components in optical-instrument position space with coordinate axes x and y perpendicular to an optical-instrument optical axis and coordinate axis z along the optical-instrument optical axis,
acquiring, prior to data collection, two or more calibration curves, and
uses the two or more acquired calibration curves to monitor and adjust optical-axis position during data collection.

11. The method of claim 9 wherein two different types of calibration curves are acquired prior to data collection, a first type of calibration curve used for coarse optical-instrument-position adjustment when a large drift in optical-instrument position has occurred and a second type of calibration curve used for fine tuning of optical-instrument position.

12. The method of claim 11 further including
acquiring coarse-adjustment calibration curves over a range of optical-instrument z positions and using the coarse-adjustment calibration curves to determine relative autofocus-signal magnitudes at each of multiple optical-instrument z positions within the range of optical-instrument z positions for the autofocus-rotor elements corresponding to the calibration curves, the relative autofocus-signal magnitudes at a particular optical-instrument z position of the multiple z positions together composing an autofocus-signal fingerprint associated with the optical-instrument z position; and
storing the autofocus-signal fingerprints associated with the multiple optical-instrument z positions in the electronic memory.

13. The method of claim 12 further including:
during data collection,
acquiring autofocus-signal intensities with respect to two or more autofocus-rotor elements,
constructing a current autofocus-signal fingerprint from the acquired autofocus-signal intensities, and
determining a current optical-instrument z position as one of
the optical-instrument z position associated with a stored autofocus-signal fingerprint with a largest calculated similarity to the current autofocus-signal fingerprint, and
a value interpolated from the optical-instrument z positions associated with two stored autofocus-signal fingerprints with two largest calculated similarities to the current autofocus-signal fingerprint.

14. The method of claim 13 wherein the similarity between a first autofocus-signal fingerprint and a second autofocus-signal fingerprint is calculated by comparing the relative order of autofocus-signal magnitudes and associated autofocus-rotor elements between two autofocus-signal fingerprints, two autofocus-signal fingerprints having the same relative order of autofocus-signal magnitudes and associated autofocus-rotor elements assigned a larger similarity than two autofocus-signal fingerprints having different relative orders of autofocus-signal magnitudes and associated autofocus-rotor elements.

15. The method of claim 11
wherein each calibration curve comprises autofocus-signal intensities relative to an autofocus-rotor element obtained at three or more optical-instrument z positions, including a z position of interest, and
wherein two or more calibration curves are acquired for each point of interest in optical-instrument position space at which data is subsequently collected.

16. The method of claim 15 wherein, during data collection, the autofocus subsystem acquires autofocus-signal intensities with respect to two or more autofocus-rotor elements at a current optical-instrument z position and interpolates a current optical-instrument position from the acquired autofocus-signal intensities and stored calibration curves.

17. An autofocus subsystem comprising:
an autofocus rotor with two or more autofocus-rotor elements through each of which backscattered electromagnetic radiation passes, when the autofocus rotor is aligned with an autofocus light path through which the autofocus subsystem receives electromagnetic radiation backscattered from an optical interface of an optical instrument, onto an autofocus detector that produces a corresponding autofocus signal; and
an autofocus processing component including an electronic memory and a processing component that
controls positioning of one or more instrument components in optical-instrument position space,
acquires and stores, in memory, two or more calibration curves, each representing autofocus signal magnitudes associated with a particular autofocus-rotor element with respect to optical-instrument position, and
uses the two or more calibration curves to monitor and adjust optical-axis position during data collection.

18. The autofocus subsystem of claim 17 wherein the autofocus subsystem carries out optical-instrument calibration prior to data collection in an autofocus initialization phase during which the two or more calibration curves are acquired by collecting autofocus-signal intensity data during a scan through a range of optical-instrument positions for each of two or more autofocus-rotor elements, each autofocus-rotor element producing a largest autofocus-signal intensity at a characteristic optical-instrument position.

19. The autofocus subsystem of claim 18 wherein the calibration curves are acquired over a range of optical-instrument positions and used to determine relative autofocus-signal magnitudes at each of two or more optical-instrument positions within the range of optical-instrument positions for the autofocus-rotor elements corresponding to the calibration curves, the relative autofocus-signal magnitudes at each of the two or more positions within the range of optical-instrument positions representing autofocus-signal fingerprints, each associated with an optical-instrument position.

20. The autofocus subsystem of claim 18
wherein each calibration curve comprises autofocus-signal intensities relative to an autofocus-rotor element obtained at three or more optical-instrument positions, including a position of interest, and
wherein two or more calibration curves are acquired for each point of interest in optical-instrument position space at which data is subsequently collected.

* * * * *